United States Patent
Francis et al.

(12) 
(10) Patent No.: US 6,580,720 B1
(45) Date of Patent: Jun. 17, 2003

(54) LATENCY VERIFICATION SYSTEM WITHIN A MULTI-INTERFACE POINT-TO-POINT SWITCHING SYSTEM (MIPPSS)

(75) Inventors: Harry F. Francis, Alexandria, VA (US); Thomas F. Cocke, IV, King George, VA (US); Gary S. Calvert, II, Jamestown, NC (US); Roland H. Mattoon, Montross, VA (US); Timothy Y. Gorder, King George, VA (US); Neal E. Moody, Fruitland, MD (US); Gair D. Brown, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/156,379

(22) Filed: Sep. 18, 1998

(51) Int. Cl.[7] .......................... H04L 12/28; H04L 12/66; H04Q 11/00
(52) U.S. Cl. ....................... 370/423; 370/359; 370/360; 370/463; 710/129; 710/131
(58) Field of Search ................................ 370/355, 357, 370/360, 395.1, 397, 422, 423, 235, 238, 359, 463; 710/129, 131

(56) References Cited

U.S. PATENT DOCUMENTS

| | | | |
|---|---|---|---|
| 4,009,345 A | 2/1977 | Flemming et al. | 179/15 BA |
| 4,181,886 A | 1/1980 | Cooperman | 325/4 |
| 4,491,944 A | 1/1985 | Caizergues et al. | 370/58 |
| 4,653,047 A | 3/1987 | Vij et al. | 370/58 |
| 4,677,611 A | 6/1987 | Yanosy, Jr. et al. | 370/85 |
| 4,696,000 A | 9/1987 | Payne, III | 370/60 |
| 4,706,081 A | 11/1987 | Hart et al. | 340/825.03 |
| 4,720,850 A | 1/1988 | Oberlander et al. | 379/90 |
| 4,731,825 A | 3/1988 | Wojcinski et al. | 379/273 |
| 4,736,462 A | 4/1988 | Joel, Jr. | 455/600 |
| 4,769,833 A | 9/1988 | Farleigh et al. | 379/105 |
| 4,807,282 A | 2/1989 | Kazan et al. | 379/284 |

(List continued on next page.)

Primary Examiner—Alpus H. Hsu
Assistant Examiner—Toan Nguyen
(74) Attorney, Agent, or Firm—James B. Bechtel, Esq.; Matthew J. Bussan, Esq.; Raymond H. J. Powell, Jr. Esq.

(57) ABSTRACT

A multi-interface point-to-point switching system includes a plurality of I/O ports coupled to a plurality of respective devices, a switching fabric that selectively delivers each of a plurality of different signals from a selected one of the I/O ports coupled to a sending one of the devices to another selected one of the I/O ports coupled to a receiving one of the devices, to thereby establish respective connections between the sending and receiving devices, and a controller that determines the latency of all possible signal paths that are presently available for each connection to be established, selects the lowest-latency signal path for each connection that it determines is presently available, and then configures the switching fabric to establish the selected signal path for each connection. According to one aspect of the invention, the switching fabric provides a fixed, low latency signal path for each connection whereby the latency of that connection is deterministic and predictable. Moreover, the switching system ensures that the data content of the signal delivered via that connection is not analyzed by the switching fabric, i.e., the switching fabric operates in a message-independent manner.

64 Claims, 28 Drawing Sheets

U.S. PATENT DOCUMENTS

| | | | |
|---|---|---|---|
| 4,817,083 A | 3/1989 | Richards | 370/59 |
| 4,965,798 A | 10/1990 | Mostafa et al. | 370/79 |
| 4,972,463 A | 11/1990 | Danielson et al. | 379/91 |
| 5,182,751 A | 1/1993 | Bales et al. | 370/110.1 |
| 5,204,949 A | 4/1993 | Yasue et al. | 395/200 |
| 5,239,542 A | 8/1993 | Breidenstein et al. | 370/79 |
| 5,367,522 A | 11/1994 | Otani | 370/84 |
| 5,384,773 A | 1/1995 | Olnowich et al. | 370/60.1 |
| 5,406,557 A | 4/1995 | Baudoin | 370/61 |
| 5,420,916 A | 5/1995 | Sekiguchi | 379/230 |
| 5,497,373 A | 3/1996 | Hulen et al. | 370/79 |
| 5,535,373 A | 7/1996 | Olnowich | 395/500 |
| 5,541,914 A * | 7/1996 | Krishnamoorthy et al. | 370/56 |
| 5,581,558 A | 12/1996 | Horney, II et al. | 370/401 |
| 5,612,953 A | 3/1997 | Olnowich | 370/367 |
| 5,654,695 A | 8/1997 | Olnowich et al. | 340/825.01 |
| 5,659,542 A | 8/1997 | Bell et al. | 370/496 |
| 5,691,984 A | 11/1997 | Gardner et al. | 370/401 |
| 5,706,111 A | 1/1998 | Kim | 395/500 |
| 5,706,290 A | 1/1998 | Shaw et al. | 370/465 |
| 5,721,844 A * | 2/1998 | Chang | 395/311 |
| 5,742,646 A * | 4/1998 | Woolley et al. | 375/349 |
| 6,115,373 A * | 9/2000 | Lea | 370/355 |
| 6,128,291 A * | 10/2000 | Perlman et al. | 370/352 |
| 6,151,324 A * | 11/2000 | Belser et al. | 370/397 |
| 6,185,021 B1 * | 2/2001 | Fatehi et al. | 359/117 |

* cited by examiner

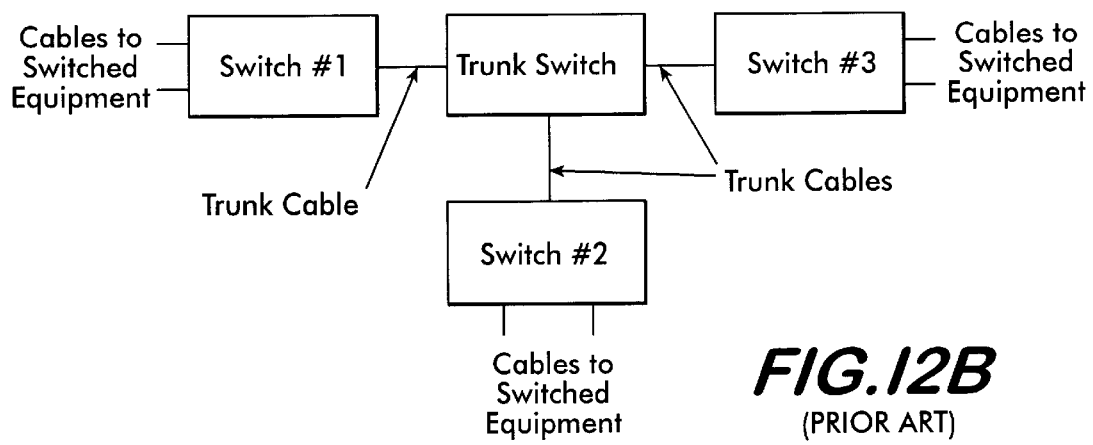
FIG.12B
(PRIOR ART)
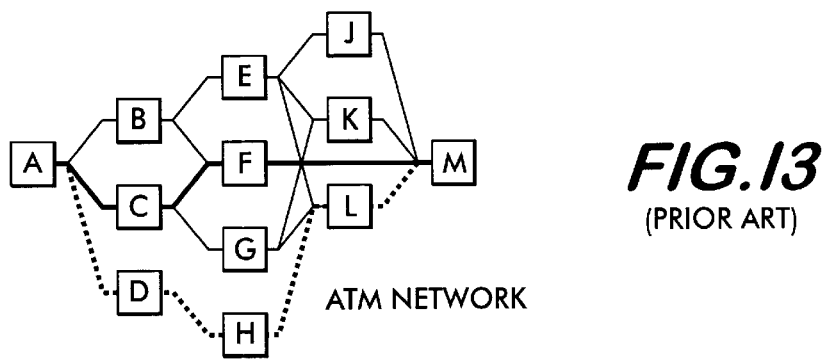
FIG.13
(PRIOR ART)
FIG.14A
(PRIOR ART)
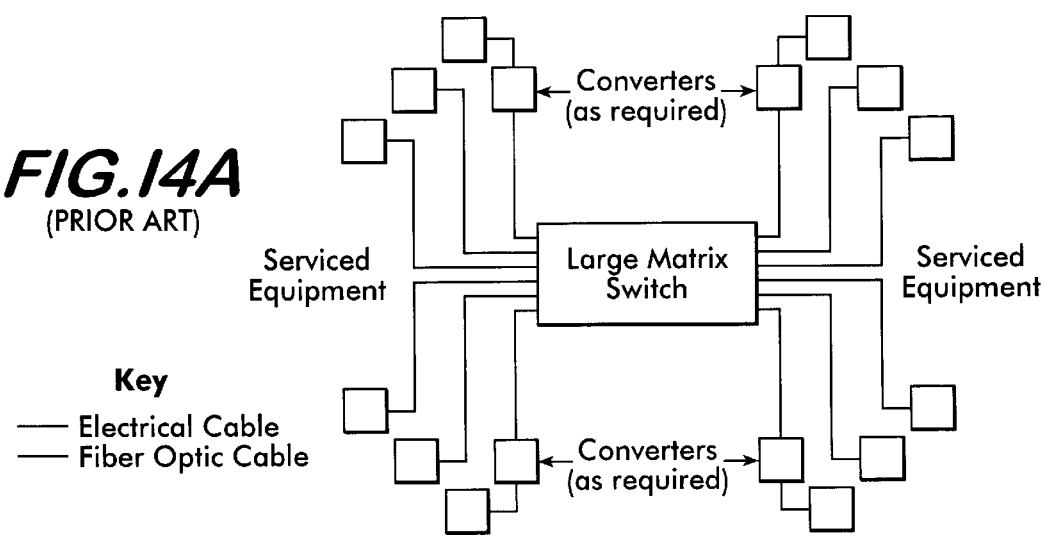

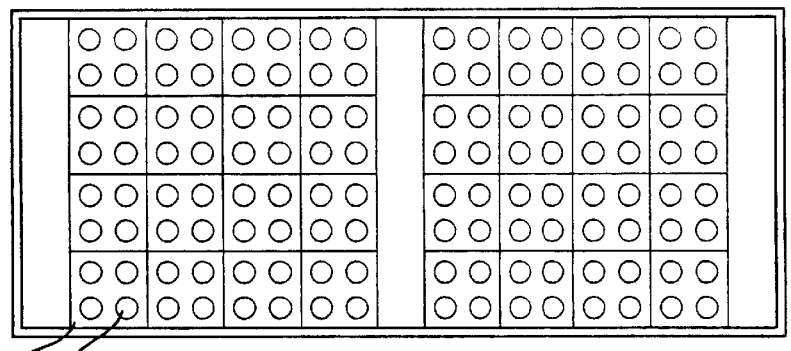
FIG. 17
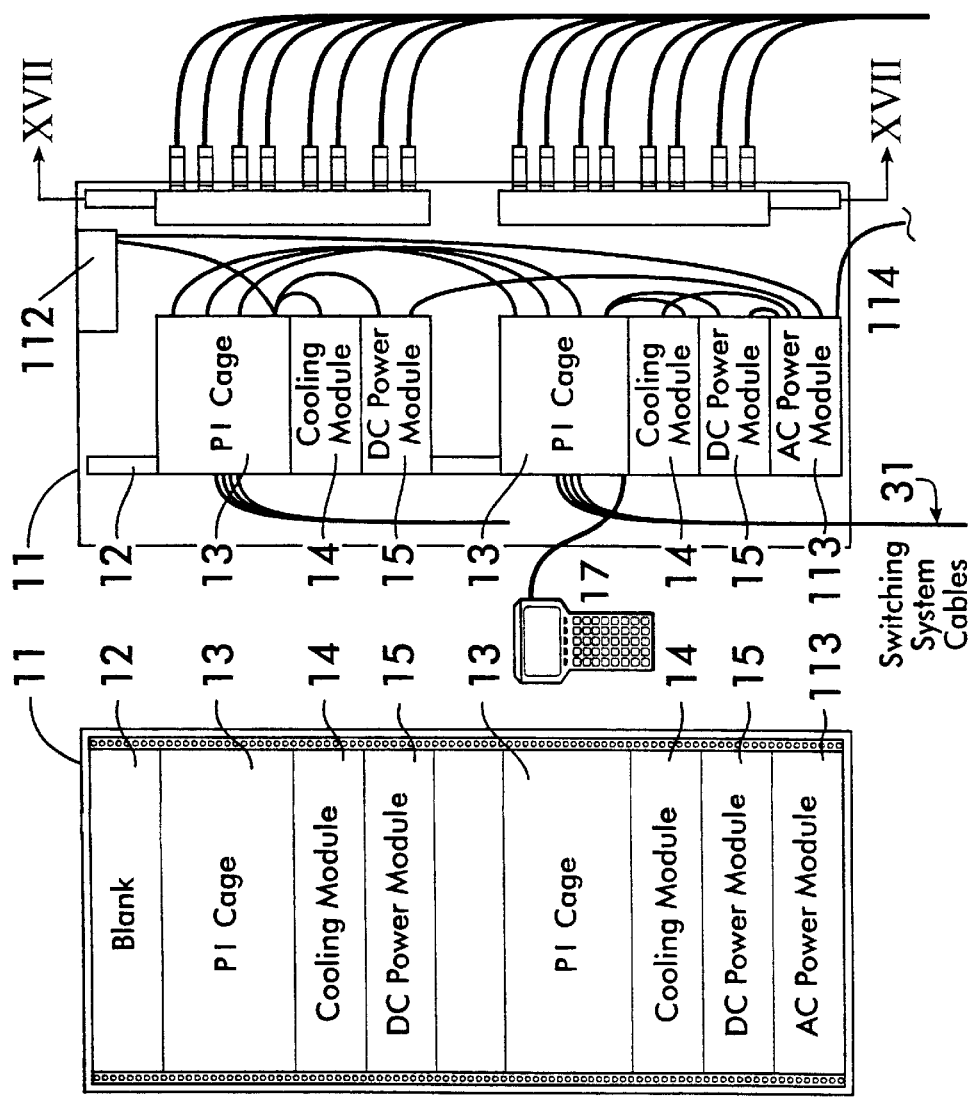
FIG. 16B
FIG. 16A

Rear View

Rear/External →

Side View

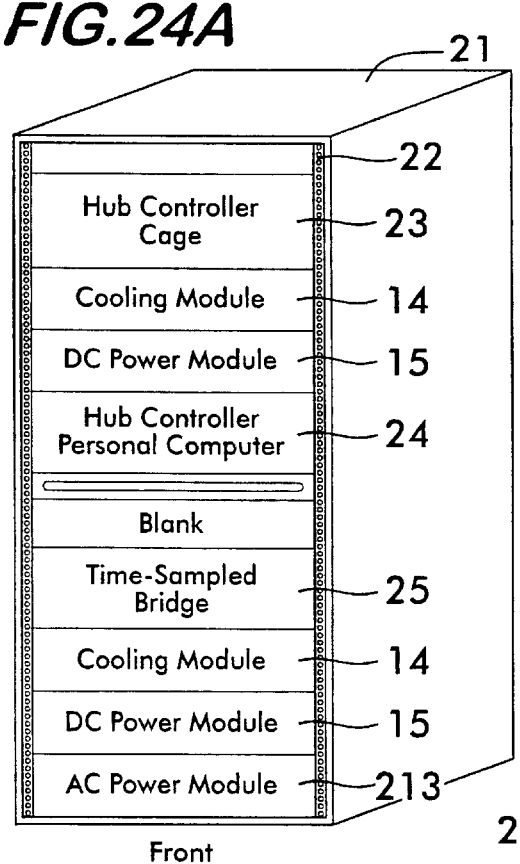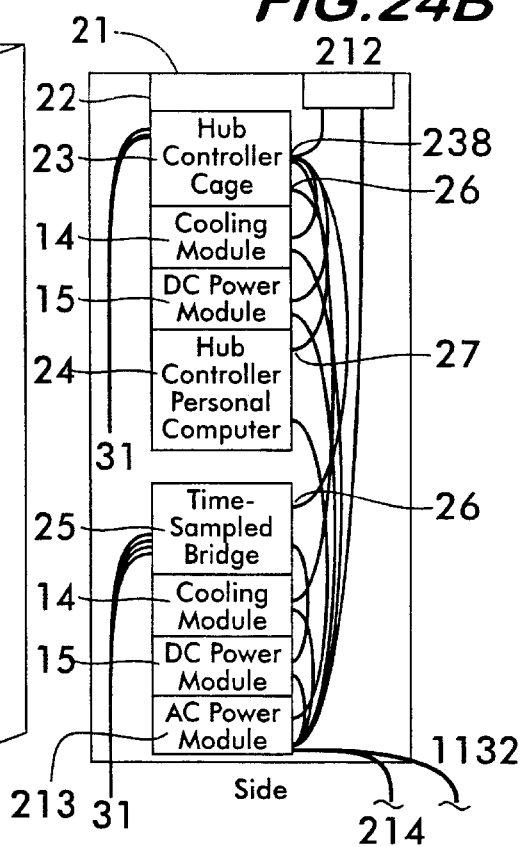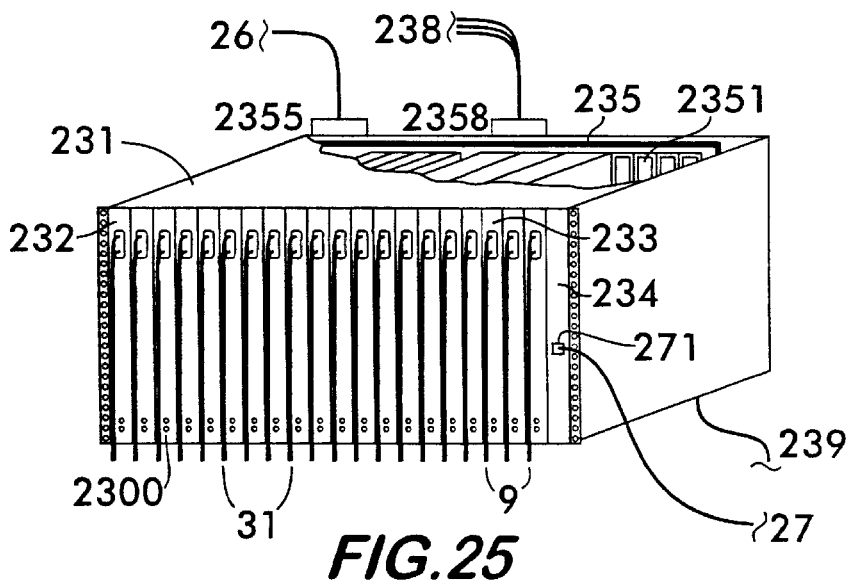

LATENCY VERIFICATION SYSTEM WITHIN A MULTI-INTERFACE POINT-TO-POINT SWITCHING SYSTEM (MIPPSS)

BACKGROUND OF THE INVENTION

1. Field of the Invention

The present invention relates generally to switching systems. More specifically, the present invention relates to a switching system which provides the ability to interconnect a large number of electronic components in a manner which allows the components to function as if they were physically wired together using virtually any type of data transfer protocol while exhibiting low latency (achieving a total data transfer delay close to the that which would have been achieved in a direct-wired configuration), timing consistency (achieving a latency which is deterministic and predictable), and high signal fidelity (not adding to, deleting from, or altering the signal in any way).

2. Glossary

Before beginning a discussion of either the related art or the preferred embodiments according to the present invention, it should be mentioned that the inventors have opted to employ the following terms throughout the specification. A glossary of these terms are set out immediately below.

Blocking—Blocking refers to a condition wherein a connection is refused even though there are free input and output channels.

Contention—refers to an attempt to connect an input port to an output port which is already in use.

Data Transfer Protocol Insensitive—Data transfer protocol insensitive functional behavior refers to the ability to of the switching system to handle virtually any type of data transfer protocol, i.e., any device can be connected to any other device that uses that same data transfer protocol, without adding to, deleting from, altering, or responding to the transfer protocol in any way. From the discussion immediately above, it will be appreciated that neither the origin nor the destination of any signal is determined by analyzing the associated header or the data content of the signal; switching is completely content-independent or message-independent.

Deliver—Deliver, as used hereinafter, is employed to connote that any specification-compliant signal received is switched and "delivered" as a corresponding specification-compliant output signal. "Delivered" is understood to be broad enough to encompass the general process wherein the input signal, once recognized as a valid signal, is converted into one or more other signal formats as it is handled within the switch, so long as the final output signal "delivered" by the MIPPSS is specification-compliant in its original format.

Distributed System—Distributed system refers to the switching system design wherein each switching unit has the capability of servicing multiple locations, and no single location must house the entire switch. It will be appreciated that this reduces need for costly modifications or additions to facilities to accommodate switching equipment.

Hot-Swapping—Hot-swapping capability refers to the ability to perform on-line replacement of line-replaceable units, i.e., the switching system remains operable overall while discrete, inoperable elements are replaced.

Low Latency—Low latency refers to the ability of the switching system to achieve a total data transfer delay close to the that which would have been achieved in a direct-wired configuration.

Multi-Interface—Multi-Interface functional behavior refers to the ability to handle virtually any type of data transfer protocol, i.e., any device can be connected to any other device that uses that same data transfer protocol.

NTDS—Naval Tactical Data System (NTDS) refers to the Navy's specific implementation of the Military Standard Document entitled "Input/Output Interfaces, Standard Digital Data, Navy Systems," commonly referred to as MIL-STD-1397 (NAVY). The standard describes interface classifications (Types) and categories of NTDS interfaces, the latter being parallel interfaces, serial interfaces, and other interfaces. For specific information of each NTDS signal type, refer to MIL-STD-1397 (NAVY), the latest version of which, MIL-STD-1397C, is available from the Naval Publications and Forms Center, Philadelphia, Pa., or at http://www.dodssp.daps.mil. MIL-STD-1397 is incorporated herein by reference.

Point-to-Multipoint—Point-to-multipoint functional behavior refers to the ability by which a single data generating device (root node) communicates with a plurality of data receiving devices (leaf nodes). In nodal notation, traffic on the switching system is generated by the root node and received by all of the leaf nodes. Moreover, the switching system does not reserve bandwidth for traffic from any of the leaf nodes toward the root node and the leaf nodes cannot communicate with one another through the point-to-multipoint connection. A switching system capable of point-to-multipoint connections is said to include a broadcast capability.

Point-to-Point—Point-to-point functional behavior generally refers to the ability to connect devices which are required to communicate with one another on a one-to-one basis.

Signal Fidelity—Signal fidelity refers to the ability to replicate the input signal at the output port. High signal fidelity denotes that the signal is delivered without adding to, deleting from, or altering the signal in any way.

Switch Fabric—The components with a switching system that provides paths for the connections. In the discussion which follows, two distinct types of switch fabrics will be considered. The first type is multi-layer switch fabric, where the switch fabric is arranged in layers, i.e., discrete switch enclosures, according to the signal format the individual layers are designed to receive and/or output. The second type is mixed-layer switch fabric, wherein multiple signal formats are received and/or output by a single switch layer, e.g., a single switch enclosure.

Timing Consistency—Timing consistency refers to the ability of the switching system to achieve a latency which is deterministic and predictable. See low latency.

Transparency—Transparent functional behavior refers to the ability to deliver a signal without interaction with the interface protocol corresponding to that signal. Thus, an interface-compliant input signal bit arriving at an input terminal is output as an interface-compliant signal bit, irrespective of whether the bit is a control bit or a data bit. This characteristic is critical when the switch serves to connect objects which are themselves under test, allowing research and testing without introducing additional possible sources of errors due to switching.

3. Brief Discussion of Related Art

The primary utility of MIPPSS is in transparently switching signals between and among components which may not have been originally designed to be switched. The signals can be of virtually any data type (communications, images, sensor data, accounting records) and can be used for any scientific, commercial, or military purpose. See FIG. 1.

The discussion immediately below provides a review of basic digital communications. In addition, the discussion outlines the need for switching, current methods and apparatus used to perform switching, and the principal limitations and disadvantages of these methods. Several solutions to the overall switching problem solved by MIPPSS are also discussed.

Digital equipment communicates by sending digital signals, which are composed of binary digits, or bits. Each bit represents either a 1 (one) or a 0 (zero). FIG. 2 shows a representative bit expressed as a deflection from a baseline over a period of time. By convention, most upward deflections are signed positive. The presence of a 1 or a 0 is interpreted according to an agreed-upon encoding technique, as described in greater detail below, but it should be noted here that the presence of a 1 or a 0 may be denoted by positive or negative deflections, positive or negative transitions, or simply by the presence or absence of a transition. Digital signaling is generally superior to analog information transfer because it is capable of very accurate transmission over great distances.

It will be appreciated that the bit is signaled in a digital circuit by varying voltages. The most common digital logic, transistor-transistor logic (TTL), uses +0.5 volts nominal for a low signal and +5 volts nominal for a high signal. A faster logic, emitter-coupled logic (ECL), uses −1.75 volts nominal for low and −0.9 volts nominal for high. Positive Emitter-Coupled Logic (PECL) uses nominal +3.0 volts for low and +4.0 volts for high.

It should be mentioned here that when the signal needs to be transmitted over a distance, a device called a driver receives the digital logic input, adds energy, and produces a current sufficient to transmit the signal. However, regardless of the propagation distance, it is important to note that the shape of the signal bit may vary in terms of its overall amplitude, duration, and direction of deflection (polarity). The allowable limits on the exact shape of signal bits are precisely defined in interface specifications. This precise definition helps to ensure that noise is not interpreted as data.

The transmission of digital data from one machine to another must ensure that the data is received unambiguously and accurately. Various encoding techniques are used depending on the requirements of the interface (distance, timing, environment, etc.). Some common forms of encoding are illustrated in FIG. 3 and include:

a. Return to Zero (RZ). A simple approach to digital communication might prescribe an upward deflection to signal the presence of a 1 bit, and the absence of this deflection to signal a 0 bit (FIG. 3(a)). In this case it takes an entire time interval, or bit period (shown as the horizontal distance between the vertical grid lines) to signal a 0, not simply the return to baseline which occurs following each 1 bit. This interpretation requires some type of timing signal to coordinate bit periods between different equipment.

b. Non-Return-to-Zero (NRZ). In FIG. 3(b), a continuous signal might transmit at either one level or another throughout each time interval, eliminating the need for a return to baseline within each interval. Again, some form of time synchronization is required.

c. Manchester. An improvement to these signaling schemes uses just a down-shift to signal a 1 and an up-shift to signal a 0 (FIG. 3(c)). This shift must occur in the middle of the bit period for the signal to be valid.

d. Non-Return-to-Zero, Inverted (NRZI). A further refinement defines that simply a transition across the time interval boundary indicates a 0 and the lack of a similar transition indicates a 1 (FIG. 3(d)).

Each of these encoding methods has distinct advantages and disadvantages in aspects such as overall signaling speed, average power consumed, error rates, and the need for a separate clock.

It should be mentioned that encoding is performed to enable data transfer and not to provide secrecy. It will also be understood that distinct strings of bits may be encoded to represent letters and words. Once again, the goal of these codes is not secrecy but the establishment of distinct and unambiguous meanings for various bit patterns. Two of the more common encoding schemes are as follows:

a. ASCII. One common encoding scheme is ASCII, the American Standard Code for Information Interchange, published by the American National Standards Institute. ASCII uses a seven-bit string to signal different English alphanumeric characters. The use of seven bits limits the character set to $2^7=128$ different characters.

b. EBCDIC. IBM increased the number of possible characters to 256 by using an eight-bit coding system known as the Extended Binary Coded Decimal Interchange Code (EBCDIC). Representative values of these codes are shown in Table 1.

TABLE 1

Common Binary Codes

| Character | ASCII | EBCDIC |
|---|---|---|
| A | 100 0001 | 1100 0001 |
| Z | 101 1010 | 1110 1001 |
| 5 | 011 0101 | 1111 0101 |
| etc. | etc. | etc. |

Other data processing systems use different binary coding systems with different numbers of bits, sometimes adding extra bits for error detection/correction.

It should be noted that digital signals may be transmitted between two communicating components via single- or multiple-conductor electrical (or fiber optic) cables. In order to communicate, sending and receiving components must agree upon the format of the signals they exchange. Common signal formats include serial (one bit at a time over a single conductor) and parallel (several bits at a time over multiple-conductor cables). See FIG. 4. It will be appreciated that fiber optic transmission usually involves a serial-format transmission over a fiber optic cable.

Although all signals are bound by the physical limit on transmission speed in any particular medium (and none can exceed the speed of light), signal formats may differ in how frequently they inject or extract data on the communication channel, as defined in their interface specifications. Numerous private, public, and international interface standards exist. Interface standards also include timing considerations and descriptions of associated control signals, such as "ready to send," "ready to receive," etc.

Other standards allow for more complex manipulations of data. It is possible (and commonly practiced) to inject multiple signals on a single communication channel by subdividing time intervals or frequency bands on the communication channel; this technique is generally known as multiplexing. It should also be mentioned that another increasingly common signal manipulation is data compression and decompression according to specific algorithms.

Most modem technical, commercial, and scientific activities simultaneously use a wide variety of digital data sending and receiving devices. These devices include not only computers, but an increasing number of peripherals which now generate digital data such as medical imaging equipment, radars, and voice communications systems. The wide variety of these systems is further increased by the fact that different systems are bought over time, each differing slightly from previous models. Interoperability is highly desirable in order to take advantage of still-useful equipment (collectively known as legacy systems).

The physical and electrical arrangement of components within any facility usually is not permanently fixed. Components are taken off-line for maintenance or repair, new components are added, and old components are removed. Activity missions frequently change, and data processing resources are re-aligned according to the task at hand, sometimes on an hourly basis. For example, a large financial institution may choose to re-align resources to perform end-of-month invoice processing. In contrast, a military facility may choose to disconnect external communication devices in order to process classified data. It is usually cost prohibitive to purchase multiple equipment suites with overlapping capabilities to perform different missions. Realigning resources is more cost effective.

In order to realign components in response to mission changes, i.e., changes in facility usage, the activity may choose to unplug components and re-route the associated cables. Dozens of devices with dozens of input-output (I/O) channels each implies hundreds or potentially thousands of cables. These cables are frequently in crowded under-floor spaces or cable trays, and may need to be cut, spliced, and/or re-manufactured to fit new routes.

Switching is the most cost-effective method for realigning resources. A multiple-interface switch allows an activity to interconnect a wide variety of components while avoiding the need to manually re-route cables. In the discussion which follows, it should be assumed that the overall switching system design requirement specifies point-to-point switching unless the discussion states otherwise.

The most common type of a switch is a mechanical switch. Original point-to-point electrical signal switching equipment included simple multi-pole mechanical switches used for early telegraphy, and patch cables used by operators on early telephone systems. FIG. 5 illustrates a simple single-pole, dual-throw (SPDT) switch. Variants of mechanical signal switches still exist in many modern buildings. For example, although FIG. 5 shows a single communication line on the input side, multi-conductor (i.e., parallel) switches are common. Mechanical switches provide a rugged, relatively inexpensive point-to-point switch path. Mechanical switches are useful where rapid or frequent equipment realignments are not required, or for distributing analog (non-digital) signals such as radar and/or video signals. Because these switches involve mechanical moving parts and contacts, they require periodic maintenance, they are subject to wear and tear, and they are susceptible to eventual failure. Mechanical switches can be remotely controlled (opened and closed) using electrical remote control circuits. In general, mechanical switches are useful in small-scale applications with a limited number of destinations and where limited growth is expected.

It will be appreciated that additional destination poles can be added. Such switches are generally referred to as 1×n or multi-pole switches (where n represents the number of available destinations). They include T-Bar Corporation's T-Bar switches and Purvis Corporation's MultiPort switches. These are depicted schematically in FIG. 6. Notice that it is possible to gang these switches to achieve an increased value of n; FIG. 6 shows an effective 1×3 switch achieved by splitting one of the outputs of the first 1×2 switch. Multi-pole switches up to 1×8 are commonly available.

Another common switch type is a crosspoint switch. It should be mentioned that early crosspoint switches were implemented via a relay design by the Bell Telephone Company for their telephone switching centers. These switches have mostly been replaced by solid state crosspoint switches. Moreover, an electric path between multiple inputs and multiple outputs can be effected using solid-state technology known as crosspoint switching. At the highest level, these electronic switches appear as n×m switches, as shown in FIG. 7. These switches may also be commonly referred to as matrix switches. Examples include the Navy's High-Speed Digital Switch (HSDS)(AN/USQ-62(V)) and Low-Level Serial (LLS) Switch (AN/FSQ-157(V)). HSDS is implemented in several Navy sites in either 256×256 or 1024×1024 configurations. Integrated crosspoint switch circuit elements containing 32×32 switches on a single chip are common. Symmetry is not required; a 64×33 crosspoint switch provides 64 inputs and only 33 possible outputs.

Referring to FIG. 7, it should be noted that although the lines appear to lay across each other and therefore electrically connect, the connection is actually controlled by an AND gate which provides a method for external control. See FIG. 8. An AND Gate is a logical device whose output is 1 only when both inputs are 1. Lacking a 1 signal on the control line, the AND gate will not produce an output and the crosspoint is not connected. It will be appreciated that reconfigurable crosspoint switches require less switch allocation planning than mechanical switches and consume fewer resources per switched channel than mechanical switches, especially when mechanical switches must be ganged.

A variant of the conventional crosspoint switch is the minimized crosspoint switch. The principal problem with crosspoint switches is that the number of required crosspoints grows as the square of the number of input lines. In FIG. 7 above, the simple crosspoint switch for eight input channels and eight output channels requires 8×8, or 64 crosspoints. A simple 100-channel switch requires 10,000 crosspoints, and each crosspoint requires a separate control line. This number can be dramatically reduced by eliminating self-connections and assuming bi-directional (full duplex) communications. FIG. 9 illustrates the eliminated crosspoints within the shaded area achievable using a minimized crosspoint switch. The general equation for the number of required crosspoints in a minimized crosspoint switch with n inputs is:

$$\text{Minimum number of crosspoints} = n(n-1)/2 \qquad (1)$$

The number of physical switches needed to provide, for example, sixteen signal paths can also be minimized by the use of multi-stage switching. Stated another way, crossbar switch size and complexity can be reduced by using intermediate stages. FIG. 10 shows a multi-stage switch (also known as a space division switch). In the exemplary multi-stage switch illustrated in FIG. 10, a virtual N×N (16×16) switch has been created using four 4×2 input crossbars, two 4×4 intermediate stage crossbars, and four 2×4 output crossbars. Instead of having the 16×16=256 crosspoints of a simple crosspoint switch, or the n(n−1)/2=120 crosspoints of a minimized crosspoint switch, this switch uses only 96 crosspoints. The general equation for the number of crosspoints is:

$$\text{Number of crosspoints} = 2kN + k(N/n)^2 \qquad (2)$$

It should be mentioned here that although some reduction in complexity is achieved by staging, blocking is possible when there is contention for one of the intermediate stages. As mentioned above, blocking is a condition where a connection is refused because the switch assets are already being used to connect other devices. In FIG. 11, all eight available intermediate stage channels are used (shown by heavy lines with arrows), indicating that additional connections cannot be made, even though there are free input and output channels. It will be appreciated from equation (2) that adding additional intermediate stages will ease the bottleneck; when the number of intermediate stages (k) equals 2n−1, the switch will not block, as noted by Clos in an article entitled "A Study of Non-Blocking Switching Networks," which article appeared in *Bell System Technical Journal*, Volume 32, pp. 406–424, March 1953. It will also be appreciated that the decision whether or not to add intermediate stages is usually based on total cost, complexity, physical space, and performance requirements.

Referring now to FIGS. 12A and 12B, the concept behind a conventional trunk switch will now be discussed. Referring to FIG. 12A, the illustrated trunk cable provides a heavily loaded system a degree of flexibility by directly connecting ports on two different switches. It should be noted that trunk cables are used when the size of a switch becomes inadequate for user requirements or there are not enough switching assets close enough to the equipment channels which need to be switched. The use of trunk cables consumes available switching ports in static, unswitchable applications. FIG. 12B illustrates the use of a trunk switch. This type of switch is used to allow a path to equipment that is not directly accessible from another switch. Like trunk cables, the use of trunk switches is cost-prohibitive. Again, this type of switching arrangement usually is the result of expanding switching requirements beyond their intended maximum requirements.

Packet switching is a widely used alternative to point-to-point switching. Although communication via local and wide-area computer networks (LANs and WANs) has grown in popularity in the past several years, such networks do not offer a complete solution to the point-to-point switching problem. Most networks handle long-distance communications by using a process of packet switching in which larger messages are broken up into transmittable portions (packets), several layers of header data are added, and the message (data) proceeds through a series of intermediate destinations until its final destination is reached. FIG. 13 shows a typical packet switching network. Points A and M could represent opposite ends of an office (LAN) or offices in separate cities hundreds of miles apart (WAN).

It will be appreciated that data packets may be buffered (stored) until intermediate channels are available. Depending on the specific network technology selected, packets may follow different paths to the same destination, such as those shown by the heavier solid lines and the heavier dashed lines connecting A and M. This means that the packets may arrive out of order at the destination, or may simply be lost in transmission. The processor at the destination must collect and inventory packets, remove header data, and then re-assemble and verify the message. In addition, if the network is used by multiple participants, some form of contention arbitration scheme is required. Arbitration implies some form of selection, momentary storage, and delayed transmission of a packet.

Current switching technology has several limitations and disadvantages including:

a. Limited Capacity. Mechanical switches are not adequate for the sheer volume of switched interfaces in modem facilities; the amount of time and labor required to manually re-set a large number of switches is usually prohibitive and error-prone. Mechanical switches also require regular maintenance and are prone to failure;

b. Limited Interface Types. Crosspoint switches usually handle only one interface type (e.g., parallel or serial);

c. Complexity. While modem integrated circuit technology can accommodate thousands of crosspoints, connecting thousands of data and control conductors to a single chip is unreasonably complex and expensive as the number of data and control channels increases. Multi-stage switches allow the use of smaller but more numerous crosspoint switches, but at the cost of possible blocking. Adding sufficient intermediate stages to forestall blocking re-introduces design complexity;

d. Performance Inconsistency. Packet switching over LANs and WANs, while very useful for many purposes, is fundamentally not deterministic in large applications where dynamic traffic loads cause variations in routing, timing, and (in some architectures) possible losses of packets. This method of communication is therefore not useful in data transfer applications where the signal route and elapsed time must be consistent and predictable (such as when the computer system itself is under test);

e. Unmanageable Physical Components. Most current switching designs are not distributable. The physical arrangement of devices is bounded by both the speed of electrical signals and the ability to humanly manage the installation. Equipment layout considerations are further complicated by distance limitations imposed by line losses associated with any purely passive device. If the switch's physical resources are not distributable, they may require a large amount of contiguous space in already crowded and expensive facilities; and f. Procurement Challenges. A single switch of a given capacity, even if available and technically suitable, would most likely be difficult to acquire since the total switching needs of any facility are difficult to predict. A scalable design allows users to purchase adequate resources for current needs while leaving the option open for future system expansion in response to future system needs.

Alternative designs which use combinations of the current technology are also presently available. Several alternative designs are described immediately below. These descriptions also note the problem(s) associated with each alternative design. Table 2 below summarizes the disadvantages of the alternative designs.

TABLE II

Disadvantages of Alternative Designs

| Alternative Design | Disadvantages |
| --- | --- |
| #1: Large Matrix Switch | Separate converters required |
| | Cable congestion |
| | Cable length limitations |
| | Physical size |
| #2: Network Approach | Timing inconsistencies |
| | High latency |
| | Possible lost/out-of-order packets |
| #3: Mixed System | Very difficult logistics |
| | Inefficiencies in trunking |
| | Cable congestion |

Alternative Design No. 1 is simply a large matrix switch. See FIG. 14A. If both electrical and fiber optic signals are to be passed through the same switch, then some form of converters are required. The disadvantages of this design include cable congestion in and around the matrix switch, cable length limitations, and the physical size of the switch. Required converters would introduce a relatively high latency in electrical parallel and fiber optic paths.

Alternative Design No. 2 is a network approach, as illustrated in FIG. 14B. Once again, numerous conversions must be performed in order to access the network. The specific disadvantages of this design include timing inconsistencies, high latency (due to packetization, channel arbitration, and other network management overhead), and possible lost or out-of-order packets. A leading high-speed network transfer protocol, ATM (Asynchronous Transfer Mode), for example, does not guarantee packet delivery.

Alternative Design No. 3 calls for a mixed system of different types of switching, i.e., a multi-layer switch fabric. This is frequently the "real world" system which has evolved in many facilities. As shown in FIG. 14C, this type of system uses several different switches, often of different types, to route signals between and among other serviced equipment and other switches. The switches shown may be matrix switches, mechanical switches, or fiber optic switches, each with its own conversion requirements. The major disadvantages of this system include very difficult logistics, making parts support and maintenance very costly and inefficient; inefficiencies in trunking (using up switch ports), and frequently the same cable congestion problems found in large matrix switches. In addition, converters would be required on all of the serial or parallel ports to make all signal interface formats the same upon entering the switch.

What is needed is a switching system capable of interconnecting a large number of electronic components in a manner which allows the components to function as if they were physically hard wired to one another. Preferably, the functional behavior of the switching system would be such that one device that uses virtually any type of data transfer protocol can be connected to any other device that uses that same data transfer protocol. Advantageously, the functional behavior of the switching system would be such that the switching system would exhibit low latency (achieving a total data transfer delay close to the latency associated with a direct-wired configuration), timing consistency (achieving a latency which is deterministic and predictable), and high signal fidelity (not adding to, deleting from, or altering the signal in any way). What is also needed is a switching system capable of handling multiple signal types up to 10 kilometers (km) apart under the verified control of a single controller.

SUMMARY OF THE INVENTION

Based on the above and foregoing, it can be appreciated that there presently exists a need in the art for a switching system which overcomes the above-described deficiencies. The present invention was motivated by a desire to overcome the drawbacks and shortcomings of the presently available technology, and thereby fulfill this need in the art.

Advantageously, the Multi-Interface Point-to-Point Switching System (MIPPSS) according to the present invention provides the ability to interconnect a large number of electronic components in a manner which allows the components to function as if they were physically wired, i.e., hard wired, together. It should be noted that while each of these qualities may already exist separately in other switching components, MIPPSS is the first switching system which advantageously combines all of these features and attendant advantages within a single design.

An object according to the present invention is to provide a switching system which correctly recognizes a plurality of different signal shapes while disregarding system noise.

Another object according to the present invention is to provide a switching system which accommodates a plurality of different digital encoding techniques.

Still another object according to the present invention is to provide a switching system designed to handle multiple interface types while operating at a bit, and not a word or character, level. Stated another way, the switching system according to the present invention makes no attempt to interpret a bit string; it simply passes the bit string along without modification. Thus, the switching system disregards different data formats or signal manipulations and simply transfers the signal to the appropriate destination as it is presented.

A still further object according to the present invention is to provide a switching system operating under an automated controller and using pre-established configuration definitions so as to permit re-alignment of the switching system in seconds rather than hours or days.

Yet another object according to the present invention is to a provide a switching system which avoids the problems of network or packet-switched systems including the processing delays, overhead, and timing inconsistencies associated with network protocols, while providing the high-fidelity, point-to-point data transfer required in many scientific and technical applications.

Another object according to the present invention is to provide a switching system which rapidly handles a large number of interface protocols, retains low latency which is deterministic and predictable, and maintains high signal fidelity, all within a manageable and budgetable envelope.

An object according to the present invention is to provide a switching system exhibiting multi-interface functional behavior. It should be noted that multi-interface functional behavior connotes that a device that uses virtually any type of data transfer protocol can be connected to any other device that uses that same data transfer protocol. Advantageously, MIPPSS is capable of simultaneously handling various parallel and serial signal formats, at different data rates and different voltage levels, and fiber optic signals. These signals can be of virtually any data type, i.e., communications, images, sensor data, accounting records, and can be used for any scientific, commercial, or military purpose. MIPPSS offers the advantage of using a single system operating under a single controller to provide all switching services for a given facility.

Another object according to the present invention is to provide a switching system exhibiting a data transfer speed approximating that of dedicated copper wire, i.e., a data transfer speed close to the speed which would have been achieved in a direct-wired configuration wherein the total point-to-point delays appear as a fixed length of cable. Stated another way, the switching system according to the present invention overcomes the disadvantages, i.e., inconsistent routing, inconsistent timing, and packet delays (or losses) associated with the overhead of operating a packet-switching network.

Still another object according to the present invention is to provide a switching system exhibiting timing consistency, i.e., a data transfer speed which is deterministic and predictable.

A further object according to the present invention is to provide a switching system exhibiting high signal fidelity, i.e., a switching system which does not add to, delete from, or alter the signal in any way, and/or transparency.

A still further object according to the present invention is to provide a switching system having a distributed design, i.e., each switching unit has the capability of servicing multiple locations and, thus, no single location houses the entire switch system.

A related object according to the present invention is to provide a switching system designed and implemented with standardized units or dimensions to thereby promote flexible use.

A still further object according to the present invention is to provide a switching system wherein the switch size can be increased or decreased in increments of two I/O pairs from a minimum size of two I/O pairs up to a maximum of N I/O pairs of any interface type, where N is a positive integer. Preferably, N is equal to 4096 in the exemplary embodiment discussed below, although N may be much greater than 4096.

Another object according to the present invention is to provide a switching system which automatically locates the quickest (lowest latency) available signaling path and establishes a point to point connection using that path.

An object according to the present invention is to provide a switching system exhibiting a high message throughput in addition to a high transfer speed of raw data. Preferably, the switching system achieves a high message throughput by taking advantage of local switching between adjacent components. A closely related object according to the present invention is to provide a switching system wherein once a transmission path has been established, that transmission path cannot be used to transmit any other signal for the duration of the connection. It should be mentioned that the switching system according to the present invention, by combining the characteristic of local switching and a dedicated path usage, i.e., a path once set stays set, permits messages to be transmitted efficiently without address interpretation required in other switching architectures.

A further object according to the present invention is to provide a switching system wherein each connection is verifiable. In particular, a given switch action advantageously can be validated by sending an electric pulse from the input port to the output port; if the signal is received at the intended output, the connection is valid.

Another object according to the present invention is to provide a switching system exhibiting path selectability, whereby any given path through the switch may be selected via software commands. Preferably, the switching system automatically chooses the switchable path that exhibits the lowest timing delay. As mentioned above, this path, once made, remains fixed until actively released. Advantageously, there are alternate paths that are software selectable.

Yet another object according to the present invention is to provide a switching system exhibiting a non-blocking characteristic, i.e., any signal input can be switched to any signal output. Stated another way, the architecture of the inventive switching system does not inhibit the switching action between the input and output ports.

Still another object according to the present invention is to provide a switching system exhibiting automated control and management functions, e.g, the inventive switching system will locate the quickest (lowest latency) available path and establish a point to point connection. When the first tested path is unavailable (in use or damaged), the system locates the next-lowest latency connection. Preferably, the switching system can also be remotely and rapidly configured/reconfigured under software control. Advantageously, the switching system can be programmed to perform initial, periodic, and on-demand Built-In Test(s) (BIT) to assess switching system function and localize failed components.

A still further object according to the present invention is to provide a switching system with the ability to replace ("hot swap") units, e.g., modules and/or cards, while the switching system is operating.

Moreover, an object according to the present invention is to provide a switching system employing Commercial Off The Shelf (COTS) hardware in redundant modular designs to the maximum extent possible.

These and other objects, features and advantages according to the present invention are provided by a multi-interface switching system, including a plurality of I/O ports coupled to a plurality of respective devices, a switching fabric that selectively delivers each of a plurality of different signals from a selected one of the I/O ports coupled to a sending one of the devices to another selected one of the I/O ports coupled to a receiving one of the devices, to thereby establish respective connections between the sending and receiving devices, wherein the switching fabric provides a fixed, low latency signal path for each connection, whereby the latency of that connection is deterministic and predictable, and a data content of the signal delivered via that connection is not analyzed by the switching fabric, whereby the switching fabric operates in a message-independent manner, and a controller that determines the latency of all possible signal paths that are presently available for each connection to be established, selects the lowest-latency signal path for each connection that it determines is presently available, and then configures the switching fabric to establish the selected signal path for each connection.

These and other objects, features and advantages according to the present invention are provided by a multi-interface switching system, including a plurality of I/O ports coupled to a plurality of respective devices, a switching fabric that selectively delivers each of a plurality of different signals from a selected one of the I/O ports coupled to a sending one of the devices to another selected one of the I/O ports coupled to a receiving one of the devices, to thereby establish respective connections between the sending and receiving devices, wherein the switching fabric provides a fixed, low latency signal path for each connection, whereby the latency of that connection is deterministic and predictable, and a data content of the signal delivered via that connection is not analyzed by the switching fabric, whereby the switching fabric operates in a message-independent manner, and a controller that determines the latency of all possible signal paths that are presently available for each connection to be established, determines the path bit error rate for each of the presently available possible signal paths, then selects the presently available one of the possible signal paths for each connection that satisfies an optimum combination of lowest latency and lowest path bit error rate in accordance with a prescribed algorithm, and then configures the switching fabric to establish the selected signal path for each connection.

These and other objects, features and advantages according to the present invention are provided by a multi-interface switching system, including a plurality of I/O circuitry coupled to a plurality of respective devices, switching circuitry for selectively delivering each of a plurality of different signals from a selected one of the I/O circuitry coupled to a sending one of the devices to another selected one of the I/O circuitry coupled to a receiving one of the devices, to thereby establish respective connections between the sending and receiving devices, wherein the switching circuitry provides a fixed, low latency signal path for each connection, whereby the latency of that connection is deterministic and predictable, and a data content of the signal delivered via that connection is not analyzed by the switching circuitry, whereby the switching circuitry operates in a message-independent manner, and controller circuitry for determining the latency of all possible signal paths that are presently available for each connection to be established, for selecting the lowest-latency signal path for each connection that it determines is presently available, and for then configuring the switching circuitry to establish the selected signal path for each connection.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 12A is a block diagram which facilitates an understanding of the concept of a trunk cable, while FIG. 12B is a block diagram which is useful in understanding the operation of a trunk switch;

FIG. 13 is a high level block diagram of a conventional packet switching network;

FIG. 14A is a block diagram of a conventional, large matrix switch, FIG. 14B is a block diagram of a conventional network, while

FIG. 15A is a high level block diagram of an exemplary configuration of the multi-interface, point-to-point switching system (MIPPSS) while

FIGS. 16A, 16B and 16C illustrate front and side views, respectively, of an exemplary one of the port interface racks (PI Racks) employed in the switching system of FIG. 15;

FIG. 17 is a sectional view of the exemplary PI Rack, which illustrates the available port connections of the PI Rack shown in FIGS. 16A and 16B;

FIGS. 24A and 24B are front and side views, respectively, of a Hub Rack included in the MIPPSS assembly illustrated in FIG. 15;

FIG. 25 illustrates an exemplary configuration of a Hub Controller cage found in the Hub Rack illustrated in FIGS. 24A and 24B;

DETAILED DESCRIPTION OF THE PREFERRED EMBODIMENTS

The Multi-Interface Point-to-Point Switching System (MIPPSS) according to the present invention is a switching system which provides the ability to interconnect a large number of electronic components in a manner which allows the components to function as if they were physically wired, i.e., hard wired, together. The term "Multi-Interface" signifies functional behavior wherein a device using virtually any type of data transfer protocol can be connected to any other device using that same data transfer protocol. The term "Point-to-Point" signifies functional behavior wherein the switching system exhibits: (a) low latency, i.e., a total data transfer delay approximating the delay achievable via a direct-wired configuration; (b) timing consistency, i.e., a latency which is deterministic and predictable; and (c) high signal fidelity, i.e., neither adding to, deleting from, nor altering the data signal in any way. In short, MIPPSS preferably provides the ability to switch a large number of interface protocols, retaining a deterministic and predictable low latency characteristic while maintaining high signal fidelity, all within an easily managed distributed and scalable architecture. MIPPSS advantageously is capable of handling multiple signal types up to 10 kilometers (km) apart under the control of a single controller.

Figure 1:
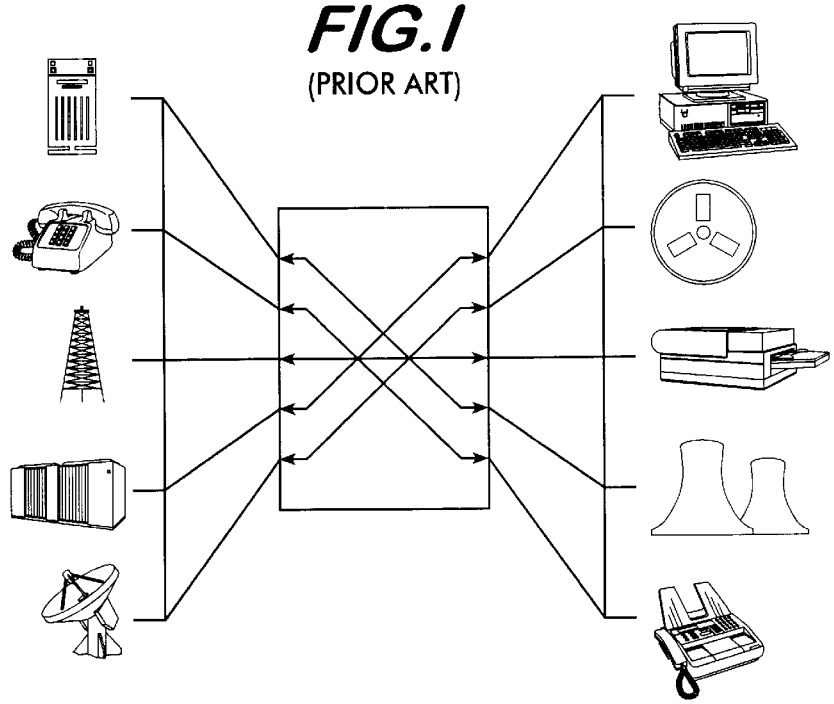
FIG. 1 is a partially block, partially schematic diagram of a multi-interface point-to-point switching system (MIPPSS) according to the present invention.
Figure 2:
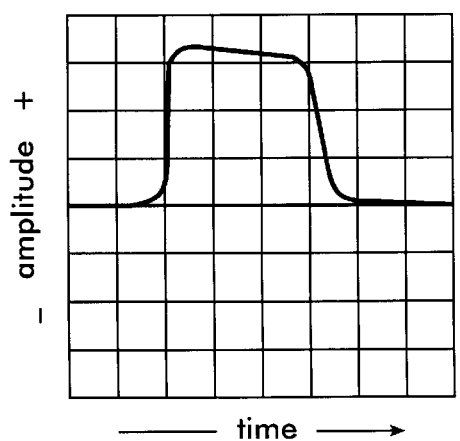
FIG. 2 illustrates the concept of a signal representative of a single bit of digital data.
Figure 3:
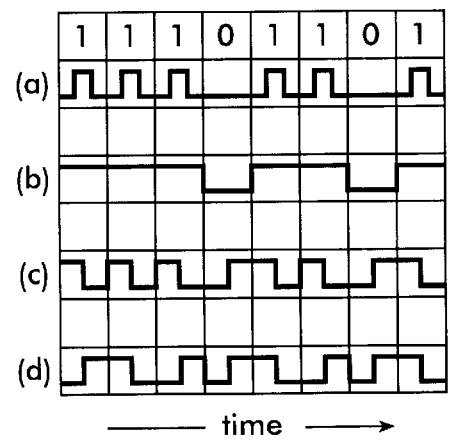
FIG. 3 illustrates a serial bit stream encoded in accordance with a variety of encoding techniques.
Figure 4:
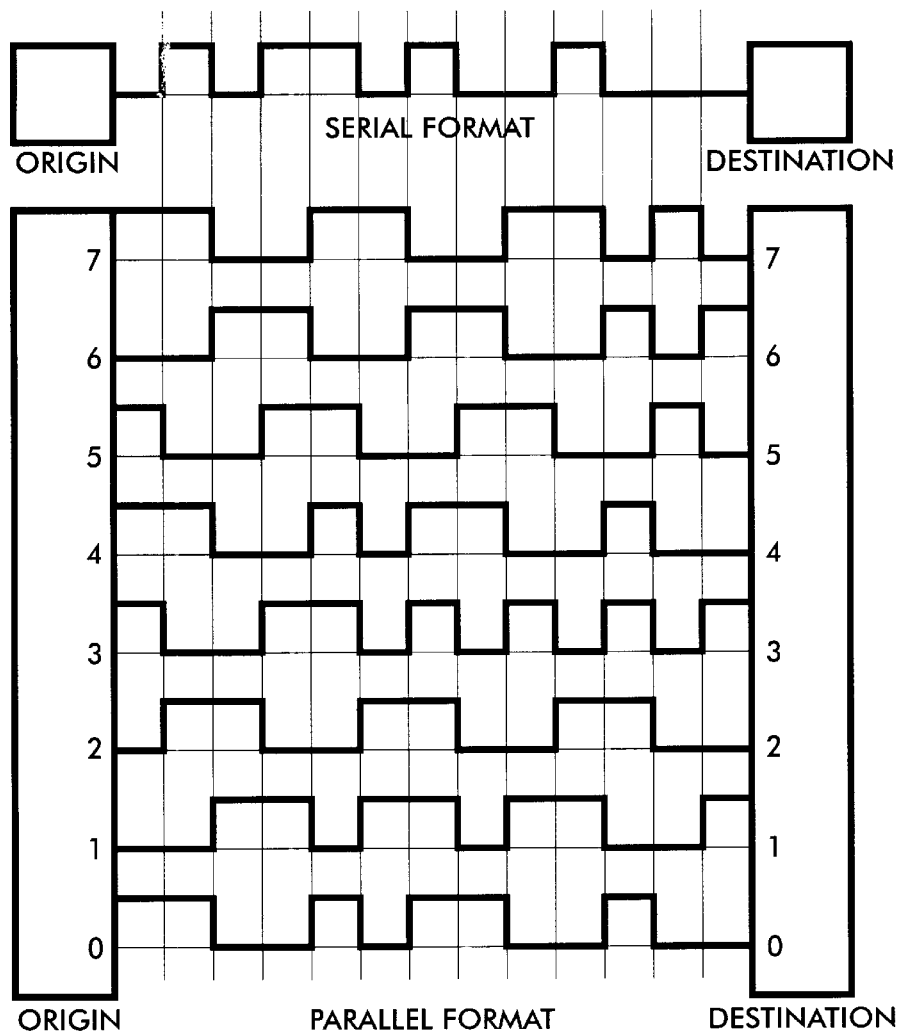
FIG. 4 compares and contrasts serial and parallel data transmission between exemplary devices.
Figure 5:
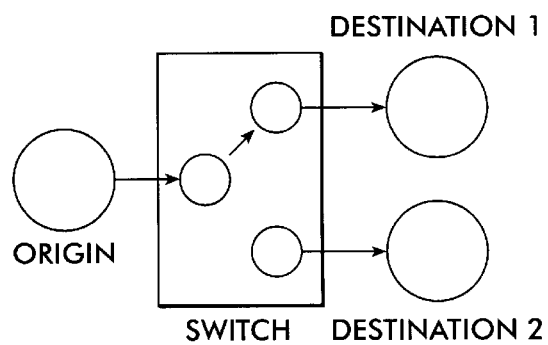
FIG. 5 illustrates the operation of a single pole, double throw switch.
Figure 6:
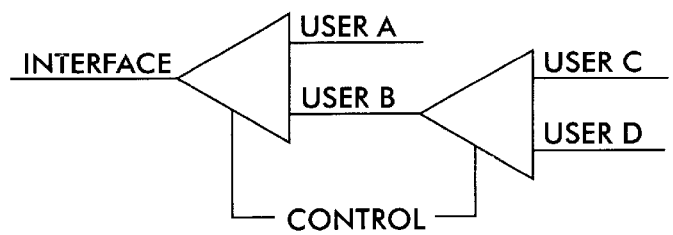
FIG. 6 schematically illustrates a plurality of 1×2 multi-pole switches ganged together to form a 1×3 multi-pole switch.
Figure 7:
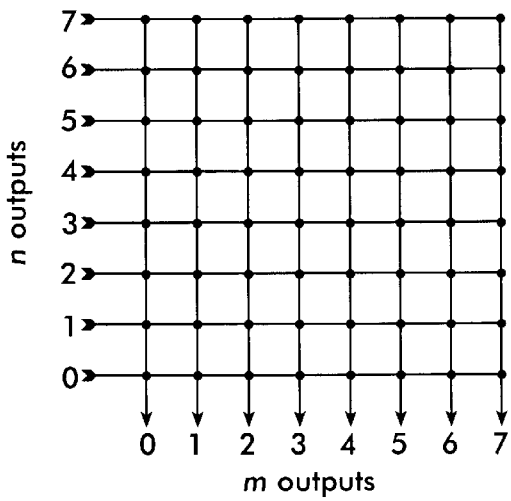
FIG. 7 schematically illustrates an m×n crosspoint switch.
Figure 8:
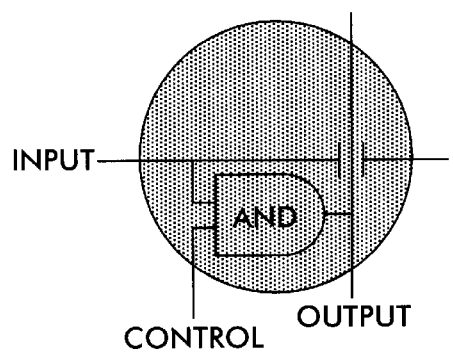
FIG. 8 is a representational view of one of the crosspoints of the crosspoint switch depicted in FIG. 7.
Figure 9:
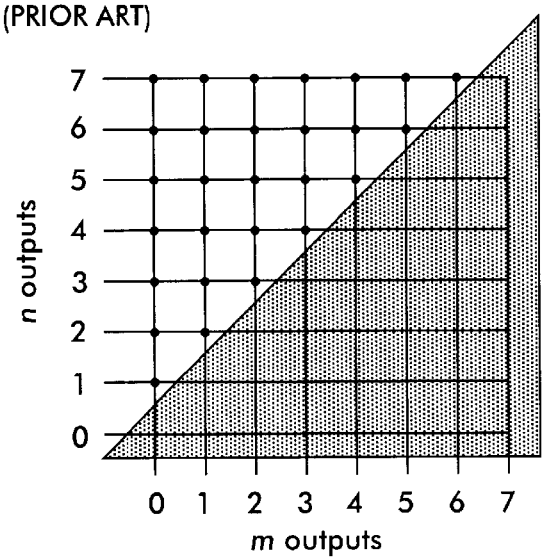
FIG. 9 illustrates the "switch saving" for a minimized crosspoint switch over a conventional crosspoint switch.
Figure 10:
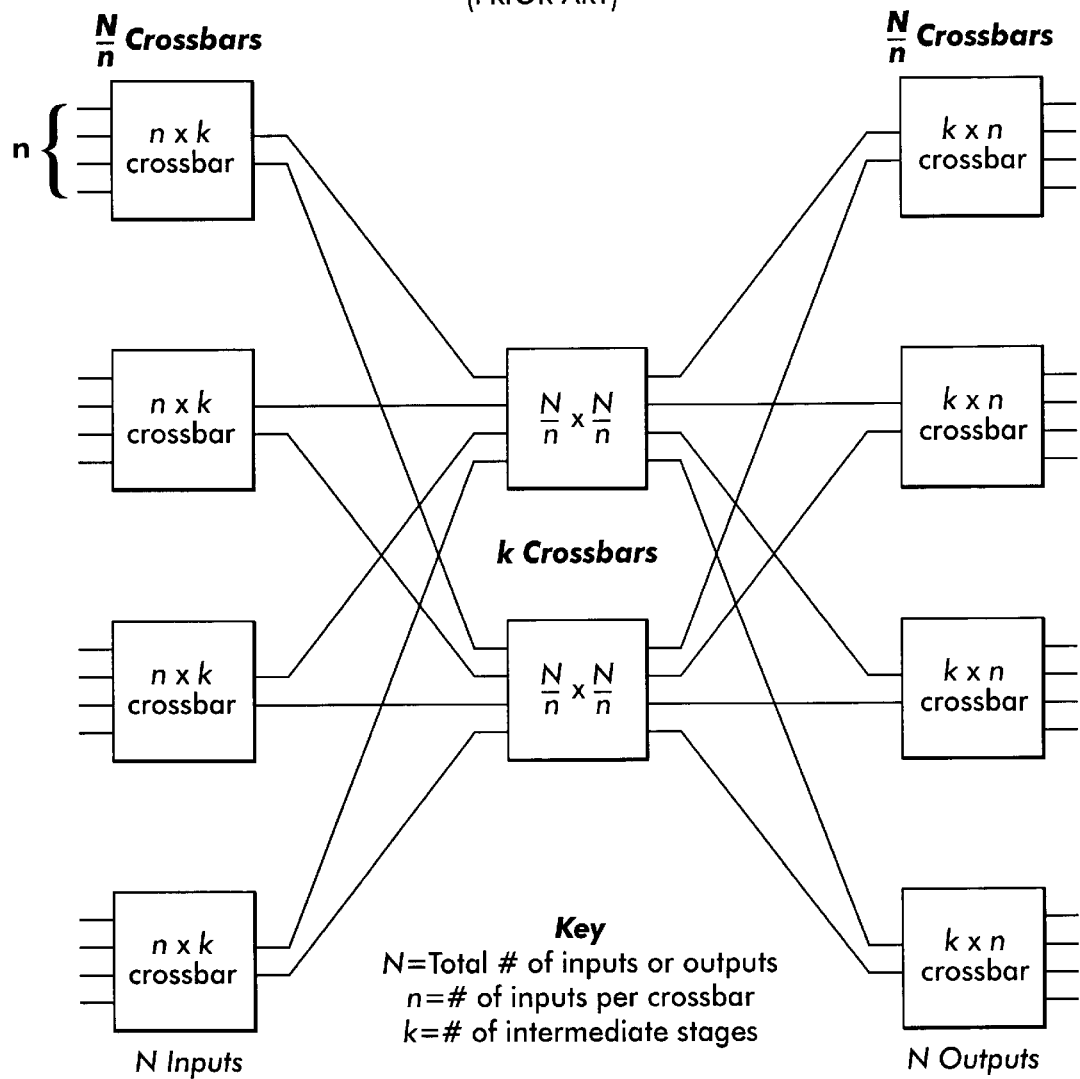
FIG. 10 illustrates a conventional multi-stage (space division) switch.
Figure 11:
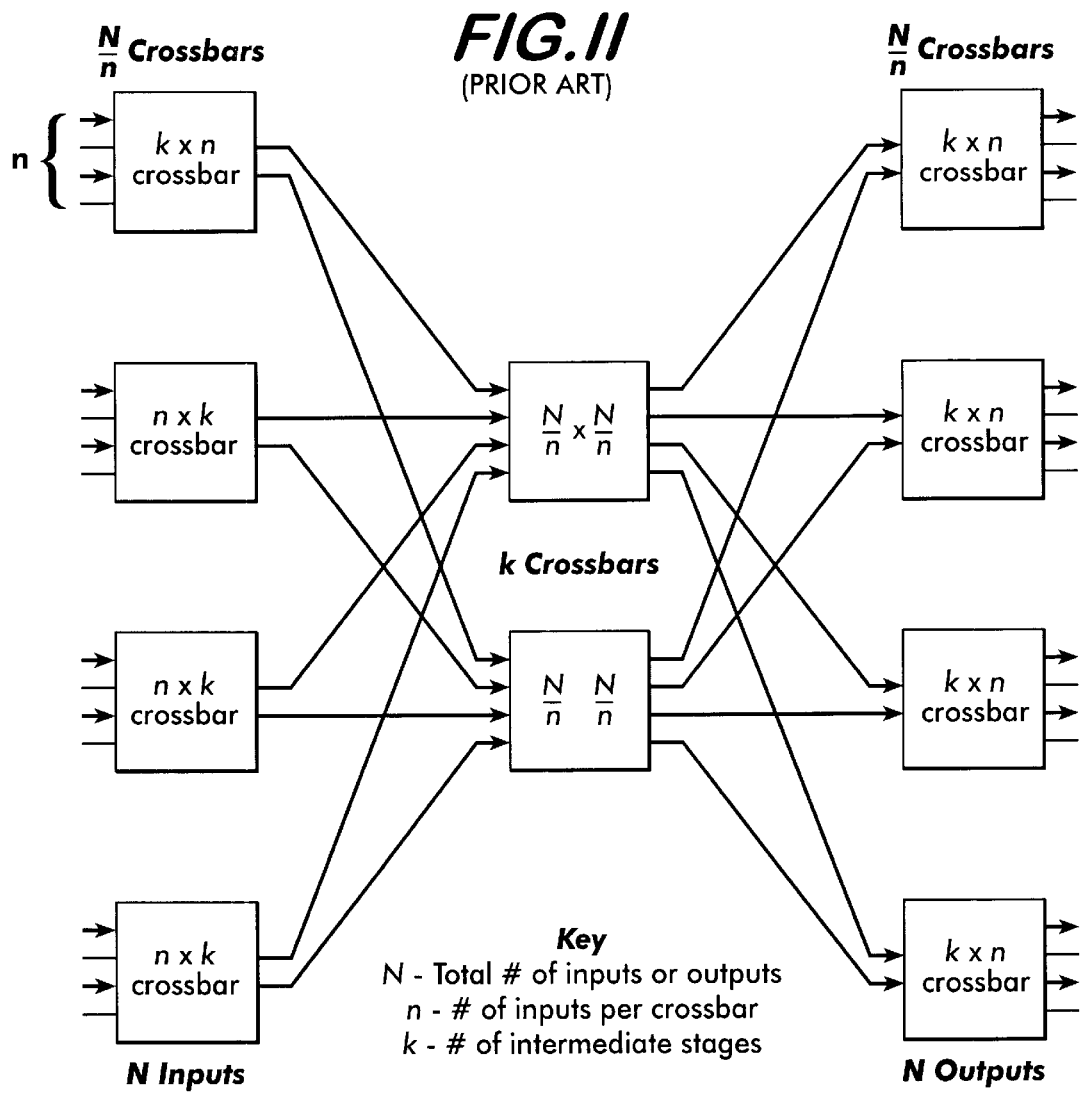
FIG. 11 schematically illustrates the concept of blocking encountered when using a multi-stage switch of FIG. 10.
Figure 12A:
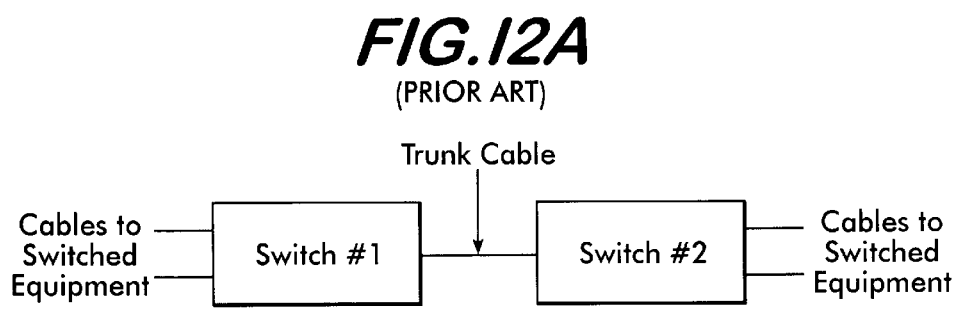
Figure 14B:
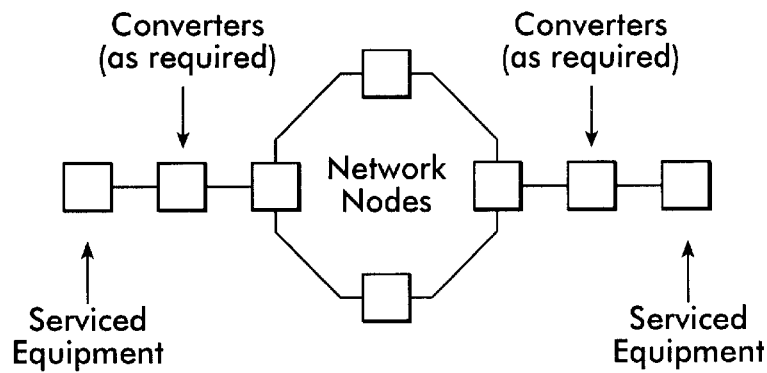
Figure 14C:
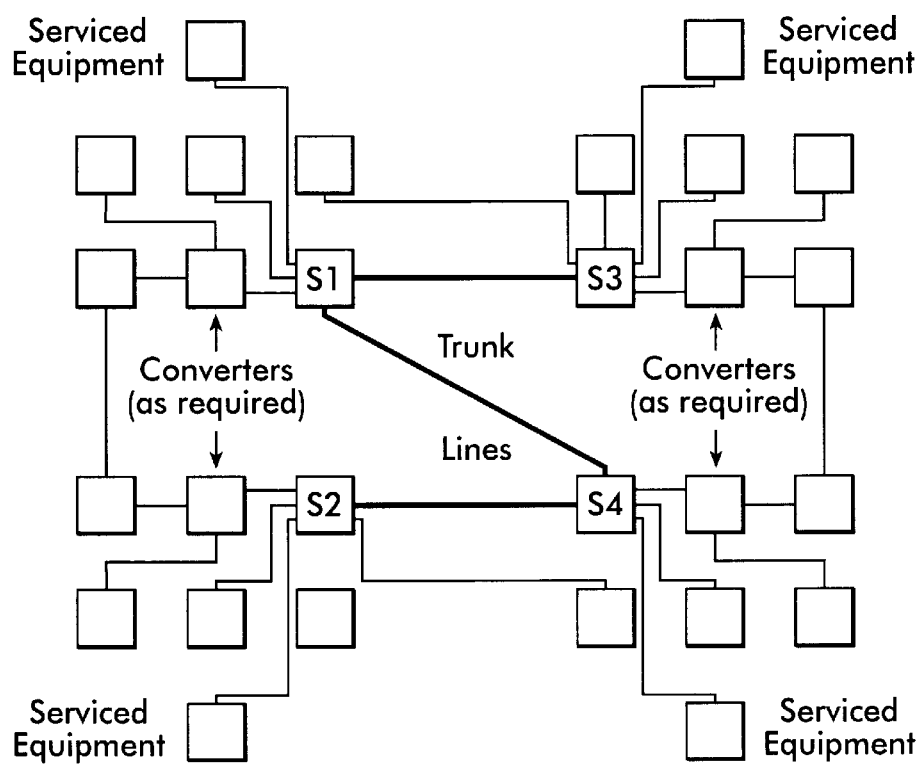
FIG. 14C is a block diagram of a switching system formed from a plurality of unrelated and unconnected components.
Figure 15B:
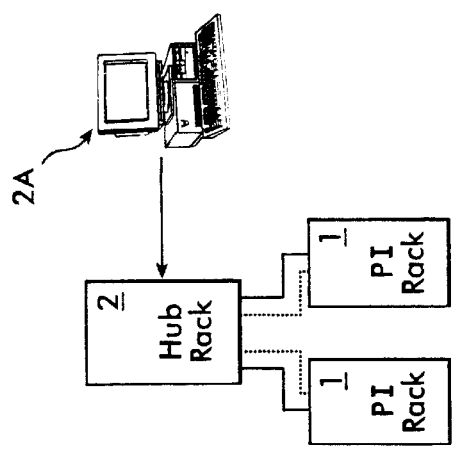
FIG. 15B is a high level block diagram illustrating the connection between selected components of the MIPPSS to a unified control computer (UCC) according to the present invention.
Figure 15A:
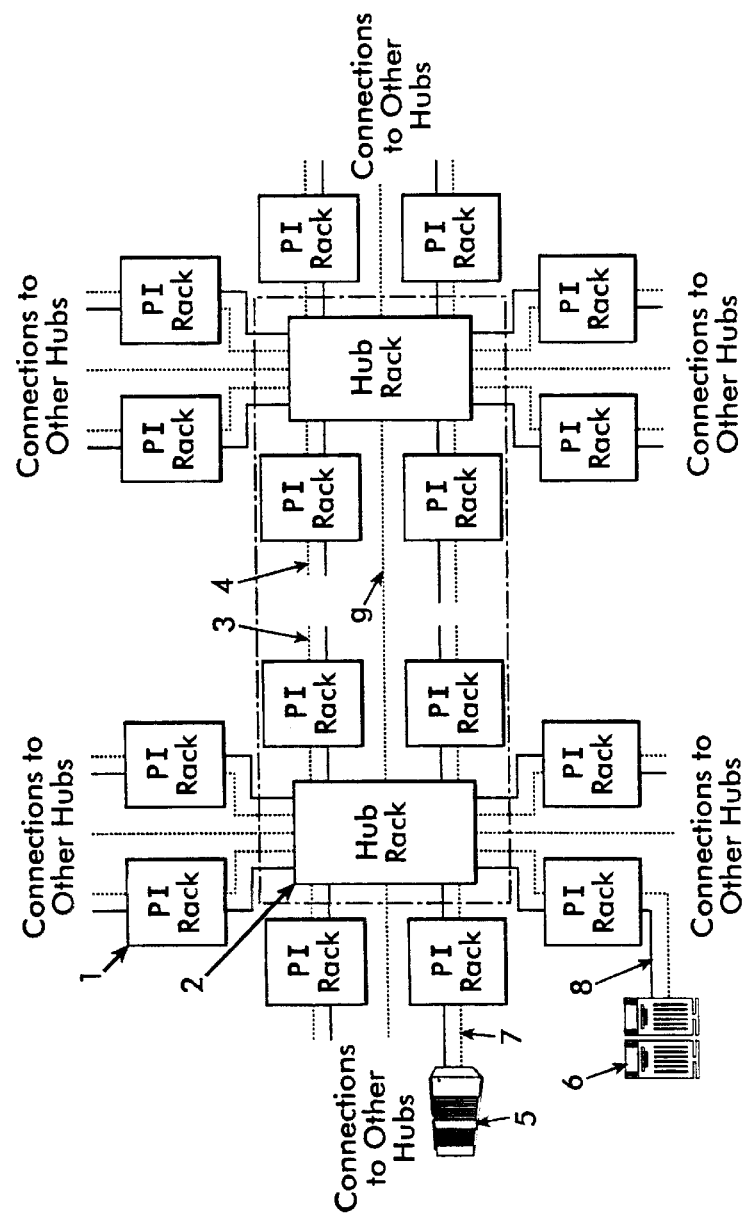

An exemplary configuration of MIPPSS according to the present invention is illustrated in FIG. 15A, wherein MIPPSS advantageously is formed from multiple units which can be categorized into two basic types: Port Interface Racks (PI Racks) 1 and Hub Racks 2, which collectively constitute the switch fabric. Connections among the MIPPSS various racks advantageously are accomplished using either Fiber Optic MIPPSS Interconnections 3 or Electrical MIPPSS Interconnections 4. Connections to User Equipment 5 or User Systems 6 are preferably accomplished either via Fiber Optic User Equipment/System Cables 7 or Electrical User Equipment/System Cables 8, depending on the user equipment or system configuration. It should be mentioned that Hub-to-Hub communications are effected via a Hub-to-Hub Data/Control Communications Cable Assembly 91/92.

Still referring to FIG. 15A, it should also be mentioned that while a Hub Rack 2 with a full complement of 8 PI Racks 1 comprises a non-blocking 512×512 switching system, a prototypical MIPPSS, which is shown within the shaded area as a pair of Hub Racks 2 and 4 PI Racks 1 and which is it is not fully populated, constitutes a 256×256 system. If the prototype MIPPSS were expanded to 1024× 1024, it is a non-blocking switch for up to 512×512 via any one hub, but exhibits limited blocking above 512×512 or at any time signals go through both of the installed hubs. It should be noted that portions of MIPPSS are expandable, subject to system control capabilities. It should be mentioned that the MIPPSS need not establish only one-to-one connections. Preferable, MIPPSS includes the capability to transfer data from one input port to a predetermined number of output ports simultaneously, thus exhibiting a broadcast functionality, particularly for NTDS Type A and Type B signals. This broadcast functionality advantageously permits the MIPPSS to communicate data, e.g., time of day and navigation data, which data can be used by many system recipients simultaneously.

It should be mentioned here that a fiber optic extender module 300 advantageously can be connected to a selected PI Rack 1 to permit input/output of multiple data signal types from components located remote, e.g., greater than one kilometer, from the bulk of the MIPPSS. Extender module 300 will be discussed in greater detail below.

Referring to FIG. 15B, the Hub Rack 2 interfaces with a unified control computer (UCC) 2a via either RS-232 or Ethernet (TCP/IP) formats at a minimum of 19200 baud using X-ON/X-OFF protocol to control the serial data flow. More specifically, the Hub Rack 2 communicates with the UCC 2a over two types of ports, i.e., four Ethernet ports and up to five RS232 ports, advantageously are included in the HUB Controller Cage 23, which is discussed in greater detail below. It should be noted that for maintenance purposes, Local Maintenance Terminals (LMTs) or PI Rack Diagnostic Terminal 17 (See FIG. 22.) can be attached to any PI Cage 13, as discussed in greater detail below. A maximum of ten PI Rack Diagnostic Terminals 17 may be active at any one time. The Ethernet and RS232 limits are the maximum number of physical ports of these devices that are available on the HUB Controller. The limitation on the PI Rack Diagnostic Terminal 17 is due to resource allocation in the operating software. Eight PI Rack Diagnostic Terminals 17 are provided for a fully populated HUB Rack 2, one per PI Rack 1.

The communication required for controlling and interfacing with the MIPPSS is defined by a series of software commands having a command syntax facilitating the exchange of messages among MIPPSS components, i.e., the PI Racks 1 and the associated Hub Rack 2, and the UCC 2a. The commands and responses advantageously are in the general form:

Command cc[,param] . . . [,param]<CR>
   Format:
      Where: cc is the two-character command, and
           [,param] . . . [,param] are the parameters required for the command -continued

| | | |
|---|---|---|
| Response Format: | C[,msg. text] | Command completed successfully without further user attention. |
| | W,[nnnnn,]msg. text | Command completed with some explanation for possible user action. (Message text limited to 130 characters) |
| | F,[nnnnn,][xxxxx, . . . yyyyy]msg. Text | Command failed as indicated by the message text. (Message text limited to 130 characters) |
| Where: | nnnnn is the 5-digit number of the first port identified in the command being responded to, and | |
| | xxxxx through yyyyy are all ports in error relative to the message | |

It should also be mentioned that all commands must be terminated with a <CR>. As previously mentioned, the RS-232 port uses X-ON/X-OFF protocol to control the serial data flow. Communications between the MIPPSS components and the UCC 2a are classified as Operational Mode or Diagnostic Mode. Error Mode messages are provided to facilitate operation of the MIPPSS.

Operational Mode of the MIPPSS is used to set, break, and display connections. More specifically, the operational mode Commands transmitted, in an exemplary case, from the UCC 2a to the Hub Rack 2 are used to set, break, and display connections. The UCC 2a sends a two-character command followed by required parameters to the Hub Rack 2. The Operational Mode commands available for control of the Data Transfer System are listed in the following table.

TABLE III

Operational Mode Command List

| Command | Function |
|---|---|
| BP | Break Port |
| BR | Break Range |
| DF | Display Free |
| DL | Display Linked |
| DM | Diagnostic Mode |
| DP | Display Port |
| DT | Display Type |
| EM | Error Message |
| GM | Get Error Message |
| HE | Help |
| LM | Link Many |
| LP | Link Port |
| LS | Link Special Low Latency |
| OM | Operational Mode |
| PF | Print ofF |
| PN | Print oN |
| RS | ReSet |
| SC | Set Communications |
| VF | Verify path ofF |
| VN | Verify path oN |
| VP | Verify Path |

From the table immediately above, it will be appreciated that the command set includes the ability to link individual ports, link one port to several ports, verify connections between ports, break individual connections between ports, break a specified range of connections between ports, display the interface type of a port, and reset communications between the MIPPSS components and the UCC 2a. Also included is the ability to change to the Diagnostic Mode or Error Message Mode of operation. It should also be mentioned that all linking commands include an automatic breaking of previously established connections.

In the Operational Mode, several different forms of self-diagnostic testing are performed. For example, each PI Rack 1 advantageously performs one or more built-in test(s) (BIT) that automatically and periodically check the status of the components within the PI Rack and report any faults to the UCC and system operator while the MIPPSS is online. In other words, the MIPPSS uses built-in test (BIT) routines and other diagnostic functions to automatically resolve and log failures down to the lowest replaceable unit (LRU) at the cabinet level.

Additionally, the MIPPSS advantageously includes Built-In Test Equipment (BITE) to facilitate accurate fault detection. Moreover, all of the PI Racks 1, all of the Hubs 2, and the UCC 2a cooperate to automatically resolve and log failures down to the component level 99% of the time and, preferably, automatically log failures down to the LRU level 98% of the time. After fault detection, amplifying data such as error messages shall be provided to the UCC 2a. These fault messages shall indicate the both the test(s) conducted and the failure(s) incurred. All failures shall be reported to the UCC 2a.

The Diagnostic Mode is used to perform hardware maintenance functions. More specifically, Diagnostic Mode allows the users to access MIPPSS component resources at the hardware level to perform diagnostics on the MIPPSS. The diagnostic tests can interrupt any background test in progress by requesting a resource being used by the background test. It should be noted that a diagnostic test cannot interrupt a link made in Operational Mode by stealing its resources. However, it should also be noted that certain commands can effect the operation of individual operational links and even the entire system. Therefore, a password is required when entering the Diagnostic Mode if the diagnostic commands affecting linked resources are to be used. The Diagnostic Mode is invoked by any port of UCC 2a from the Operational Mode using the DM command, as indicated above. Once in this mode, the UCC 2a is enabled on that port to issue any of the diagnostic mode commands as well as any of the operational commands. It should be noted that when any port of the UCC 2a is in Diagnostic Mode, the HUB Controller keyboard 244 (Discussed below.), and any of the PI Rack Diagnostic Terminals 17 (See FIG. 22.) are enabled. Similarly, any port of the UCC 2a having used the password with the DM command enables the HUB Controller keyboard 244 and any of the PI Rack Diagnostic Terminals 17 to use password protected commands. It should be mentioned that the structure of the commands and responses in the Diagnostic Mode are substantially identical to the Operational Mode.

It should be mentioned that in those cases where isolation down to the LRU cannot be made automatically from the UCC with the system operating, fault isolation shall be accomplished from the UCC using operator-initiated diagnostics with the MIPPSS operating or in stand-by. In the event of a UCC failure, fault isolation advantageously can be accomplished at the equipment rack via a local maintenance port with the MIPPSS operating or in stand-by.

Moreover, the Diagnostic Mode is terminated for an individual port when Hub Rack Cage 13 receives an OM command or Control Z (^Z) over that port from the UCC 2a. On return to the Operational Mode, the Hub Rack Cage 13 will break all links created by this port during the diagnostic session, except those explicitly linked for extended diagnostic test. No other Hub Rack Cage 13 operating parameters will be changed, i.e., EM port designation, or RS232 communication port settings. When the last port of the UCC 2a returns to Operational Mode, all of the PI Rack Diagnostic Terminals 17 and the HUB Controller Keyboard 244 will be disabled and all of their respective links will be broken.

The commands available to any port of the UCC 2a in the Diagnostic Mode are all of the operational mode commands listed in the table above plus those listed in the following table.

TABLE IV

Diagnostic Mode Command List

| Command | Function |
|---|---|
| BD | Break Diagnostic |
| DH | Display patH |
| FR | display Failed Resources |
| IR | I2c Read |
| IW | I2c Write |
| LD | Link Diagnostic |
| OM | return to Operational Mode |
| RR | Register Read |
| RT | Reset local maintenance Terminal |
| RW | Register Write |
| SR | System function Read |
| ST | Self Test |
| SW | System function Write |

It should be mentioned that Diagnostic Mode commands provide the MIPPSS with the ability to send (or cease sending) output to a connected printer, display ports in a selected range that are currently linked and what ports they are linked to, display free ports in a selected range (ports that are currently not linked), display port status (linked or not linked) in a selected range, set the MIPPSS to UCC communication settings for any of the five remote communication ports, check to determine whether an individual port is responding, display online help information, initiate self-testing, and Reset communications between the MIPPSS and the UCC. Also included is the ability to change to Operational Mode or Error Message Mode. It should be mentioned here that Error Message Mode is used to designate the port for reporting synchronous and asynchronous error messages from the MIPPSS to the UCC. This command is only available on the RS-232 ports.

Referring now to FIGS. 16A and 16B, each Port Interface Rack (PI Rack) 1 includes a PI Rack Enclosure 11, a PI Rack Equipment Mounting Rack 12, a PI Rack Diagnostic Terminal 17 (which can be plugged into either PI Cage 13), and a PI Rack AC Power Module 113. Moreover, each PI Rack 1 can include up to two PI Cages 13, up to two Cooling Modules 14, up to two DC Power Modules 15, and up to 32 Port Connector Panels (serial or parallel) 16, as shown in FIG. 17. Additional details of these components are discussed below.

Preferably, the PI Rack Enclosure 11 also includes Removable Air Filters 111 on the door (not shown) to filter air drawn into the rack by the Cooling Modules 14. AC Power is provided to the PI Rack via the PI Rack Main AC Power Cable 114. The PI Rack Enclosure 11 also can be equipped with a PI Rack Exhaust Fan 112 to vent warm air through the top of the enclosure. The front rails of the PI Rack Equipment Mounting Rack 12 are recessed 4" back from the front of the PI Rack Enclosure 11 to allow room for cable routing and cable connections to each PI Cage 13.

Advantageously, all of the interconnecting cables between the PI Rack 1 and the Hub Rack 2, which will described in greater detail below, or between different PI Racks 1 enter into the PI Rack Enclosure 11 through the bottom and are connected to the fronts of the PI Cages 13. All cables to and from serviced equipment beneficially can enter the PI Rack Enclosure 11 from the rear and be connected to the Port Connector Panels 16. The Port Connector Panels 16 can be mounted on the rear of the PI Rack Enclosure 11 to allow access to the Port Connector Panel External Interface Connectors 161 for easy cable connection and disconnection. As mentioned above, each PI Rack 1 can contain up to 32 Port Connector Panels 16 with each Port Connector Panel 16 providing four connections for two complete (full duplex) I/O channels.

Each PI Cage 13 can connect to up to 16 of the (adjacent) Port Connector Panels 16 via 16 PI Cage to Port Connector Panel Cable Harnesses 18. See FIG. 18A. Each PI Cage 13 can also be connected to the Hub Rack 2 via 32 PI Cage to Hub Rack Cable Assemblies 31. In PI Racks 1 with two PI Cages 13, there are three additional PI Cage to PI Cage Cable Assemblies 19 connecting together the two PI Cages 13. In addition, the PI Cage 13 in each PI Rack 1 advantageously can be connected to its corresponding Cooling Module 14, DC Power Module 15, and, when the PI Cage is the top PI Cage 13, to the PI Rack Exhaust Fan 112 via the Monitor Cable Harness 138.

Still referring to FIGS. 16A and 16B, each Cooling Module 14, DC Power Module 15, and the PI Rack Exhaust Fan 112 preferably is connected to the PI Rack AC Power Module 113 via AC Power Cable Assemblies 1131. Moreover, the PI Rack AC Power Module 113 can be connected to two other AC Power Modules 113 in the MIPPSS assembly using an AC Power Module Communications Cable Assembly 1132.

Figure 18A:
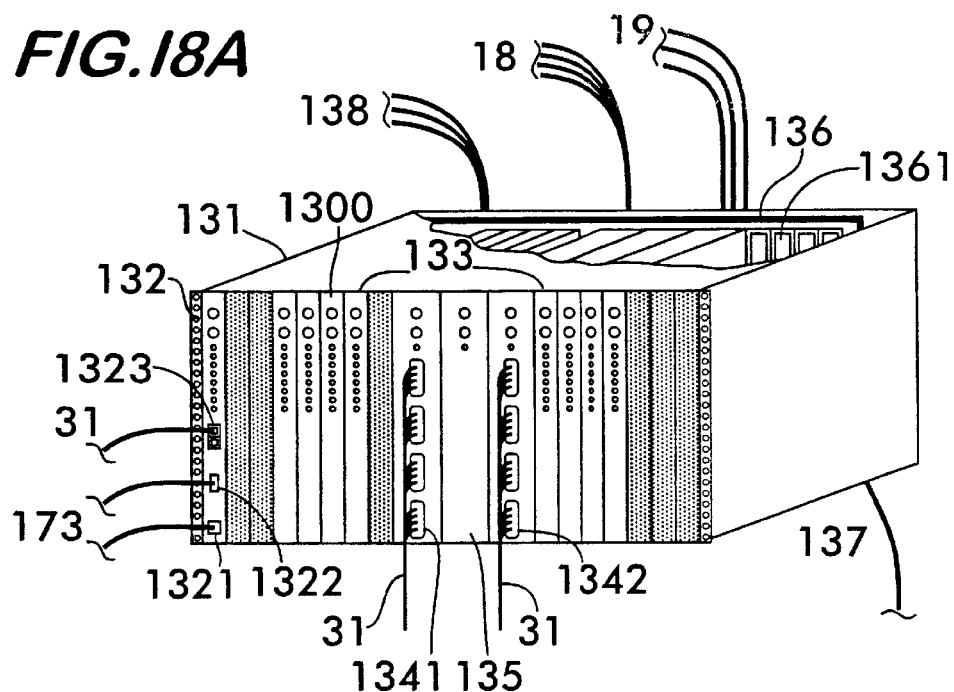
FIG. 18A is a more detailed illustration of a PI Cage, which fits within the PI Rack depicted in FIGS. 16A and 16B

As illustrated in FIG. 18A, each PI Cage 13 advantageously includes a PI Cage Enclosure 131, an Extender Bridge 132, a Fiber Optic Transmit (FOT) Router Board 1341, a Fiber Optic Receive (FOR) Router Board 1342, and a PI Cage Router Board 135, and advantageously can include up to eight Quad PI Boards 133. The PI Cage Enclosure 131 preferably is configured with flanges to facilitate the mounting of the enclosure to the PI Rack Equipment Mounting Rack 12. Power to each of the modules and communications between modules is provided via the Multi-Layer Backplane 136. Preferably, power to the Multi-Layer Backplane 136 is provided by the DC Power Module 15 (See FIGS. 16A and 16B.) via the PI Cage Power Cable Assembly 137. It should be mentioned that each board slides into the PI Cage 13 from the front such that the board's rear interface connectors advantageously can engage with a Backplane Mating Receptacle 1361 on the Multi-Layer Backplane 136. Each Quad PI Board 133 is connected to two Port Connector Panels 16 via two of the PI Cage to Port Connector Panel Cable Harnesses 18, i.e., ribbon cables, through the Multi-Layer Backplane 136. The PI Cage to Port Connector Panel Cable Harness 18 advantageously connects to a PI Cage to Port Connector Panel Cable Assembly Backplane Connector Adapter 1362, which is located on the rear of the Multi-Layer Backplane 136.

It should also be mentioned that each FOT or FOR Router Board, 1341 or 1342, is connected to a Hub Rack 2 via 16 of the PI Cage to Hub Rack Cable Assemblies 31 connected to the front of the boards. The PI Cage to Hub Rack Cable Assemblies 31 mate to a receptacle connector internal to the unit. Moreover, each FOT Router Board 1341 is connected to the FOT Router Board 1341 contained within the other PI Cage 13 in the PI Rack 1 via one of the PI Cage to PI Cage Cable Assemblies 19. Thus, each FOR Router Board 1342 is connected to the FOR Router Board 1342 contained within the other PI Cage 13 in the PI Rack 1 via one of the PI Cage to PI Cage Cable Assemblies 19. The PI Cage Router Board 135 preferably is connected to the PI Cage Router Board 135 contained within the other PI Cage 13 in the PI Rack 1 via one of the PI Cage to PI Cage Cable Assemblies 19. All three of the PI Cage to PI Cage Cable Assemblies 19 connect to PI Cage to PI Cage Cable Assembly Backplane Connector Adapters 1363 located on the rear of the Multi-Layer Backplanes 136.

The front of the Extender Bridge 132 in the PI Cage 13 advantageously can include a PI Rack Diagnostic Terminal Cable Assembly Receptacle 1321, which permits connection to the PI Rack Diagnostic Terminal 17 via the PI Rack Diagnostic Terminal Interface Cable Assembly 173. In an exemplary case, the PI Rack Diagnostic Terminal Cable Assembly Receptacle 1321 can be a RJ-11 connector, although most other connector types advantageously can be used. In addition, the front of the Extender Bridge 132 has a second PI Rack Debugging Cable Receptacle 1322 for debugging via a standard RS-232 cable. The Extender Bridge 132 preferably is connected to the Hub Rack via a single PI Cage to Hub Rack Cable Assembly 31, which advantageously mates to the Hub to Extender Bridge Connector Receptacle 1323 on the front of the Extender Bridge 132.

It will be noted from FIGS. 16A, 16B, and 18A that the Extender Bridge, in an exemplary case, can be connected to its associated Cooling Module 14, DC Power Module 15, and Rack Exhaust Fan 112 (in the case of the top PI Cage) via the Monitor Cable Harness 138 through the Multi-Layer Backplane 136. It will also be noted that the Extender Bridge 132, the Quad PI Boards 133, the FOT/FOR Router Boards 1341/1342 and the Cage Router Board 135 all have front-mounted Light Emitting Diode (LED) Indicators 1300 that display the status of the respective unit. Advantageously, the Extender Bridge 132, the Quad PI Boards 133, the FOT/FOR Router Boards 1341/1342, and the PI Cage Router Board 135 can all be disengaged from, and re-inserted into, the Multi-Layer Backplane 136 while power is applied to the PI Cage 13 and the PI Cage 13 is operating.

It should be noted that several board-level components of the MIPPSS have the ability to be removed and replaced while the remainder of the PI Rack 1 in which they are housed remains energized and operational. This feature is known as hot swap. The boards which preferably include this feature are the Extender Bridge 132, Port Interface Boards 133, the Fiber Optic Transmit and Receive (FOT/FOR) router boards 1341/1342, and the Port Interface Cage Router Board 135.

Figure 18B:
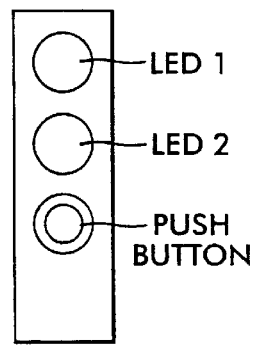
FIG. 18B is an exemplary illustration of features of the PI Racks which facilitate hot swapping of components for maintenance.

As illustrated in FIG. 18B, a maintenance technician initiates the sequence to replace a board by placing the hot swap switch in the remove position and depressing a button located on the front panel. This signals the Hub Controller Cage 13 to cease transmissions through this board and log it out of service in the database. When the board is ready for removal, a green LED located on the front panel of the board will illuminate, indicating that UCC 2a has granted permission for its removal. At this point, the board may be safely removed and replaced. When replacing a board, the technician reinserts the board in the system, places the hot swap switch in the insert position and depresses a button located on the front panel. This signals the Hub Controller Cage 13 to test the board and log it in-service in the database.

Figure 19:
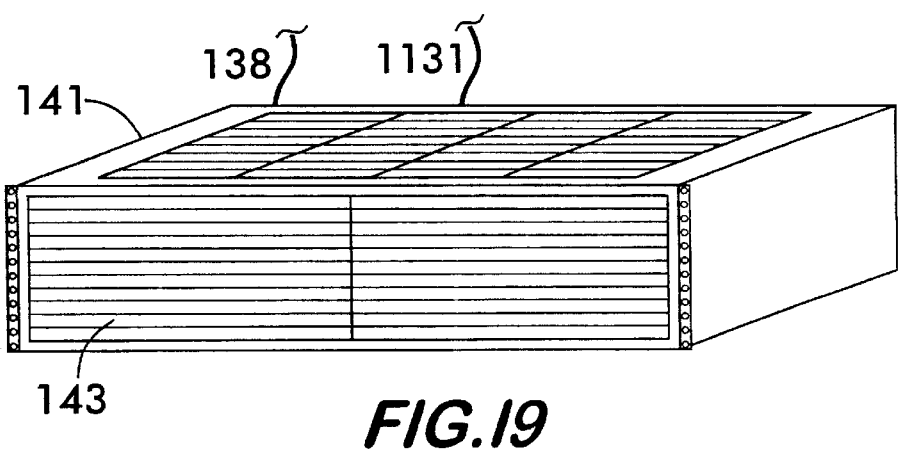
FIG. 19 illustrates one possible configuration of a cooling module which can be employed to reduce the ambient temperature in the PI Rack illustrated in FIGS. 16A and 16B.

Referring to FIG. 19, the Cooling Module 14 employed in the preferred embodiment is a packaged blower assembly manufactured by McLean Engineering (Model 4EB3500CDP). One Cooling Module 14 advantageously can be used to reduce the ambient temperature in each PI Cage 13 in the PI Rack 1. As shown in FIG. 19, the Cooling Module 14 includes a Cooling Module Enclosure 141 and two Blowers 142 (not shown). The Cooling Module Enclosure 141 is configured with flanges to facilitate the mounting of the enclosure to the PI Rack Equipment Mounting Rack 12. The Blowers 142 draw air through Intake Ducts 143 in the front of the module and exhaust it out the top of the module. The Cooling Module 14 preferably is connected to the Extender Bridge 132 of the PI Cage 13 cooled by the module via the Monitor Cable Harness 138. The Monitor Cable Harness 138 connects to the rear of the Cooling Module 14. Power to the Cooling Module 14 is provided by the PI Rack AC Power Module 113 (See FIG. 16B.) via an AC Power Cable Assembly 1131.

Figure 20:
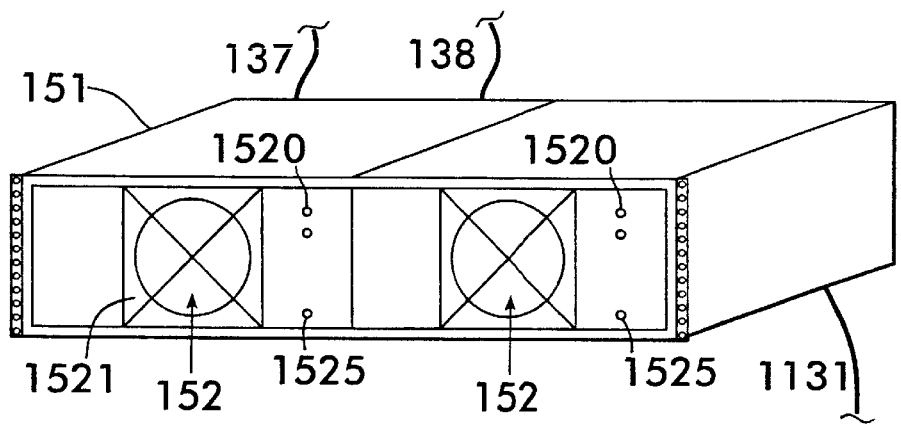
FIG. 20 illustrates one possible configuration of a DC power module which can be employed to provide DC power to various components in the PI Rack illustrated in FIGS. 16A and 16B.

Referring now to FIG. 20, the necessary DC power for the PI Rack 13 advantageously can be provided by a DC Power Module 15, which, in an exemplary case, is a commercially available power source manufactured by HC Power, Inc. The complete module includes two removable Power Supplies 152 (model HS1214-C1658) in a Power Module Enclosure 151 (model PS2-C1658). Each removable Power Supply 152 preferably contains an integrated Fan 1521 and removable Filter 1522 (not shown). One DC Power Module 15 is used for each PI Cage 13 in the PI Rack 1. Together these components provide, in an exemplary case, a 1250 Watt multiple-output, redundant, hot-swap power system. It should be mentioned that each Power Supply 152 operates on AC voltage (supplied via the AC Power Cable Assembly 1131) and can provide multiple DC outputs at different voltage levels. The input AC power is 90–264 VAC; each Power Supply 152 delivers four outputs rated at 5 VDC @ 180 Amps, 15 VDC @ 10 Amps, 12 VDC @ 4 Amps, and 12 VDC @ 4 Amps. The DC Power Module 15 provides power to the PI Cage 13 via the PI Cage Power Cable Assembly 137. The outputs are floating and can be referenced as required.

It should also be mentioned that the front panel of each Power Supply 152 is equipped with LED Indicators 1520 indicating the status of the unit, potentiometer adjustments for adjustment of all output voltages, and Voltage Monitor Jacks 1525 which can be used to monitor various module voltages or obtain status information. Additional status information is provided at the rear of each Power Supply 152 via a Power Supply Monitor Receptacle 1526 (including remote sense, power fail, remote enable, and DC-OK are via a 25-pin D-sub connector (not shown)). The Power Module Enclosure 151 is configured to house two identical Power Supplies 152 and operate in parallel to provide redundant power, allowing one of the two power supplies to be removed or inserted while power is still supplied by the second unit. As illustrated in FIG. 20, the Power Module Enclosure 151 is configured with flanges to facilitate the mounting of the enclosure to the PI Rack Equipment Mounting Rack 12. The DC Power Module 15 is connected to the Extender Bridge 132 of the PI Cage 13 powered by the module via the Monitor Cable Harness 138, which mates to the Monitor Terminal Block 1527 (not shown) located on the rear of the DC Power Module 15.

Figure 21A:
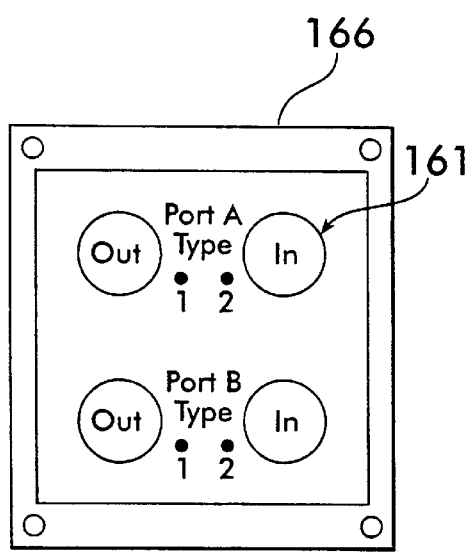
FIGS. 21A and 21B collectively form a more detailed illustration of the Port Connector Panel illustrated in FIG. 17.
Figure 21B:
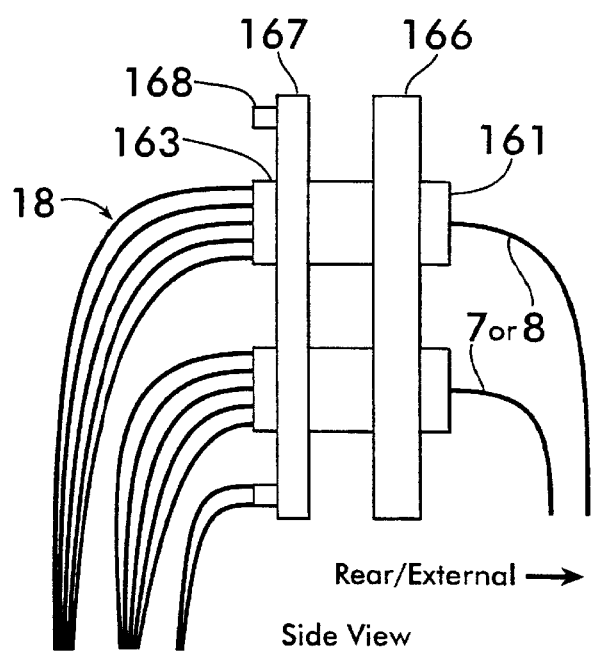

As illustrated in FIGS. 21A and 21B, each of the Port Connector Panels 16 (Previously discussed in connection with FIG. 17.) includes External Interface Connectors 161, a mounting plate 166, and a Transceiver Board 167. Advantageously, each Port Connector Panel 16 connects to a Quad PI Board 133 via a PI Cage to Port Connector Panel Cable Harness 18. The Port Connector Panels 16 are preferably mounted on the rear of the PI Rack Enclosure 11 using the Mounting Plate 166. It will be appreciated that a Port Connector Panel 16 connects to user devices or systems via Fiber Optic User Equipment/System Cables 7 or Electrical User Equipment/System Cables 8 and the External Interface Connectors 161. Each Port Connector Panel 16 is capable of interfacing with at least one signal type. In some cases, a single Port Connector Panel 16 advantageously can be interfaced with more than one signal type, in which case LEDs are provided to indicate the Port Connector Panel 16 configuration.

Each Port Connector Panel 16 provides four External Interface Connectors 161 for two complete (full duplex) I/O channels. In an exemplary case, these channels can be NTDS Type A, is B, D, or E. It should be mentioned that, due to hardware constraints, each Port Connector Panel 16 is generally configured to handle two channels of either Types A/B, Type D, or Type E. An LED on parallel versions of the Port Connector Panel 16 indicates whether the channel is Type A or Type B. Additionally, Serial Port Connector Panels 16 are labeled either Type D or Type E; they are not interchangeable. Preferably, the Input connectors on parallel Port Connector Panels 16 can be M81511/01EF-01P1 connectors while the output connectors can be M81511/01EF-01P2 connectors. Moreover, the input connectors on Type D Port Connector Panels 16 are preferably Amphenol P/N 34475-4003 where the center conductor and shield are isolated and the armor is tied to cabinet ground. In addition, the input connectors on Type E Port Connector Panels 16 advantageously can be Trompeter P/N CBBJ82, i.e., circuit board mounting equivalent of BJ80, where the center conductor and inner shield are isolated and the outer shield is tied to cabinet ground. It should be mentioned that alternative types of connectors advantageously can be employed in the MIPPSS assembly, and that all such alternative configurations are considered to be within the scope of the present invention.

Preferably, the Transceiver Board 167 illustrated in FIG. 21B can be used to establish a connection to the PI Cage 13 (See FIGS. 16A and 16B.) via the PI Cage to Port Connector Panel Cable Harness 18 and the Port Connector Panel Internal Interface Connector 163. Power to the Transceiver Board 167 is provided by the PI Cage 13 via a Port Connector Panel Power Cable Assembly 168.

Figure 22:
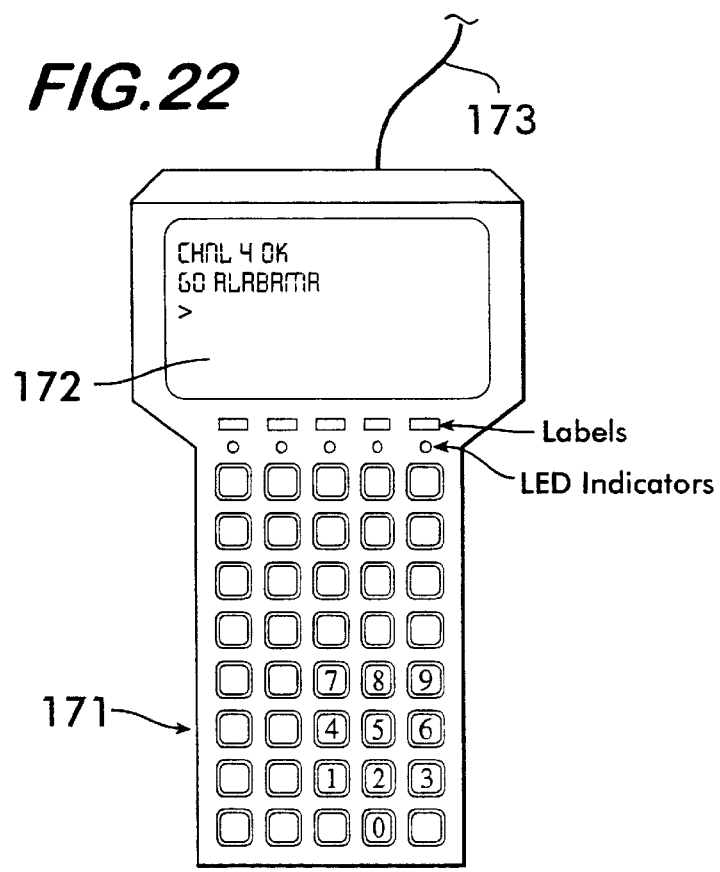
FIG. 22 illustrates an exemplary form of a PI Rack Diagnostic terminal which advantageously can be employed in connection with the PI Rack illustrated in FIGS. 16A and 16B.

Referring to FIG. 22, the PI Rack Diagnostic Terminal 17 advantageously can be a commercially available hand-held terminal (QSI Model QTERM-II T826 in the exemplary embodiment). It has a 40-key Alpha-numeric Keypad 171, four-line by 20-character supertwist Liquid Crystal Diode (LCD) screen 172, and a PI Rack Interface Cable Assembly 173. The PI Rack Diagnostic Terminal Interface Cable Assembly 173 mates to the PI Rack Diagnostic Terminal Cable Assembly Receptacle 1321 on the front of each Extender Bridge 132. It will be appreciated that the PI Rack Interface Cable Assembly 173 has sufficient length to allow the terminal to be used from either the front or the rear of the PI Rack 1.

Figure 23:
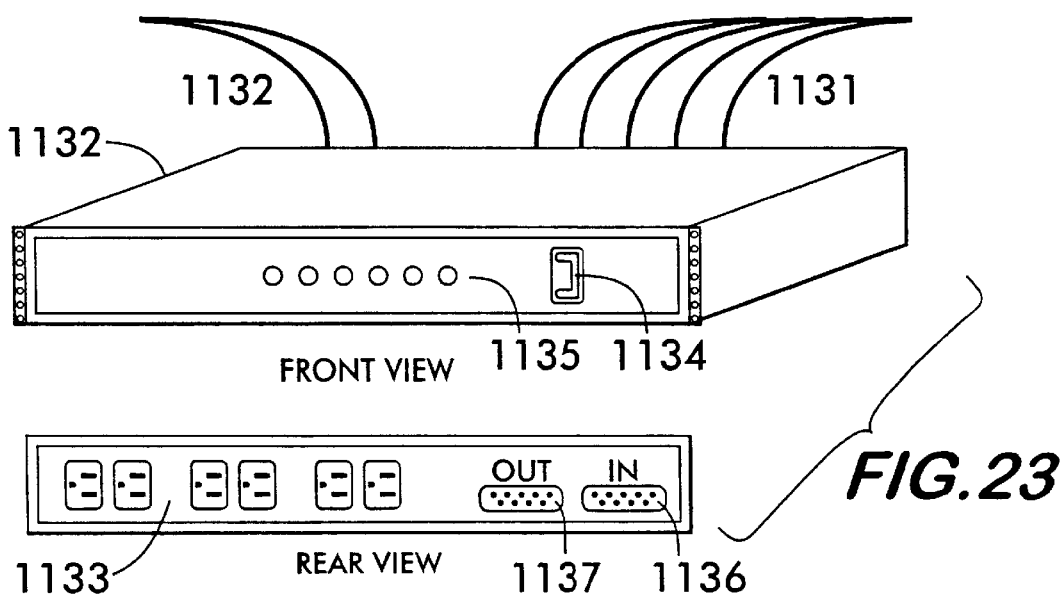
FIG. 23 illustrates an exemplary form of the PI Rack AC Power Module installed in the PI Rack of FIGS. 16A and 16B.

As shown in FIG. 23, the PI Rack AC Power Module 113 preferably includes an AC Power Module Enclosure 1138, which is configured with EIA-standard 19-inch flanges to facilitate the mounting of the enclosure to the PI Rack Equipment Mounting Rack 12. The PI Rack AC Power Module 113 is a modified commercially available device available from Pulizzi Engineering (Model IPC 3302). One PI RackAC PowerModule 113 is used to supply power to each PI Rack 1. It should be noted that the PI Rack AC Power Module 113 provides multiple AC outlets 1133 on the rear panel to supply power to other components in the PI Rack 1 via AC Power Cable Assemblies 1131. These components include, but are obviously not limited to, both Cooling Modules 14, both DC Power Modules 15, and the PI Rack Exhaust Fan 112. Advantageously, the PI Rack AC Power Module 113 contains a Main Circuit Breaker 1134 for total rack overload protection. Each outlet is protected by a Thermal Breaker 1135 with push-button reset on the front panel. Spike and surge protection is also included in each PI Rack AC Power Module 113.

It should be mentioned that the PI Rack AC Power Module 113 advantageously can be remotely controllable via an AC Power Module Input Communications Port 1136 via two DB9 RS 232 ports, one for output and one for input, and can remotely control another AC Power Module 113 via an AC Power Module Output Communications Port 1137. It should also be mentioned that each communications port is connected to a communications port in another AC Power Module 113/213 in a daisy chain fashion via an AC Power Module Communications Cable Assembly 1132. Resident firmware is configured so that when power is lost, the firmware will disconnect power output so that when power comes back on, the power module will stay off. Preferably, power in the module remains off until actively re-started by either depressing the local reset button on the Thermal Breaker 1135 or receiving a remote command via the AC Power Module Input Communications Port 1136.

It should be mentioned that the extender module 300 advantageously can be fabricated from components substantially similar to those used in building up the PI Rack 1. It will be appreciated that these components include an extender module enclosure, an ac power module, up to two extender module cages, up to two cooling modules, up to two dc power modules, and up to 32 port connector panels (serial or parallel). In light of the detailed description of corresponding components within the PI Racks, additional details of these components will not be provided.

Turning now to another portion of the MIPPSS, each Hub Rack 2 advantageously includes a Hub Rack Enclosure 21, a Hub Equipment Mounting Rack 22, a Hub Controller Cage 23, a Hub Controller Personal Computer (PC) 24, a Time-Sampled Bridge 25, two Cooling Modules 14, two DC Power Modules 15, and a Hub Rack AC Power Module 213, as shown in FIGS. 24A and 24B.

Addressing the auxiliary components first, the Hub Rack Enclosure 21 includes Removable Air Filters 211 on the door (not shown) to filter air drawn into the rack by the Cooling Modules 14. AC Power is provided to the Hub Rack via the Hub Rack Main AC Power Cable 214. The Cooling Modules 14 and DC Power Modules 15 used in the Hub Rack 2 are identical to those used in the PI Rack 1 and their descriptions are not repeated below. The Hub Rack AC Power Module 213 is slightly different from the PI Rack AC Power Module 113. Additional details of the Hub Rack components are provided in the following sections.

From FIGS. 24A and 24B, it will be appreciated that the front rails of the Hub Equipment Mounting Rack 22 are recessed approximately four inches back from the front of the Hub Rack Enclosure 21 to allow room for cable routing and cable connections to the Time-Sampled Bridge 25. All of the interconnecting cables between the Hub Rack 2 and PI Racks 1 or between Hub Racks 2 enter into the Hub Rack Enclosure 21 through the bottom and are connected to the front of the Time-Sampled Bridge 25 or the Hub Controller Cage 23. The Hub Controller Cage 23 is connected to the Extender Bridge 132 of each PI Cage 13 via a PI Cage-to Hub Rack Cable Assembly 31.

Preferably, the Time-Sampled Bridge 25 is connected to each FOT and FOR Router Board 1341/1342 of each PI Cage 13 via 16 PI Cage to Hub Rack Cable Assemblies 31. The Hub Controller Cage 23 advantageously can be connected to the Time-Sampled Bridge 25 via the Hub Controller Cage to Time-Sampled Bridge Cable Assembly 26. The Hub Controller Cage 23 is connected to the Hub Controller PC 24 via the Hub Controller Cage to Hub Controller PC Cable Assembly 27. Moreover, the Hub Controller Cage 23 is preferably connected to both of the Cooling Modules 14, both of the DC Power Modules 15, and to the Hub Rack Exhaust Fan 212 via the Hub Rack Monitor Cable Harness 238.

Each Cooling Module 14, DC Power Module 15, as well as the Hub Rack Exhaust Fan 212, are connected to the Hub Rack AC Power Module 213 via AC Power Cable Assemblies 1131 (not individually labeled in FIG. 24B). The Hub Rack AC Power Module 213 can be connected to at least two other AC Power Modules 113/213 in the MIPPSS using an AC Power Module Communications Cable Assembly 1132.

Referring to FIG. 25, each Hub Controller Cage 23 includes, but is not limited to, a Hub Controller Cage Enclosure 231, up to 16 Hub to PI Cage Interface Units 232, up to four Hub to Hub Interface Units 233, and the Hub Controller PC Interface Unit 234. The Hub Controller Cage Enclosure 231 is configured with flanges to facilitate the mounting of the enclosure to the Hub Equipment Mounting Rack 22. Power to each of the units and communications between units is provided via a Multi-Layer Backplane 235. Each unit slides into the Hub Controller Cage 23 from the front such that the unit's rear interface connectors engage with a Backplane Mating Receptacle 2351 on the Multi-Layer Backplane 235. Each Hub to PI Cage Interface Unit 232 is connected to one of the PI Cages 13 in the system via a PI Cage to Hub Rack Cable Assembly 31. The PI Cage to Hub Rack Cable Assembly 31 mates to a receptacle connector located on the front panel of the Hub to PI Cage Interface Unit 232. The Hub to PI Cage Interface Unit 232 located in the leftmost position of the Hub Controller Cage Enclosure 231 is connected to the Time-Sampled Bridge 25 via the Hub Controller Cage to Time-Sampled Bridge Cable Assembly 26 through the Multi-Layer Backplane 235. The Hub Controller to Time-Sampled Bridge Cable Assembly 26 mates to a Hub Controller to Time-Sampled Bridge Cable Assembly Backplane Connector Adapter 2355 located on the rear of the Multi-Layer Backplane 235. In addition, the Hub to PI Cage Interface Unit 232 located in the leftmost position of the Hub Controller Cage Enclosure 231 is connected to both Cooling Modules 14, both DC Power-Modules 15, and the Hub Rack Exhaust Fan 212 via the Hub Rack Monitor Cable Harness 238 through the Multi-Layer Backplane 235. The Hub Rack Monitor Cable Harness 238 mates to a Hub Rack Monitor Harness Cable Assembly Backplane Connector Adapter 2358 located on the rear of the Multi-Layer Backplane 235.

It should be mentioned that each Hub to Hub Interface Unit 233 is connected to a Hub to Hub Interface Unit 233 in a different Hub Rack 2 via a Hub-to-Hub Data/Control Communications Cable Assembly 91/92, which mates to a receptacle located on the front panel of the Hub to Hub Interface 233. The Personal Computer Interface Unit 234 is connected to the Personal Computer (PC) 24 via the Hub Controller Cage to PC Cable Assembly 27 and a front-mounted PC Interface Receptacle 271 on the card. Preferably, the Hub to PI Cage Interface Units 232, the Hub to Hub Interface Units 233, and the Personal Computer Interface Unit 234 all have front mounted LED indicators 2300 that display the status of the unit. The Hub to PI Cage Interface Units 232 and the Hub to Hub Interface Units 233 can be disengaged from the Multi-Layer Backplane 235 while power is applied to the Hub Controller Cage 23 and the Hub Controller Cage 23 is operating. It should be mentioned that power to the Multi-Layer Backplane 235 is provided by the DC Power Module 15 via the Hub Controller Cage Power Cable Assembly 239.

Figure 26:
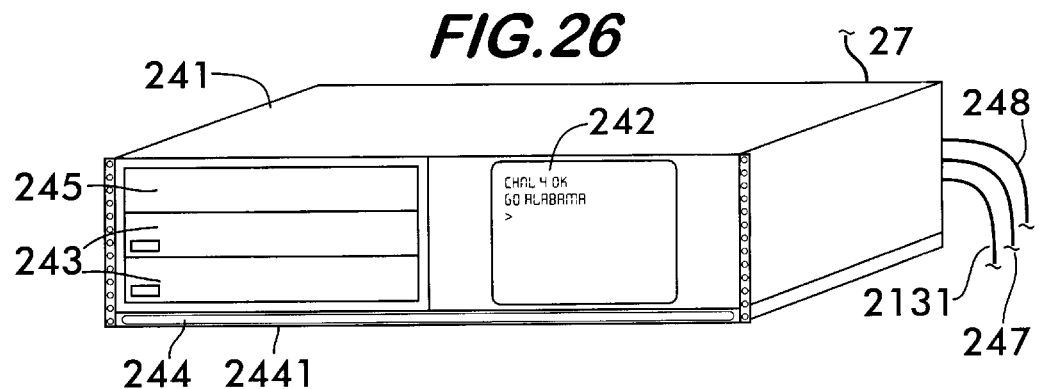
FIG. 26 illustrates one exemplary arrangement of a Hub Controller Personal Computer (PC) which can be deployed in the Hub Rack depicted in FIGS. 24A and 24B.

Referring now to FIG. 26, the Hub Controller Personal Computer (PC) 24, in an exemplary embodiment, is manufactured by Industrial Computer Source (Model 8630P-RV-10). The Hub Controller PC 24 includes, in an exemplary minimum configuration, a Hub Controller PC Enclosure 241, an integrated 9-inch VGA color Video Monitor 242, two 1-GB removable, hot-swappable Hard Drive Modules 243, 5-slot ISA, 2-slot PCI backplane, a slide-out Keyboard 244, a 166 MHz Pentium-based Central Processing Unit (CPU) 245, and assorted electronics. The Hub Controller PC 24 is also outfitted with a 3Com EtherLink III network adapter (Model 3C509BC), a four-channel serial communications adapter, and Windows device driver (Model WINCOMM4).

As should be understood from the discussions above, the Hub Controller PC Enclosure 241 and the slide-out Keyboard Tray 2441 are configured with flanges to facilitate the mounting to the Hub Equipment Mounting Rack 22. The Hub Controller PC 24 advantageously can be connected to the Hub Controller Cage via the Hub Controller Cage to Hub Controller PC Cable Assembly 27. The Hub Controller Cage to Hub Controller PC Cable Assembly 27 mates to a connector receptacle located on the rear of the Hub Controller PC 24. Preferably, two control cables provide communication with higher-level switching control hardware; the Ethernet Switching System Control Cable 247 and the RS-232 Switching System Control Cable 248. The Hub Controller PC 24 draws AC power from the Hub Rack AC Power Module 213 via the AC Power Cord 2131.

Figure 27:
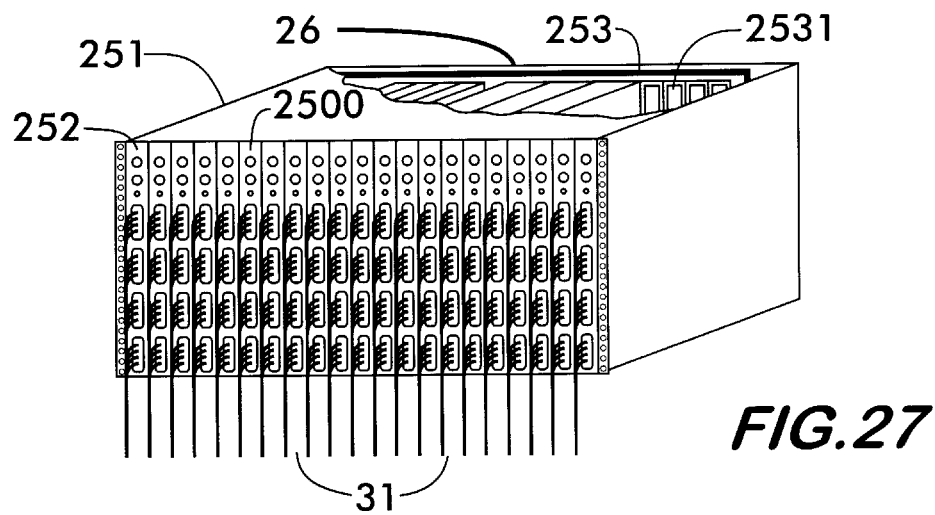
FIG. 27 illustrates a Time-Sampled Bridge Cage employed in the Hub Rack pictured in FIGS. 24A and 24B.

The Time-Sampled Bridge Cage 25 illustrated in FIG. 27 preferably includes a Time-Sampled Bridge Cage Enclosure 251 and up to 17 Time-Sampled Bridge Boards 252. The Time-Sampled Bridge Enclosure 251 is configured with flanges to facilitate the mounting of the enclosure to the Hub Equipment Mounting Rack 22. Power to each of the units and communications between units is provided via a Multi-Layer Backplane 253. Each Time-Sampled Bridge Board 252 slides into the Time-Sampled Bridge Cage 25 from the front such that the unit's rear interface connectors engage with a Backplane Mating Receptacle 2531 on the Multi-Layer Backplane 253. More importantly, each Time-Sampled Bridge Board 252 is connected to the FOT Router Board 1341 and the FOR Router Board 1342 of up to 16 PI Cages 13 via PI Cage to Hub Rack Cable Assemblies 31. The PI Cage to Hub Rack Cable Assemblies 31 enter the front of the Time-Sampled Bridge Board 252 and mate to receptacles located internal to the unit. In addition, the Time-Sampled Bridge Board 252 located in the leftmost position (slot 1) of the Time-Sampled Bridge Cage 25 is connected to the Hub Controller Cage via the Hub Controller to Time-Sampled Bridge Cable Assembly 26 through the Multi-Layer Backplane 253 via an adapter located on the rear of the Multi-Layer Backplane 253. The Time-Sampled Bridge Boards 252, in an exemplary embodiment, have front-mounted LED indicators 2500 that display the status of the unit. It should be noted that a Time-Sampled Bridge Board 252 can be disengaged from the Multi-Layer Backplane 253 while power is applied to the Time-Sampled Bridge Cage 25, i.e., while the Time-Sampled Bridge 25 is operating. The Time-Sampled Bridge Cage 25 draws power from the DC Power Module 15.

Figure 28:
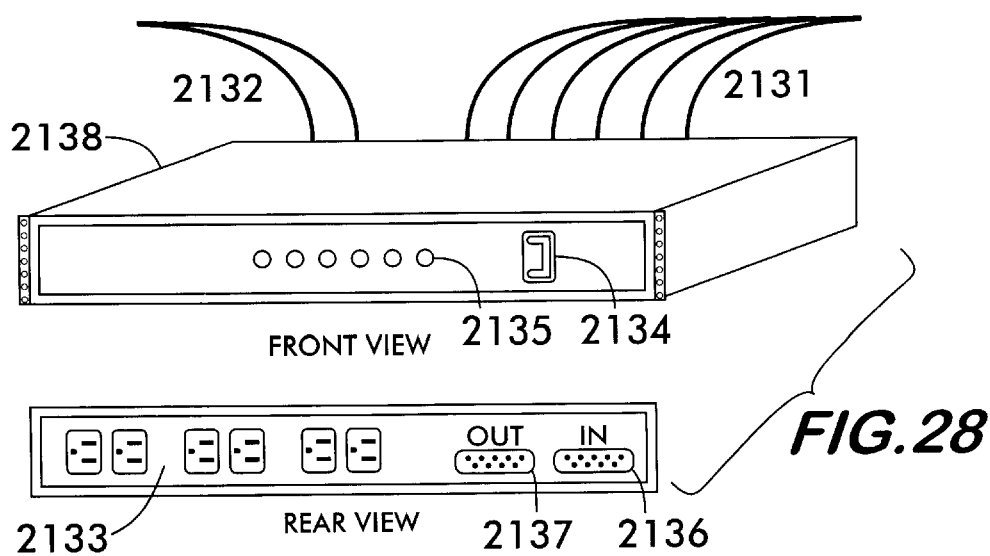
FIG. 28 depicts Hub Rack AC Power Supply providing power to selected components in the Hub Rack illustrated in FIGS. 24A and 24B.

Referring to FIG. 28, the Hub Rack AC Power Module 213 preferably includes an AC Power Module Enclosure 2138 which is configured with EIA-standard 19-inch flanges to facilitate mounting of the enclosure to the Hub Equipment Mounting Rack 22. The Hub Rack AC Power Module 213 is a modified commercially available from Pulizzi Engineering (model IPC 3302). One Hub Rack AC Power Module 213 can be used to supply power to each Hub Rack 2. More specifically, the Hub Rack AC Power Module 213 provides multiple AC outlets 2133 on the rear panel which supply power to other components in the Hub Rack 2 via AC Power Module Cable Assemblies 2131. These components include, but are not limited to, both Cooling Modules 14, both DC Power Modules 15, the Hub Controller PC 24, and the Hub Rack Exhaust Fan 212. The Hub Rack AC Power Module 213 advantageously contains a Main Circuit Breaker 2134 for total rack overload protection. Each outlet is protected by a Thermal Breaker 2135 with push-button reset on the front panel. Spike suppression and surge protection capabilities advantageously are included in each Hub Rack AC Power Module 213.

It should be noted that the Hub Rack AC Power Module 213 is remotely controllable via an AC Power Module Input Communications Port 2136 via two DB9 RS 232 ports, one for output and one for input, and can remotely control another AC Power Module 213 via an Output Communications Port 2137. Each communications port is preferably connected to a communications port in another AC Power Module 113/213 in a daisy chain fashion via an AC Power Module Communications Cable Assembly 2132. Advantageously, resident firmware can be configured so that when power is lost, the firmware will disconnect power output so that when power comes back on, the power module will stay off. Power in the module remains off until actively re-started by either depressing the local reset button on the Thermal Breakers 2135 or receiving remote command via the Input Communications Port 2136.

Having discussed the most numerous components in the MIPPSS, a detailed discussion of the overall operation of the MIPPSS, particularly with respect to signal delivery, will now be presented.

In general, when a user requests a connection from one device or system to another device or system, it will be appreciated that there are multiple possible paths through which that connection can be established. The MIPPSS evaluates available system resources and establishes a connection using the system resources that minimize latencies introduced by the connection. Alternatively, the UCC 2a can be programmed to implement a variety of other signal path selection algorithms, e.g., it can select the signal path having either the lowest latency or the lowest PBER, or an optimum combination of values of these two parameters (as prescribed by the algorithm). Once a path is selected, it is verified and, once verified, it is established and it remains established until released by a switch control signal, via software commands from UCC 2a. The discussion presented immediately below will describe the propagation of a signal through each of the possible path options. It should be noted that all of FIGS. 29 through 48 are functional, not physical, representations. For ease of presentation, intra-hub paths will be described before inter-hub paths are discussed.

First, it will be appreciated that intra-hub paths refer to serial and parallel signal paths available through the MIPPSS which utilize only one Hub Rack 2, including cases where the signal is handled entirely within the Quad PI Board 133, within the PI Cage 13 and, thus, wholly within the PI Rack 1. Signal paths which utilize a second Hub Rack 2 are described in greater detail thereafter.

Figure 29:
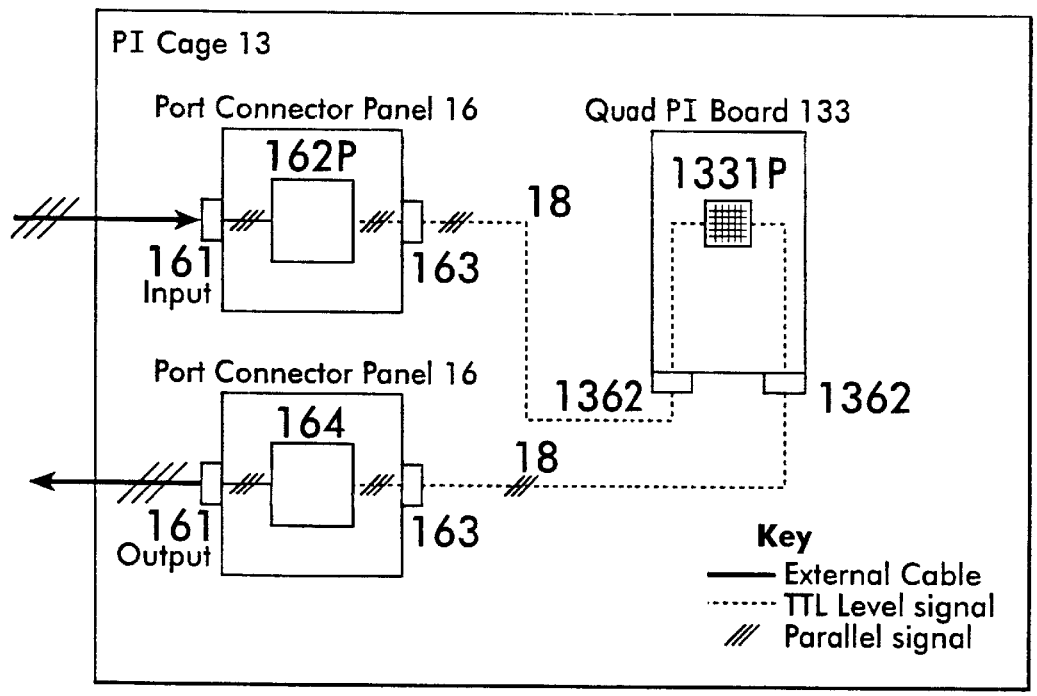
FIG. 29 is a block diagram illustrating intra-quad PI Board routing of parallel signals according to the present invention.

It should first be mentioned that two users or systems that interface with the MIPPSS through the same Quad PI Board 133 can be connected within that Quad PI Board 133. As illustrated in FIG. 29, parallel signals enter into the MIPPSS through the Port Connector Panel External Interface Connector 161 on the Port Connector Panel 16. The signals are translated to TTL levels by a Parallel TTL Converter 162P and transferred to the Quad PI Board 133 via the Port Connector Panel Internal Interface Connector 163 and the PI Cage to Port Connector Panel Cable Harness 18. The parallel TTL signals enter the Quad PI Board 133 via the PI Cage to Port Connector Panel Cable Assembly Backplane Connector Adapter 1362 and are delivered to inputs of the Matrix Switch 1331P, which advantageously can, but need not, be an 12×4×N matrix switch, where N is the number of parallel TTL signals. The parallel TTL signals are preferably delivered to the appropriate outputs of the Matrix Switch 1331P and then back to the PI Cage to Port Connector Panel Cable Assembly Backplane Connector Adapter 1362. The parallel TTL signals are then transferred to the output Port Connector Panel 16 via the PI Cage to Port Connector Panel Cable Harness 18. The parallel TTL signals enter the Port Connector Panel 16 via the Port Connector Panel Internal Interface Connector 163 and are delivered to the external Parallel Interface Driver 164, where they are conditioned for transmission. Finally, the conditioned parallel signals exit the MIPPSS through the Port Connector Panel External Interface Connector 161. The above-described process takes approximately 50 nanoseconds (ns).

Figure 30:
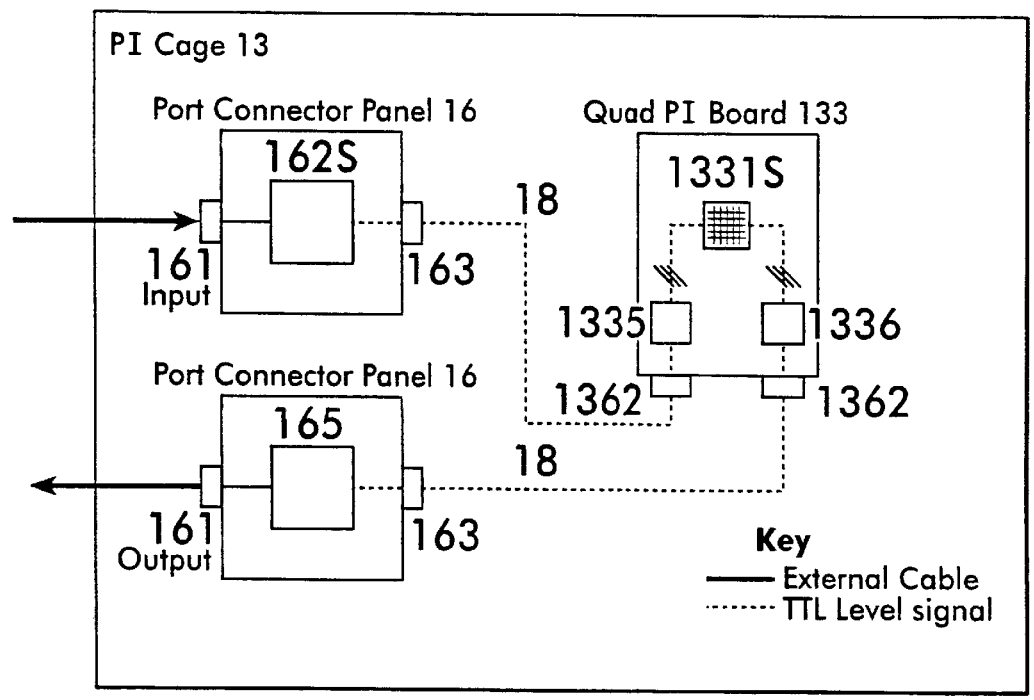
FIG. 30 is a block diagram illustrating intra-quad PI Board routing of serial signals according to the present invention.

Serial signals are handled in a different manner. Referring to FIG. 30, the serial signal enters into the MIPPSS through the External Interface Connector 161 on the Port Connector Panel 16. Preferably, the serial signal is translated to TTL levels by the Serial TTL Converter 162S and transferred to the Quad PI Board 133 via the Port Connector Panel Internal Interface Connector 163 and the PI Cage to Port Connector Panel Cable Harness 18. The serial TTL signal enters the Quad PI Board 133 via the PI Cage to Port Connector Panel Cable Assembly Backplane Connector Adapter 1362 and is delivered to the Serial to Parallel Converter 1335 where the serial TTL signal is decoded into parallel TTL level signals. The parallel TTL signals are delivered to the appropriate output of the Matrix Switch 1331S and then delivered to the Parallel to Serial Converter 1336 and the single serial TTL signal is delivered back to the PI Cage to Port Connector Panel Cable Assembly Backplane Connector Adapter 1362. The serial TTL signal is then transferred to the destination Port Connector Panel 16 via the PI Cage to Port Connector Panel Cable Harness 18. The serial TTL signal enters the Port Connector Panel 16 via the Port Connector Panel Internal Interface Connector 163 and is delivered to the external Serial Interface Driver 165 where it is conditioned for transmission. Finally the conditioned serial signal exits the MIPPSS through the Port Connector Panel External Interface Connector 161. It should be mentioned that this entire process takes approximately 350 ns.

The next possibility, i.e., that two users or systems which interface with the MIPPSS through different Quad PI Boards 133 in the same PI Cage 13 and, thus, can be connected within the PI Cage 13 using the Cage Router Board 135, will now be described. As in the discussion above, parallel and serial signal paths will each be discussed in turn.

Figure 31:
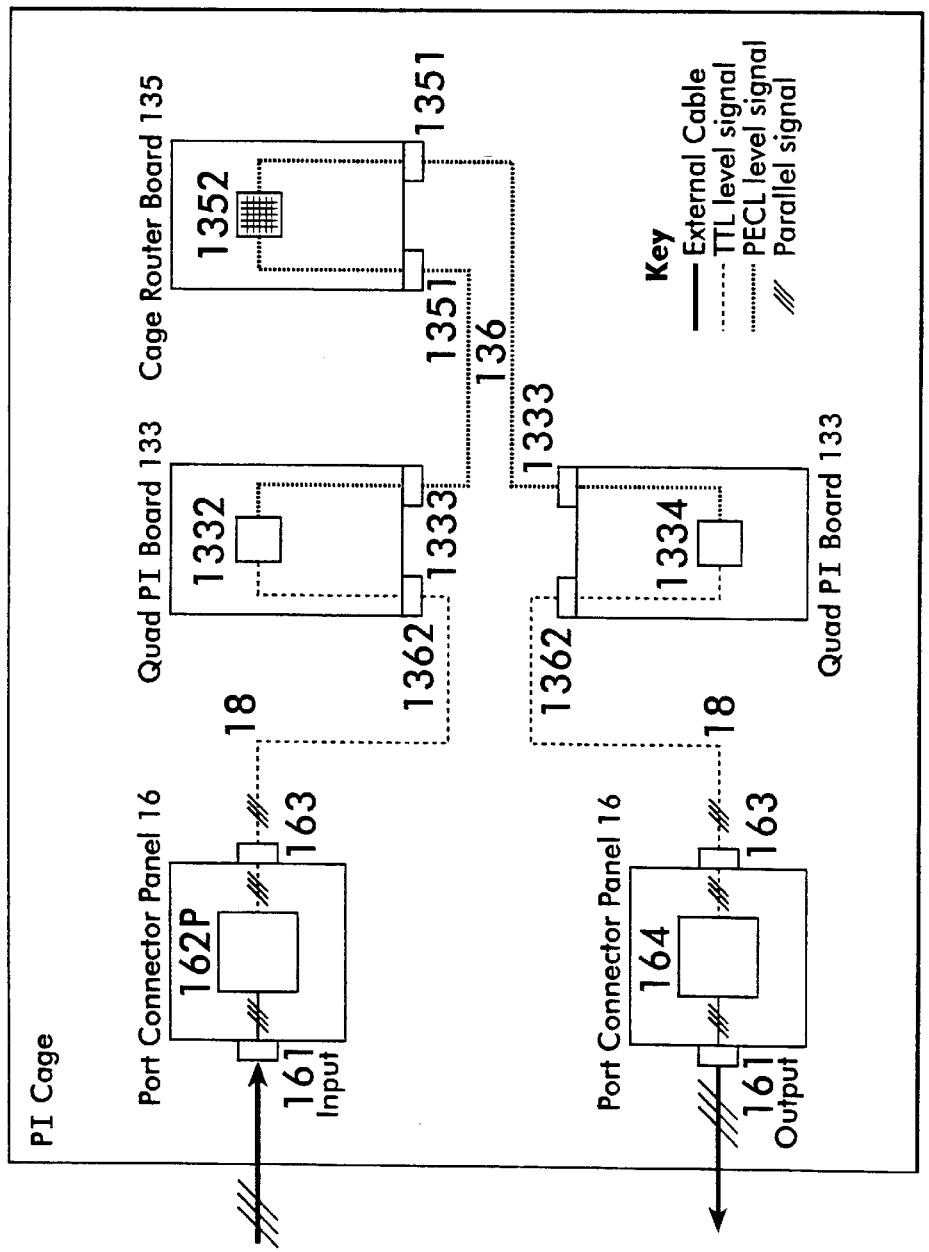
FIG. 31 is a block diagram illustrating Intra-PI Cage routing of parallel signals according to the present invention.

Referring now to FIG. 31, parallel signals enter into the MIPPSS through the External Interface Connector 161 on the Port Connector Panel 16. The parallel signals are translated to TTL levels by the Parallel TTL Converter 162P and transferred to the sending/originating Quad PI Board 133 via the Port Connector Panel Internal Interface Connector 163 and the PI Cage to Port Connector Panel Cable Harness 18.

The parallel TTL signals enter the Quad PI Board 133 via the PI Cage to Port Connector Panel Cable Assembly Backplane Connector Adapter 1362 and are delivered to the Parallel to Serial Converter/Serial Line Driver 1332 where the parallel TTL signals advantageously are sampled and converted into a Positive Emitter-Coupled Logic (PECL) serial signal. The PECL serial signal is delivered to the Quad PI Board Backplane Mating Receptacle 1333 and then onto the PI Cage Multi-Layer Backplane 136.

Preferably, the PECL serial signal enters the PI Cage Router Board 135 via the PI Cage Router Board Backplane Connector 1351 and is delivered to an input of, for example, a 64×32 Matrix Switch 1352. The PECL serial signal is delivered to the appropriate output of the Matrix Switch 1352 and then onto the PI Cage Multi-Layer Backplane 136 through the PI Cage Router Board Backplane Connector 1351. The PECL serial signal is delivered through the PI Cage Multi-Layer Backplane 136 and enters the destination Quad PI Board 133 through the Quad PI Board Backplane Mating Receptacle 1333/Backplane Receptacle 1361. The PECL serial signal is delivered to the Serial to Parallel Converter/TTL Parallel Line Driver 1334, where the PECL serial signal is converted back to parallel TTL level signals, and then the parallel TTL signal is delivered back to the PI Cage to Port Connector Panel Cable Assembly Backplane Connector Adapter 1362. The parallel TTL signals are then transferred to the destination Port Connector Panel 16 via the PI Cage to Port Connector Panel Cable Harness 18. The parallel TTL signals enter the Port Connector Panel 16 via the Port Connector Panel Internal Interface Connector 163 and are delivered to the external Parallel Interface Driver 164 where they are conditioned for transmission. Finally the conditioned parallel signals exit the MIPPSS through the Port Connector Panel External Interface Connector 161. It should be noted that this entire process takes approximately 200 ns.

Figure 32:
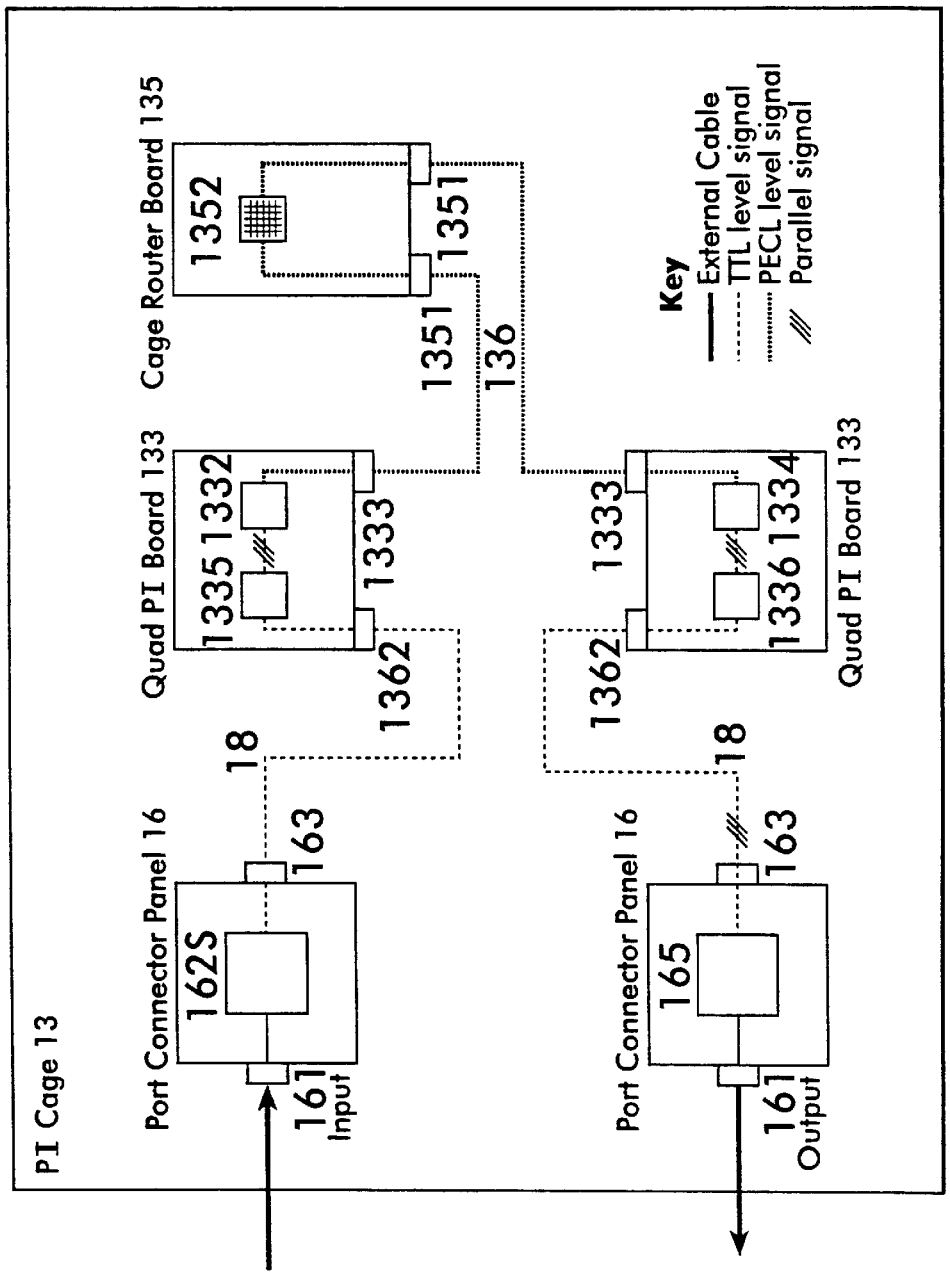
FIG. 32 is a block diagram illustrating Intra-PI Cage routing of serial signals according to the present invention.
Figure 33:
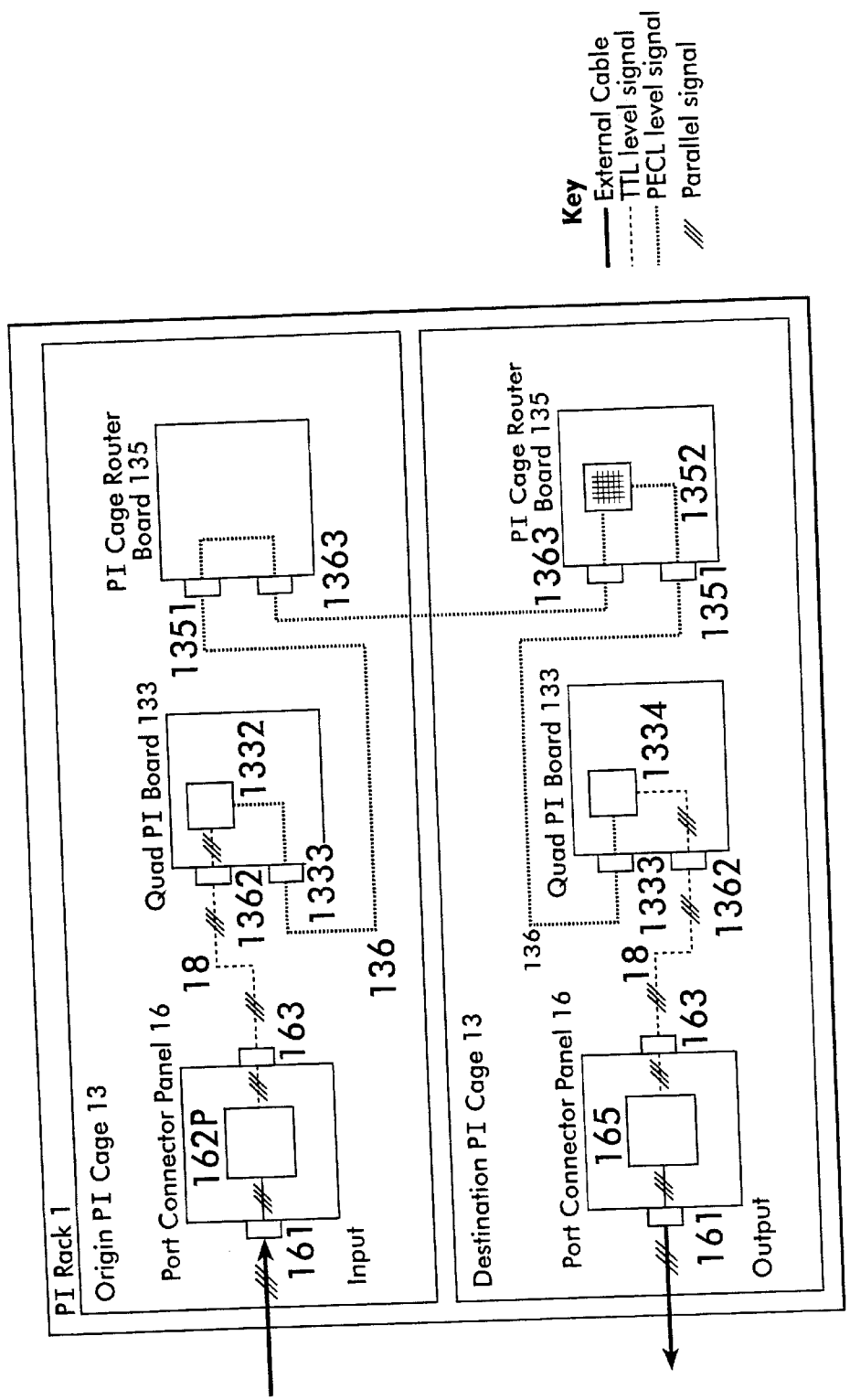
FIG. 33 is a block diagram illustrating Intra-PI Rack routing of parallel signals according to the present invention.

Referring to FIG. 32, the serial signal enters into the MIPPSS through the External Interface Connector 161 on the Port Connector Panel 16. The serial signal is translated to TTL levels by the Serial TTL Converter 162S and transferred to the Quad PI Board 133 via the Port Connector Panel internal Interface Connector 163 and the PI Cage to Port Connector Panel Cable Harness 18. The serial TTL signal enters the Quad PI Board 133 via the PI Cage to Port Connector Panel Cable Assembly Backplane Connector Adapter 1362 and is delivered to the Serial to Parallel Converter 1335 where the serial TTL signal is decoded into parallel TTL level signals. Advantageously, the parallel TTL signals are then delivered to the Parallel to Serial Converter/Serial Line Driver 1332 where they are sampled and converted into a PECL serial signal. The PECL serial signal is delivered to the Quad PI Board Backplane Mating Receptacle 1333 and then onto the PI Cage Backplane 136. The PECL serial signal is delivered through the PI Cage Backplane 136 and enters the PI Cage Router Board 135 via the PI Cage Router Board Backplane Connector 1351 and is delivered to an input of, for example, a 64×32, Matrix Switch 1352. The PECL serial signal is delivered to the appropriate output of the Matrix Switch 1352 and then onto the PI Cage Backplane 136 through the PI Cage Router Board Backplane Connector 1351. The PECL serial signal is routed through the PI Cage Backplane 136 and enters the destination Quad PI Board 133 through the Quad PI Board Backplane Mating Receptacle 1333.

Furthermore, the PECL serial signal is delivered to the Serial to Parallel Converter/TTL Parallel Line Driver 1334, where the PECL serial signal is converted back to parallel TTL level signals. The parallel TTL signals are delivered to the Parallel to Serial Converter 1336 and the single serial TTL signal is delivered back to the PI Cage to Port Connector Panel Cable Assembly Backplane Connector Adapter 1362. The serial TTL signal is then transferred to the destination Port Connector Panel 16 via the PI Cage to Port Connector Panel Cable Harness 18. The serial TTL signal enters the Port Connector Panel 16 via the Port Connector Panel Internal Interface Connector 163 and is delivered to the external Serial Interface Driver 165 where it is conditioned for transmission. Finally the conditioned serial signal exits the MIPPSS through the Port Connector Panel External Interface Connector 161. This entire process takes approximately 350 ns.

The next connection possibility involves signals which are routed via intra-PI Rack paths, within one PI Rack 1 but between two different PI Cages 13. In other words, two users or systems that interface with MIPPSS through Quad PI Boards 133 in different PI Cages 13 within a single PI Rack 1 can be connected within the PI Rack 1 using the Cage Router Boards 135.

Figure 34:
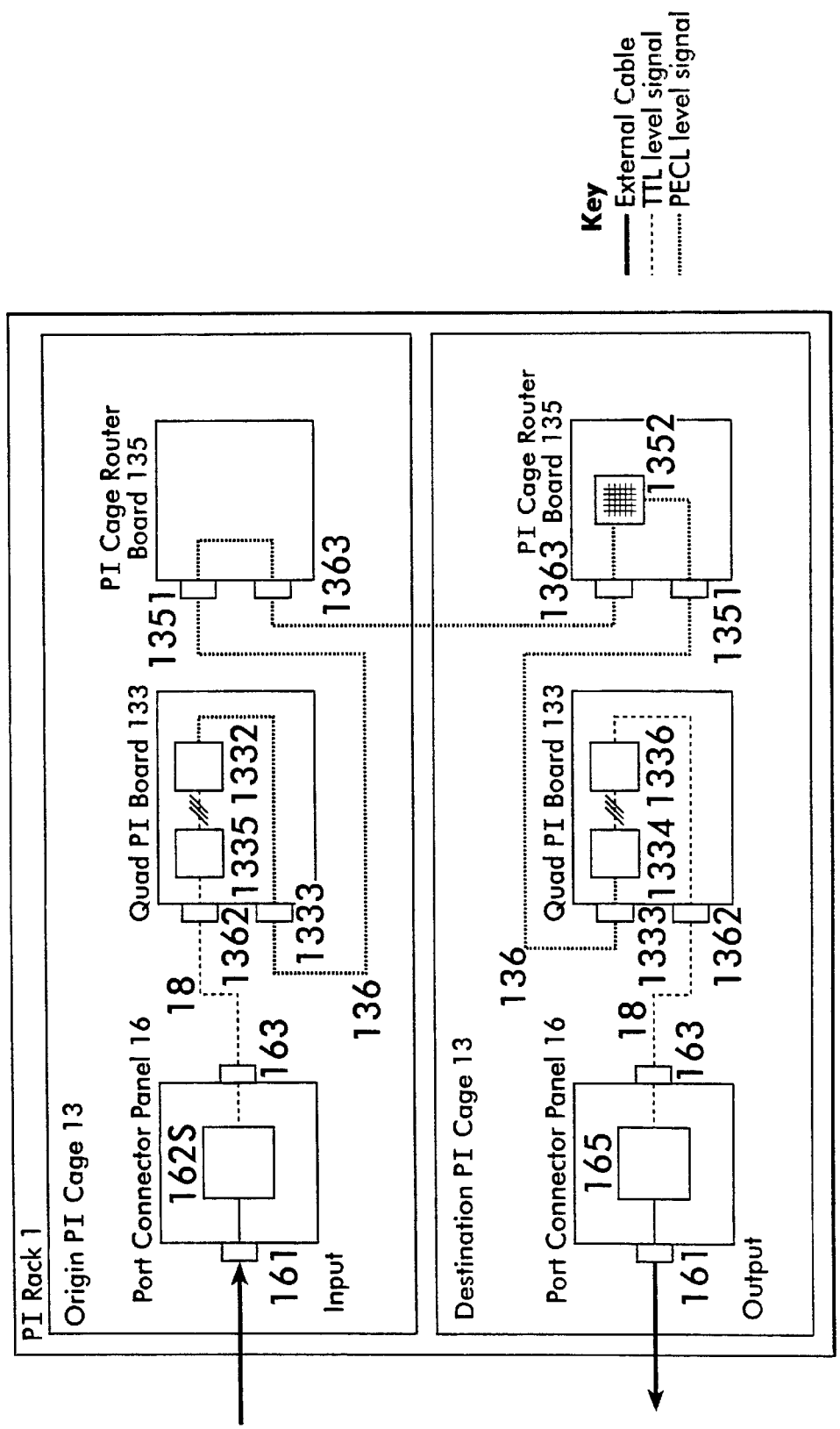
FIG. 34 is a block diagram illustrating Intra-PI Rack routing of serial signals according to the present invention.

Referring to FIG. 34, parallel signals enter into the MIPPSS through the External Interface Connector 161 on the Port Connector Panel 16. The parallel signals are translated to TTL levels by the Parallel TTL Converter 162P and transferred to the Quad PI Board 133 via the Port Connector Panel Internal Interface Connector 163 and the PI Cage to Port Connector Panel Cable Harness 18. The parallel TTL signals enter the Quad PI Board 133 via the PI Cage to Port Connector Panel Cable Assembly Backplane Connector Adapter 1362 and are delivered to the Parallel to Serial Converter/Serial Line Driver 1332 where the parallel TTL signals are sampled and converted into a PECL serial signal. Preferably, the PECL serial signal is delivered to the Quad PI Board Backplane Mating Receptacle 1333 and then onto the PI Cage Backplane 136. The PECL serial signal enters the PI Cage Router Board 135 via the PI Cage Router Board Backplane Connector 1351 and is delivered directly to the PI Cage to PI Cage Cable Assembly Backplane Connector Adapter 1363 and into to the PI Cage to PI Cage Cable Assembly 19. The PECL serial signal enters the PI Cage Router Board 135 of the destination PI Cage 13 via the PI Cage to PI Cage Cable Assembly Backplane Adapter 1363 and is delivered to an input of a Matrix Switch 1352, which in a preferred embodiment is a 64×32 matrix switch. The PECL serial signal is delivered to the appropriate output of the Matrix Switch 1352 and then onto the destination PI Cage Backplane 136 through the PI Cage Router Board Backplane Connector 1351. The PECL serial signal is delivered through the PI Cage Backplane 136 and enters the destination Quad PI Board 133 through the Quad PI Board Backplane Mating Receptacle 1333. The PECL serial signal is delivered to the Serial to Parallel Converter/TTL Parallel Line Driver 1334, where the PECL serial signal is converted back to parallel TTL level signals, and then the parallel TTL signal is delivered back to the PI Cage to Port Connector Panel Cable Assembly Backplane Connector Adapter 1362. The parallel TTL signals are then transferred to the output Port Connector Panel 16 via the PI Cage to Port Connector Panel Cable Harness 18. The parallel TTL signals enter the Port Connector Panel 16 via the Port Connector Panel Internal Interface Connector 163 and are delivered to the external Parallel Interface Driver 164 where they are conditioned for transmission. Finally the conditioned parallel signals exit the MIPPSS through the Port Connector Panel External Interface Connector 161. This entire process takes approximately 200 ns.

Figure 35:
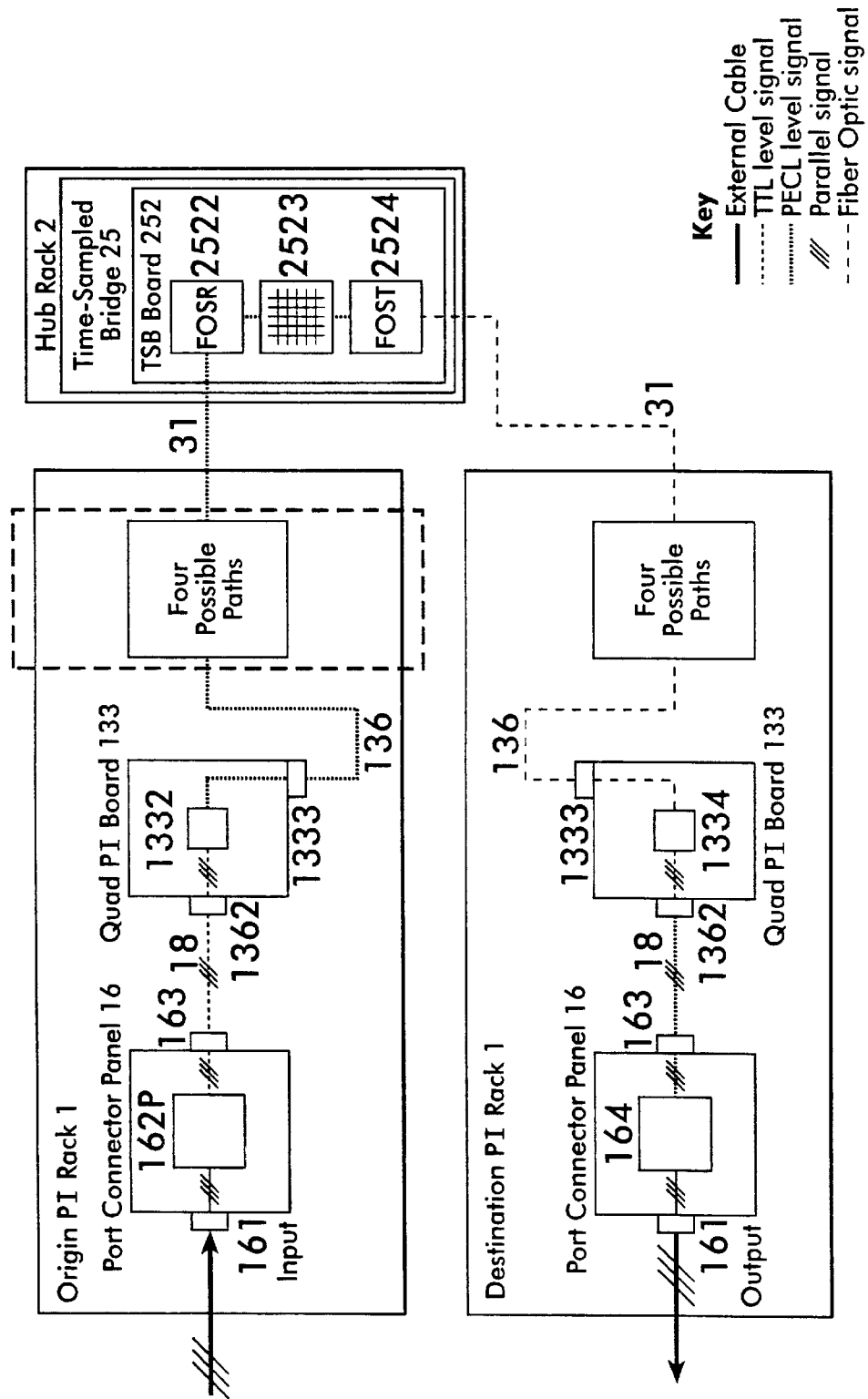
FIG. 35 is a block diagram illustrating, in general terms, parallel signal routing from an origin PI Rack to a Hub Rack according to the present invention.
Figure 36:
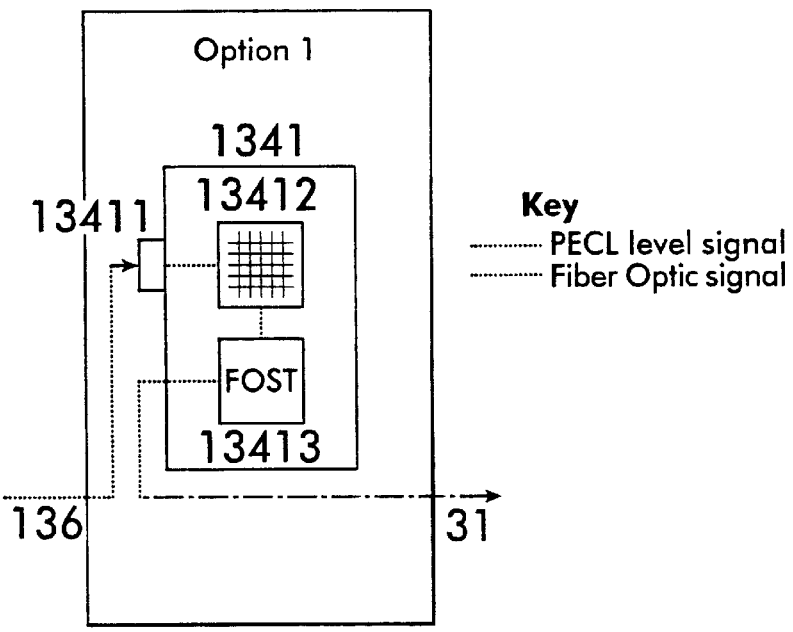
FIG. 36 is a block diagram illustrating a first alternative signal routing option associated with the block diagram of FIG. 35.
Figure 37:
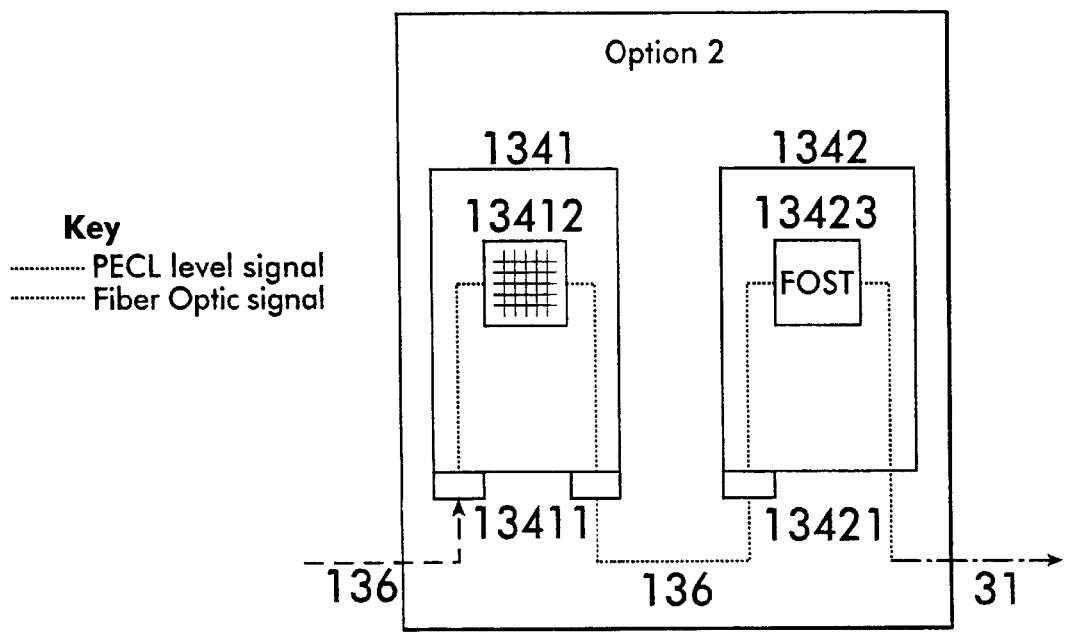
FIG. 37 is a block diagram illustrating a second alternative signal routing option associated with the block diagram of FIG. 35.
Figure 38:
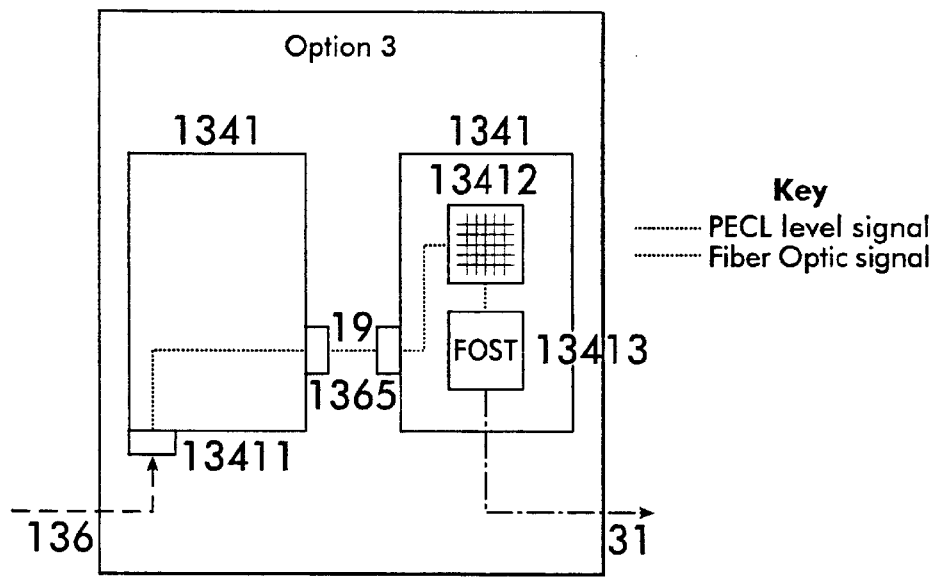
FIG. 38 is a block diagram illustrating a third alternative signal routing option associated with the block diagram of FIG. 35.
Figure 39:
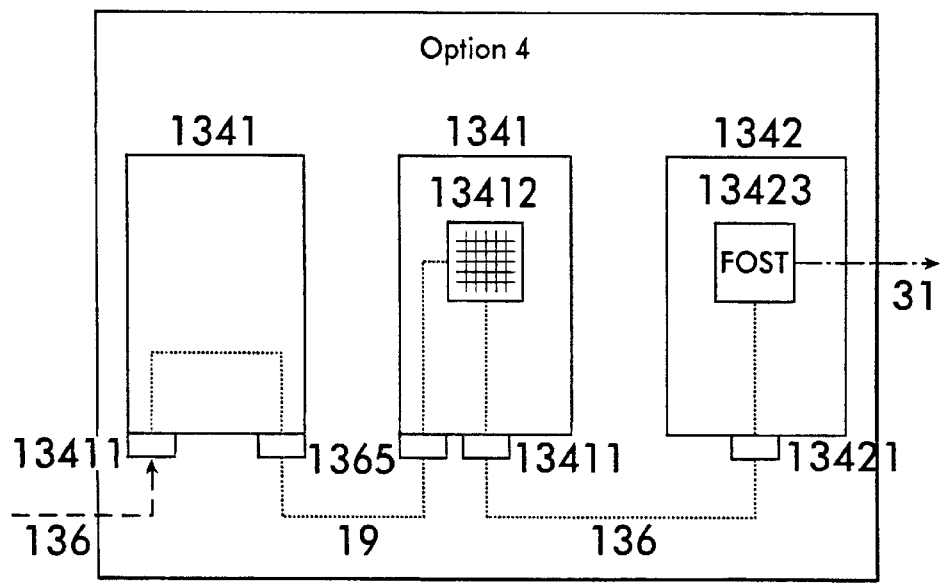
FIG. 39 is a block diagram illustrating a fourth alternative signal routing option associated with the block diagram of FIG. 35.

In contrast, the delivery of serial signals is performed as illustrated in FIG. 35, wherein the serial signal enters into the MIPPSS through the External Interface Connector 161 on the Port Connector Panel 16. The serial signal is then translated to TTL levels by the Serial TTL Converter 162S and transferred to the Quad PI Board 133 via the Port Connector Panel Internal Interface Connector 163 and the PI Cage to Port Connector Panel Cable Harness 18. The serial TTL signal subsequently enters the Quad PI Board 133 via the PI Cage to Port Connector Panel Cable Assembly Backplane Connector Adapter 1362 and is delivered to the Serial to Parallel Converter 1335 where the serial TTL signal is decoded into parallel TTL level signals. The parallel TTL signals are then delivered to the Parallel to Serial Converter/Serial Line Driver 1332, where they are sampled and converted into a PECL serial signal. The PECL serial signal is delivered to the Quad PI Board Backplane Mating Receptacle 1333 and then onto the PI Cage Backplane 136.

Preferably, the PECL serial signal is delivered through the PI Cage Multi-Layer Backplane 136 and enters the PI Cage Router Board 135 via the PI Cage Router Board Backplane Connector 1351 and is delivered directly to the PI Cage to PI Cage Cable Assembly Backplane Connector Adapter 1363 and into the PI Cage to PI Cage Cable Assembly 19. The PECL serial signal enters the PI Cage Router Card 135 of the destination PI Cage 13 via the PI Cage to PI Cage Cable Assembly Backplane Adapter 1363 and is delivered to an input of a Matrix Switch 1352, which advantageously can be a 64×32 matrix switch. The PECL serial signal is delivered to the appropriate output of the Matrix Switch 1352 and then onto the destination PI Cage Multi-Layer Backplane 136 through the PI Cage Router Board Backplane Connector 1351. The PECL serial signal is delivered through the PI Cage Multi-Layer Backplane 136 and enters the destination Quad PI Board 133 through the Quad PI Board Backplane Mating Receptacle 1333. The PECL serial signal is delivered to the Serial to Parallel Converter/TTL Parallel Line Driver 1334, where the PECL serial signal is converted back to parallel TTL level signals. The parallel TTL signals are delivered to the Parallel to Serial Converter 1336 and the single serial TTL signal delivered back to the PI Cage to Port Connector Panel Cable Assembly Backplane Connector Adapter 1362. The serial TTL signal is then transferred to the output Port Connector Panel 16 via the PI Cage to Port Connector Panel Cable Harness 18. The serial TTL signal enters the Port Connector Panel 16 via the Port Connector Panel Internal Interface Connector 163 and is delivered to the external Serial Interface Driver 165 where it is conditioned for transmission. Finally the conditioned serial signal exits the MIPPSS through the Port Connector Panel External Interface Connector 161. This entire process takes approximately 350 ns.

The remaining interconnection possibilities involve inter-PI Rack paths. In such cases, two users or systems that interface with the MIPPSS through Quad PI Boards 133 in different PI Racks 1 connected to a single Hub Rack 2 can be connected using the Time-Sampled Bridge 25 within the Hub Rack 2. The overall connection path is illustrated in FIG. 35. The parallel signal paths will be addressed first.

As illustrated in FIG. 35, parallel signals enter into the MIPPSS through the External Interface Connector 161 on the Port Connector Panel 16. The parallel signals advantageously are translated to TTL levels by the Parallel TTL Converter 162P and transferred to the Quad PI Board 133 via the Port Connector Panel Internal Interface Connector 163 and the PI Cage to Port Connector Panel Cable Harness 18. The parallel TTL signals enter the Quad PI Board 133 via the PI Cage to Port Connector Panel Cable Assembly Backplane Connector Adapter 1362 and are delivered to the Parallel to Serial Converter/Serial Line Driver 1332 where the parallel TTL signals are sampled and converted into a PECL serial signal. The PECL serial signal is delivered to the Backplane Mating Receptacle 1333 and then onto the PI Cage Backplane 136.

It should be noted that there are four possible paths between the origin PI Rack and the Hub Rack. As shown in the upper portion of FIG. 35, the PECL serial signal is converted to a fiber optic serial signal and delivered to the Hub Rack 2 using one of the four following paths:

(1) The PECL serial signal enters the FOT Router Board 1341 via the FOT Router Board Backplane Connector 13411 and is delivered to an input of a Matrix Switch 13412, which preferably is a 64×32 matrix switch in the exemplary embodiment. See FIG. 36. The PECL serial signal is then delivered to the appropriate output of the Matrix Switch 13412 and to a Fiber Optic Serial Transmitter (FOST) 13413 where it is converted to a fiber optic serial signal and transferred through one fiber of a PI Cage to Hub Rack Cable Assembly 31 to the Fiber Optic Serial Receiver (FOSR) 2522 of a Time-Sampled Bridge Board 252 in the Time-Sampled Bridge 25 of the Hub Rack 2.

(2) The PECL serial signal enters the FOT Router Board 1341 via the FOT Router Board backplane connector 13411 and is delivered to an input of a Matrix Switch 13412, which preferably is a 64×32 matrix switch in the exemplary embodiment. See FIG. 37. The PECL serial signal is then delivered to the appropriate output of the Matrix Switch 13412 and then onto the Multi-Layer Backplane 136 through the FOT Router Board Backplane Connector 13411. The PECL serial signal is delivered through the Multi-Layer Backplane 136 and enters the FOR Router Board 1342 through the FOR Router Board Backplane Connector 13421. The PECL serial signal is delivered to a Fiber Optic Serial Transmitter (FOST) 13423 where it is converted to a fiber optic serial signal and transferred through one fiber of a PI Cage to Hub Rack Cable Assembly 31 to the Fiber Optic Serial Receiver (FOSR) 2522 of a Time-Sampled Bridge Board 252 of the Time-Sampled Bridge 25 of the Hub Rack 2.

(3) The PECL serial signal enters the FOT Router Board 1341 via the FOT Router Board backplane connector 13411 and is delivered to a PI Cage to PI Cage cable assembly backplane connector adapter 1365. See FIG. 38. The PECL serial signal is transferred to a secondary FOT Router Board 1341 via the PI Cage to PI Cage Cable Assembly 19. The PECL serial signal enters the secondary FOT Router Board 1341 through the PI Cage to PI Cage Cable Assembly Backplane Connector Adapter 1365 and is delivered to an input of a Matrix Switch 13412, which advantageously can be a 64×32 matrix switch in the exemplary embodiment. The PECL serial signal is then delivered to the appropriate output of the Matrix Switch 13412 and to a Fiber Optic Serial Transmitter (FOST) 13413 where it is converted to a fiber optic serial signal and transferred through one fiber of a PI Cage to Hub Rack Cable Assembly 31 to the Fiber Optic Serial Receiver (FOSR) 2522 of a Time-Sampled Bridge Board 252 of the Time-Sampled Bridge 25 of the Hub Rack 2.

(4) The PECL serial signal enters the primary FOT Router Board 1341 via the FOT Router Board Backplane Connector 13411 and is delivered directly to a PI Cage to PI Cage Cable Assembly Backplane Connector Adapter 1365. See FIG. 39. The PECL serial signal is transferred to a secondary FOT Router Board 1341 via the PI Cage to PI Cage Cable Assembly 19. The PECL serial signal enters the secondary FOT Router Board 1341 through the PI Cage to PI Cage Cable Assembly Backplane Connector Adapter 1365 and is delivered to an input of a Matrix Switch 13412, which advantageously can be a 64×32 matrix switch in the exemplary embodiment. The PECL serial signal is then delivered to the appropriate output of the Matrix Switch 13412 and to the FOT Router Board Backplane Connector 13411. The PECL serial signal is transferred through the Backplane 136 to the FOR Router Board 1342 and enters the FOR Router Board 1342 through the FOR Router Board Backplane Connector 13421. The PECL serial signal is delivered to a Fiber Optic Serial Transmitter (FOST) 13423 where it is converted to a fiber optic serial signal and transferred through one fiber of a PI Cage to Hub Rack cable assembly 31 to the Fiber Optic Serial Receiver (FOSR) 2522 of a Time-Sampled Bridge Board 252 of the Time-Sampled Bridge 25 of the Hub Rack 2.

Figure 40:
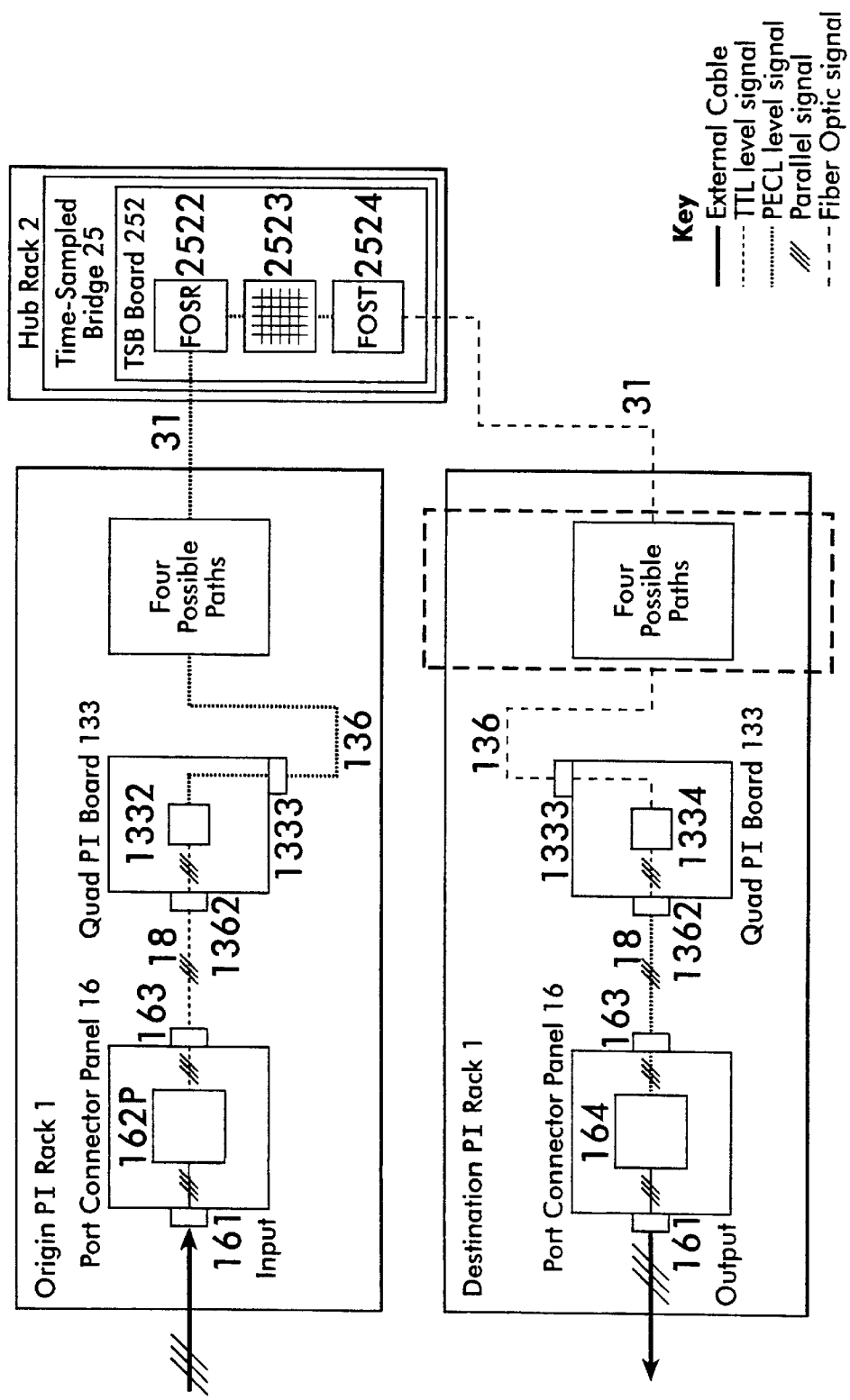
FIG. 40 is a block diagram illustrating, in general terms, parallel signal routing from a Hub Rack to a destination PI Rack according to the present invention.
Figure 41:
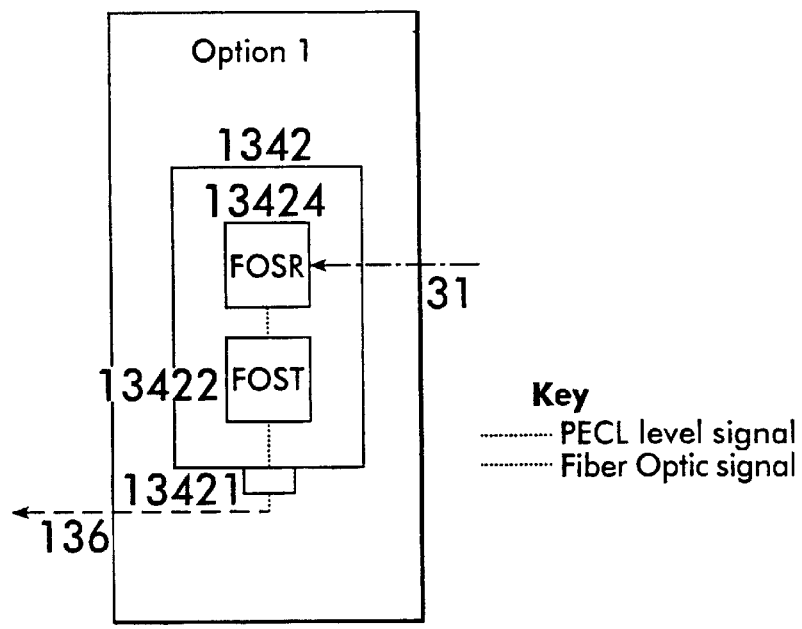
FIG. 41 is a block diagram illustrating a first alternative signal routing option associated with the block diagram of FIG. 40.
Figure 42:
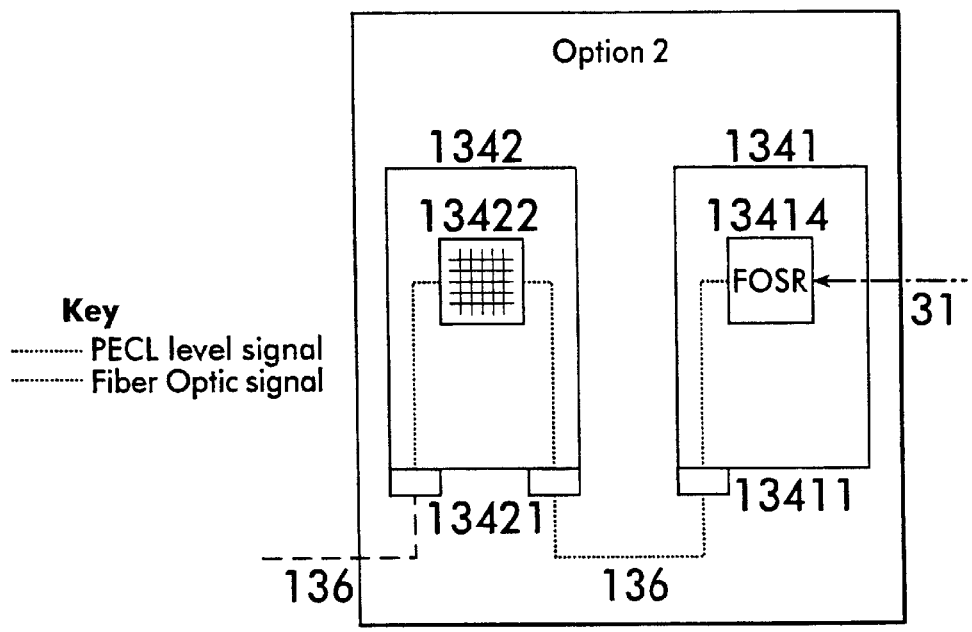
FIG. 42 is a block diagram illustrating a second alternative signal routing option associated with the block diagram of FIG. 40.
Figure 43:
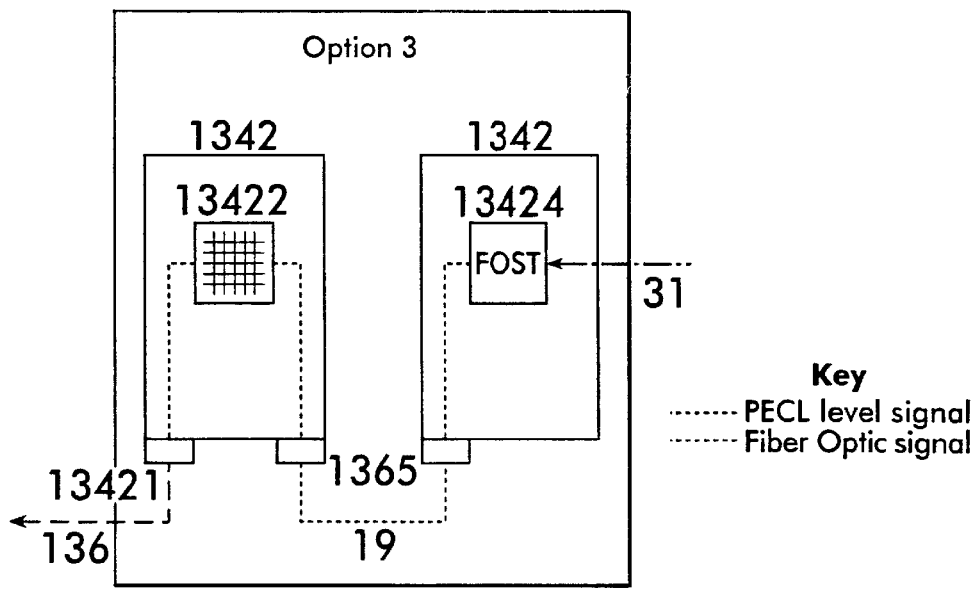
FIG. 43 is a block diagram illustrating a third alternative signal routing option associated with the block diagram of FIG. 40.
Figure 44:
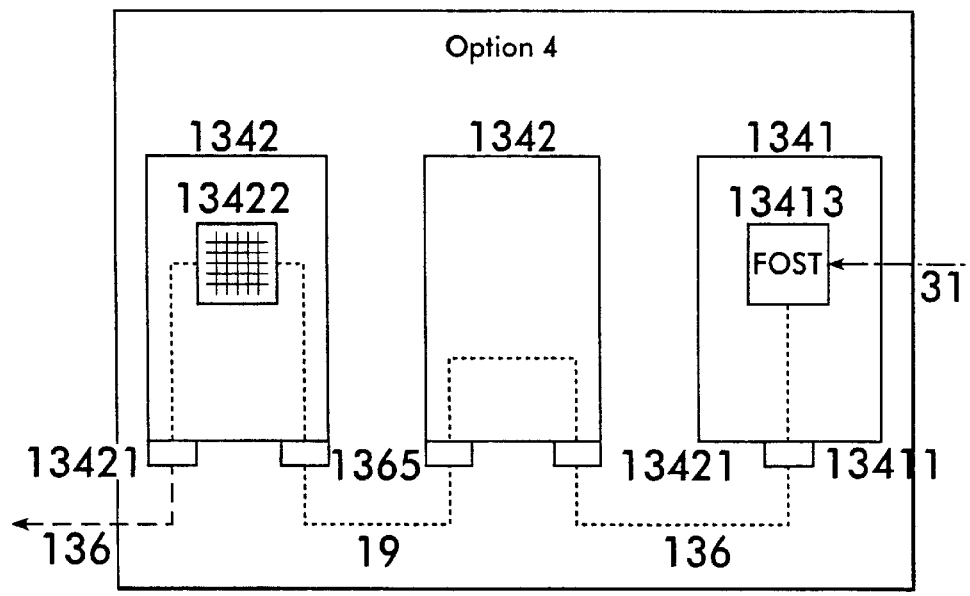
FIG. 44 is a block diagram illustrating a fourth alternative signal routing option associated with the block diagram of FIG. 40.

The switching that occurs within the Hub Rack 2 will now be described while referring to FIG. 40, wherein the fiber optic serial signal enters the Fiber Optic Serial Receiver (FOSR) 2522 of a Time-Sampled Bridge Board 252 of the Time-Sampled Bridge 25 of the Hub Rack 2 where it is converted back to a PECL serial signal. The PECL serial signal is delivered to a selected input of a Matrix Switch 2523, and through the, for example, 32×32, Matrix Switch 2523 to the appropriate output, and then to a FOST 2524 where the signal is converted to a fiber optic serial signal and transferred through one fiber of a PI Cage to Hub Rack Cable Assembly 31.

The input PI Rack 1 includes four possible signal paths to the Hub Rack 2, and the output PI Rack 1 includes four complementary signal paths from the Hub Rack 2. As shown in the lower portion of FIG. 40, the fiber optic serial signal advantageously can be converted to a PECL serial signal and delivered to the destination PI Cage backplane 136 using one of the four following paths:

(1) The fiber optic serial signal enters the destination PI Cage 13 via the FOSR 13424 of a FOR Router Board 1342 where it is converted back to a PECL serial signal and delivered to an input of a Matrix Switch 13422, which advantageously can be a 64×32 matrix switch. See FIG. 41. The PECL serial signal is delivered to the appropriate output of the Matrix Switch 13422 and then onto the destination PI Cage backplane 136 through the FOR Router Board Backplane connector 13421.

(2) The fiber optic serial signal enters the destination PI Cage 13 via the FOSR 13414 of an FOT Router Board 1341 where it is converted back to a PECL serial signal and delivered to the FOT Router Board Backplane Connector 13411. See FIG. 42. The PECL serial signal is transferred to the FOR Router Board 1342 via the FOT Router Board Backplane Connector 13411 and enters the FOR Router Board 1342 through a FOR Router Board Backplane Connector 13421. The PECL serial signal is delivered to an input of a Matrix Switch 13422, which advantageously can be a 64×32 matrix switch in the exemplary embodiment, to the appropriate output of the Matrix Switch 13422 and then onto the destination PI Cage Backplane 136 through the FOR Router Board Backplane Connector 13421.

(3) The fiber optic serial signal enters the secondary PI Cage 13 via the FOSR 13424 of a FOR Router Board 1342 where it is converted back to a PECL serial signal and delivered to the PI Cage to PI Cage Cable Assembly Backplane Connector Adapter 1365 and transferred to the destination FOR Router Board 1342 via the PI Cage to PI Cage Cable Assembly 19. See FIG. 43. The PECL serial signal enters the destination FOR Router Board 1342 through the PI Cage to PI Cage Cable Assembly Backplane Connector Adapter 1365 and is delivered to an input of a Matrix Switch 13422, which advantageously can be a 64×32 matrix switch. The PECL serial signal is delivered to the appropriate output of the Matrix Switch 13422 and then onto the destination PI Cage Backplane 136 through the Fiber Optic Receive Router Board Backplane Connector 13421.

(4) The fiber optic serial signal enters the secondary PI Cage 13 via the FOSR 13414 of a FOT Router Board 1341 where it is converted back to a PECL serial signal and delivered to the FOT Router Board Backplane Connector 13411. See FIG. 44. The PECL serial signal is transferred to a preliminary FOR Router Board 1342 via the Backplane 136 and enters the preliminary FOR Router Board 1342 through a FOR Router Board Backplane Connector 13421. The PECL serial signal is delivered directly to the PI Cage to PI Cage Cable Assembly Backplane Connector Adapter 1365 and transferred to the destination FOR Router Board 1342 via the PI Cage to PI Cage Cable Assembly 19. The PECL serial signal enters the destination FOR Router Board 1342 through the PI Cage to PI Cage Cable Assembly Backplane Connector Adapter 1365 and is delivered to an input of a Matrix Switch 13422, which advantageously can be a 64×32 matrix switch. The PECL serial signal is delivered to the appropriate output of the Matrix Switch 13422 and then onto the destination PI Cage Backplane 136 through the FOR Router Board Backplane Connector 13421.

Referring back to FIG. 40, the PECL serial signal is routed through the PI Cage Backplane 136 and enters the destination Quad PI Board 133 through the Quad PI Board Backplane Mating Receptacle 1333. The PECL serial signal is delivered to the Serial to Parallel Converter/TTL Line Driver 1334, where the PECL serial signal is converted back to parallel TTL level signals, and then the parallel TTL signals are delivered back to the PI Cage to Port Connector Panel Cable Assembly Backplane Connector Adapter 1362. The parallel TTL signals are then transferred to the destination Port Connector Panel 16 via the PI Cage to Port Connector Panel Cable Harness 18. The parallel TTL signals enter the Port Connector Panel 16 via the Port Connector Panel internal interface connector 163 and are delivered to the external Parallel Interface Driver 164 where they are conditioned for transmission. Finally the conditioned parallel signals exit the MIPPSS through the Port Connector Panel External Interface Connector 161. This entire process takes approximately 220 ns excluding inter-rack cable delays.

Having discussed the various options for inter-PI Rack delivery of parallel signals, the various options for inter-PI Rack delivery of serial signals will now be described with reference to FIG. 45, wherein the serial signal enters into the MIPPSS through the external interface connector 161 on the Port Connector Panel 16. The serial signal is then translated to TTL levels by the Serial TTL Converter 162S and transferred to the Quad PI Board 133 via the Port Connector Panel Internal Interface Connector 163 and the PI Cage to Port Connector Panel Cable Harness 18. The serial TTL signal subsequently enters the Quad PI Board 133 via the PI Cage to Port Connector Panel Cable Assembly Backplane Connector Adapter 1362 and is delivered to the Serial Decoder 1335, where the serial TTL signal is then decoded into parallel TTL level signals. The parallel TTL signals are finally delivered to the Parallel to Serial Converter/Serial Line Driver 1332, where they are sampled and converted into a PECL serial signal. The PECL serial signal advantageously can then be delivered to the Quad PI Board Backplane Mating Receptacle 1333 and then onto the PI Cage Backplane 136.

Figure 45:
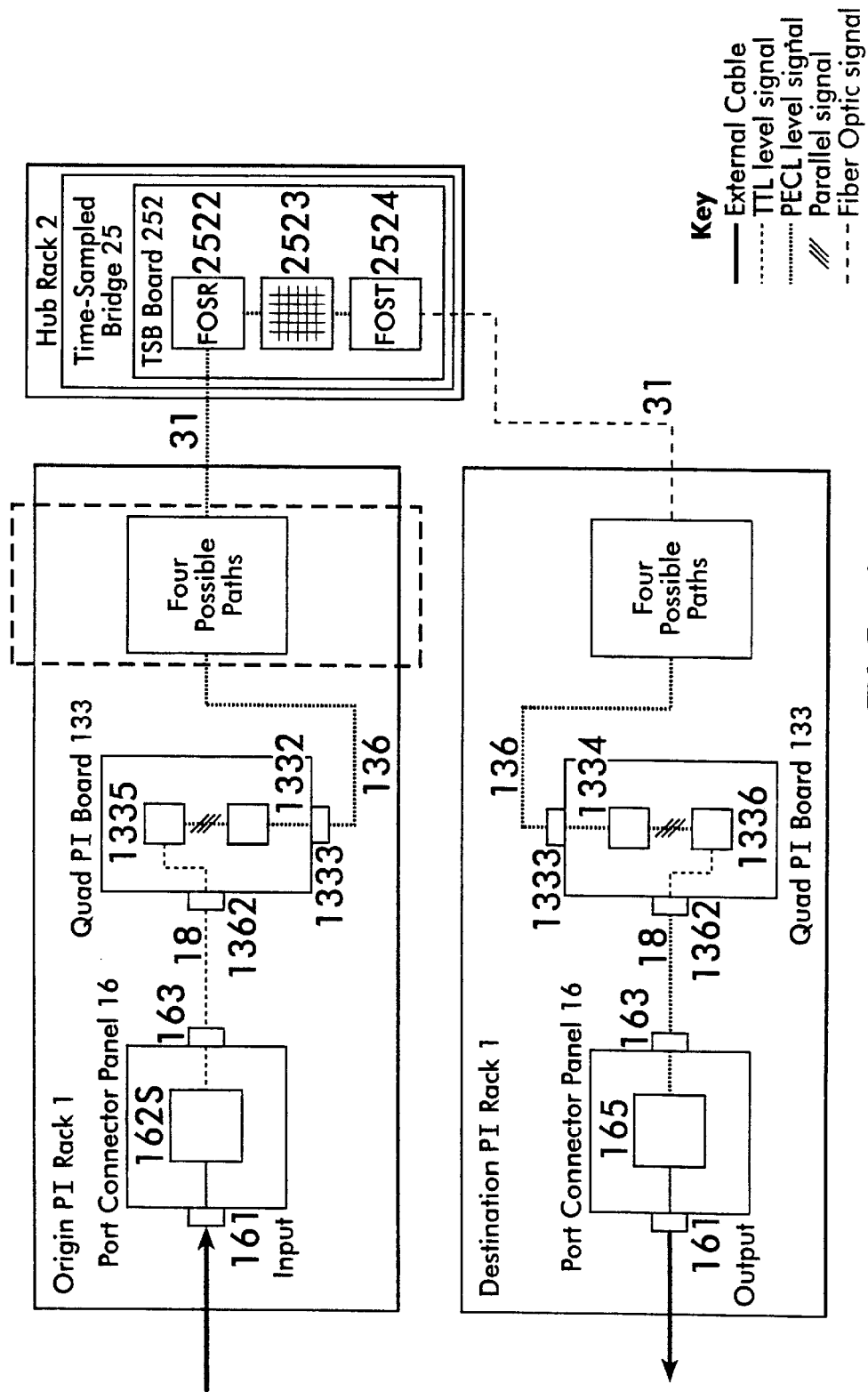
FIG. 45 is a block diagram illustrating, in general terms, serial signal routing from an origin PI Rack to a Hub Rack according to the present invention.
Figure 46:
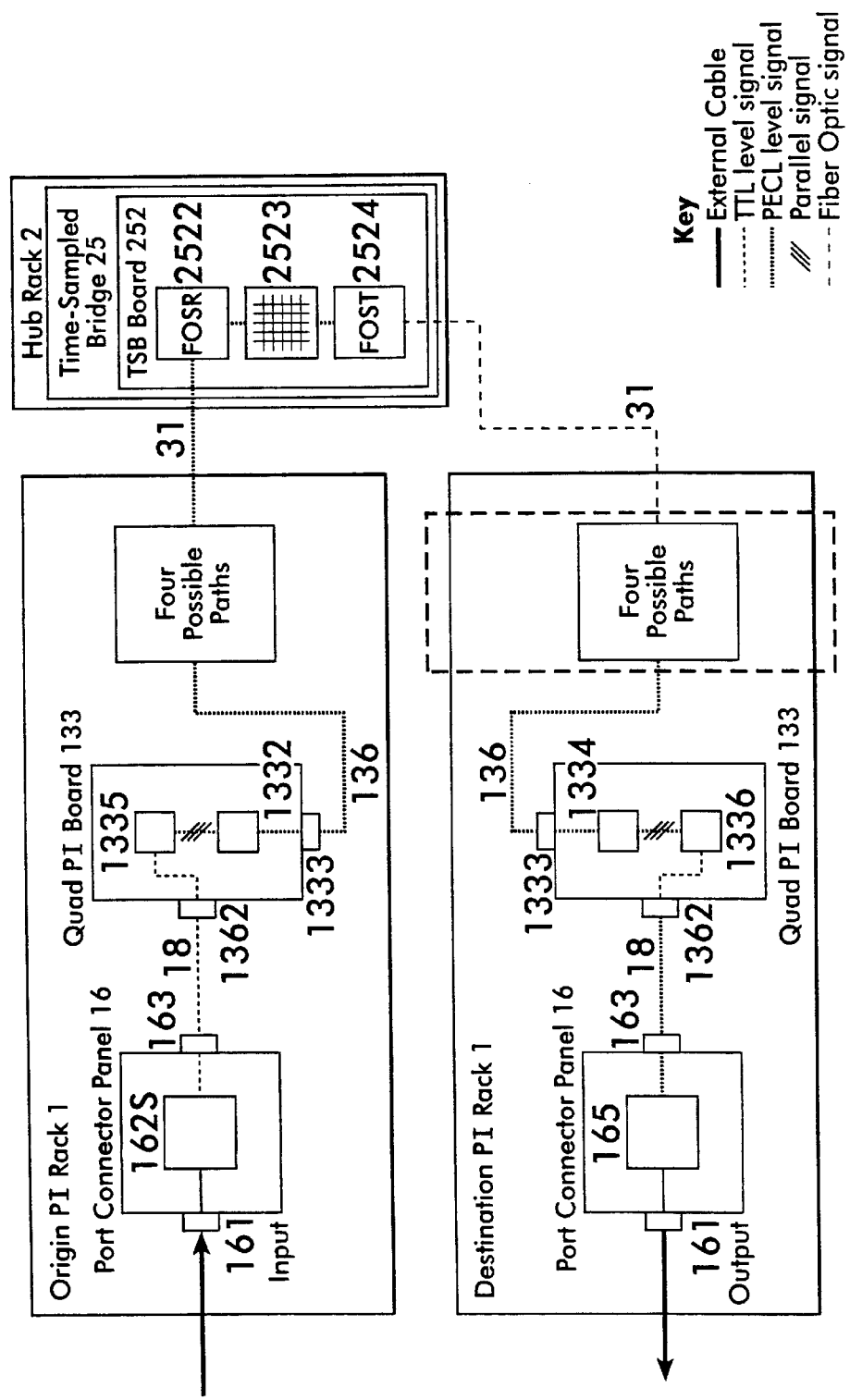
FIG. 46 is a block diagram illustrating, in general terms, serial signal routing from a Hub Rack to a destination PI Rack according to the present invention.

It will be noted from FIG. 45 that the PECL serial signal can then be transferred to the Hub Rack via four possible paths as previously described above. Moreover, it will be noted that the switching performed in Hub Rack 2 was previously described above and, in the interest of brevity, will not be described again. In addition, the PECL serial signal can then be transferred from the Hub Rack 2 via four possible paths previously described above. The only portion of the signal path not yet discussed is the final signal conditioning, which is described immediately below.

The PECL serial signal is routed through the PI Cage backplane 136 and enters the destination Quad PI Board 133 through the Quad PI Board Backplane Mating Receptacle 1333. See FIG. 46. The PECL serial signal is delivered to the Serial to Parallel Converter/TTL Line Driver 1334, where the PECL serial signal is converted back to parallel TTL level signals. The parallel TTL signals are delivered to the Parallel to Serial Converter 1336 and the resultant single serial TTL signal delivered back to the PI Cage to Port Connector Panel cable assembly backplane connector adapter 1362. The serial TTL signal is then transferred to the destination Port Connector Panel 16 via the PI Cage to Port Connector Panel cable harness 18. The serial TTL signal enters the Port Connector Panel 16 via the Port Connector Panel internal interface connector 163 and is delivered to the external Serial Interface Driver 165 where it is conditioned for transmission. Finally the conditioned serial signal exits the MIPPSS through the Port Connector Panel External Interface Connector 161. This entire process takes approximately 370 ns, excluding inter-rack cable delays.

Figure 47:
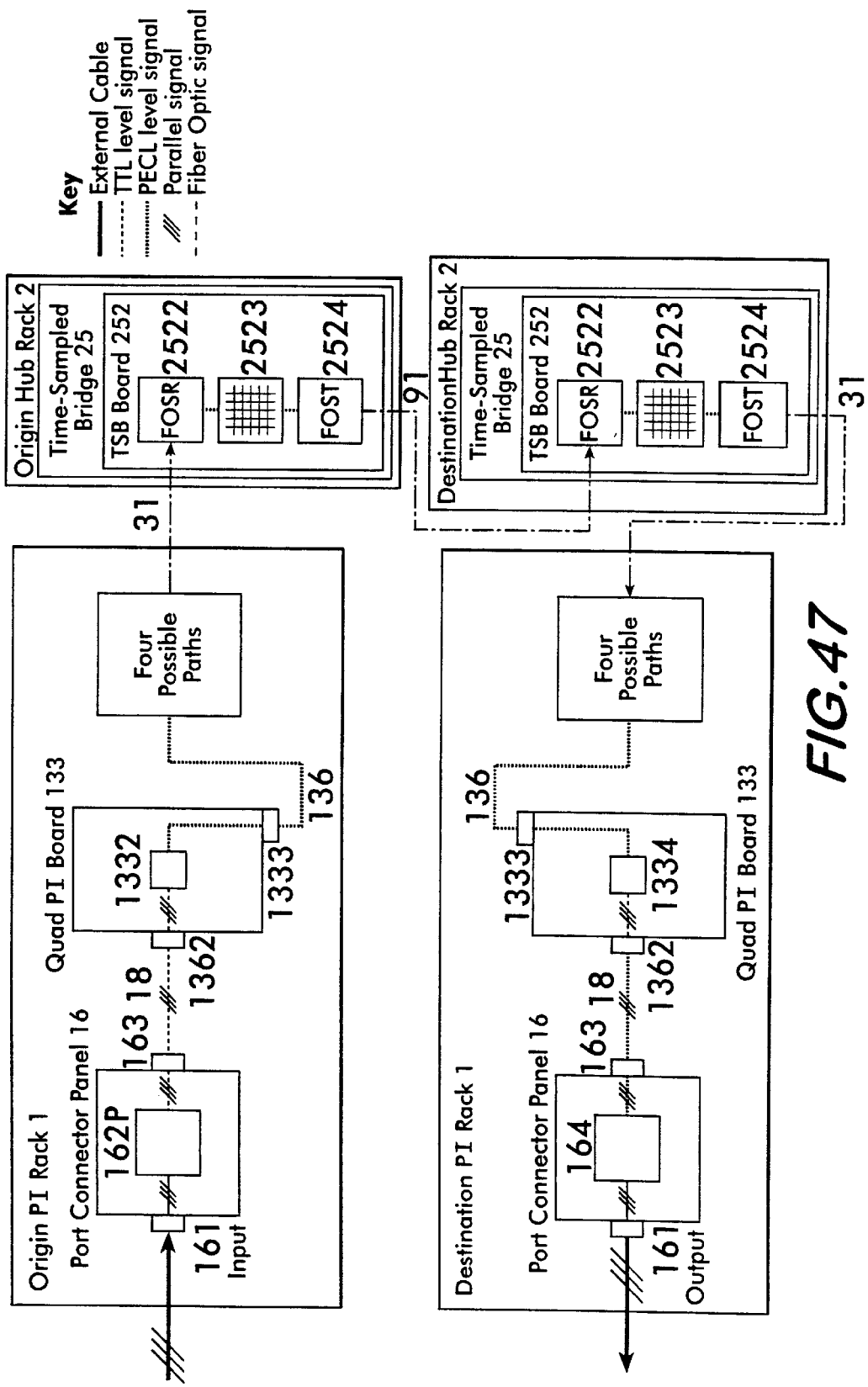
FIG. 47 is a block diagram illustrating Inter-Hub Rack signal routing according to the present invention.

Although all of the basic signal paths for an exemplary MIPPSS have now been described in detail, it will be appreciated that FIG. 15 illustrates an expanded configuration wherein a pair of Hub Racks 2 are employed advantageously. Thus, it is necessary to describe one additional path, i.e., an Inter-Hub path, since two users or systems that interface with the MIPPSS through Quad PI Boards 133 in different PI Racks 1 connected to different Hub Racks 2 can be connected using the Time-Sampled Bridges 25 within the Hub Racks 2, as shown in FIG. 47. Since both parallel and serial signals have been converted to fiber optic serial signals prior to hub-to-hub transfer, there is no need to cover the specifics of parallel and serial signal path processing. Signal switching between the Hub Racks is handled in the following manner:

(1) Switching at Origin Time-Sampled Bridge. As shown in FIG. 47, the fiber optic serial signal enters the Fiber Optic Serial Receiver (FOSR) 2522 of a Time-Sampled Bridge Board 252 of the Time-Sampled Bridge 25 of the Origin Hub Rack 2 where it is converted back to a PECL serial signal. The PECL serial signal is delivered to an input of a Matrix Switch 2523, through the Matrix Switch 2523 to the appropriate output, and then to a FOST 2524 where the signal is converted to a fiber optic serial signal and transferred through one fiber of the Hub to Hub Data Communications Cable Assembly 91.

(2) Switching at Destination Time-Sampled Bridge. Still referring to FIG. 47, the fiber optic serial signal enters the Fiber Optic Serial Receiver (FOSR) 2522 of a Time-Sampled Bridge Board 252 of the Time-Sampled Bridge 25 of the Destination Hub Rack 2 where it is converted back to a PECL serial signal. The PECL serial signal is delivered to an input of a Matrix Switch 2523, through the, for example, 32×32, Matrix Switch 2523 to the appropriate output, and then to a FOST 2524 where the signal is converted to a fiber optic serial signal and transferred through one fiber of the PI Cage to Hub Rack Cable Assembly 31.

The switching actions of the MIPPSS are controlled from the Hub Controller Personal Computer (PC) 24 located in the Hub Rack 2 or the PI Rack Diagnostic Terminal 17, which is ultimately under the control of the UCC 2a (controller), e.g., via a prescribed set of software-generated commands. There are three possible points to initiate a switch action for the MIPPSS and three possible paths for a command to reach a PI Rack 1. First, it is possible to initiate a switch action from (1) a central switching computer that is separate from the MIPPSS, (2) a Hub Controller PC 24 within a Hub Rack 2, or (3) a PI Rack Diagnostic Terminal 17. Second, any switch actions for the MIPPSS must be transmitted from one or more Hub Controller PCs 24 and/or the PI Rack Diagnostic Terminal 17.

When a central switching computer, i.e., the UCC 2a, is used to control the switching actions of the MIPPSS, it need only be connected to one Hub Rack 2, designated the master Hub Rack. The Serial Port of the Hub Controller PC 24 in the master Hub Rack 2 connects to the UCC 2a directly via two Ethernet or five RS-232 cables. The commands from the UCC 2a and the responses from the master Hub Rack 2 comply with a common interface protocol that is adaptable in MIPPSS software. Once the master Hub Rack 2 has received a command, it passes that command to the pertinent PI Cage 13 or the slaved Hub Rack 2 for further action. This process will be discussed in greater detail below.

Additionally, switch actions advantageously can be initiated at the Hub Rack by entering the desired command into the keyboard 244 of the Hub Controller PC 24. The command is also displayed on the integrated video monitor 242 of the Hub Controller PC. It will be appreciated that the entered command must conform with the available set of MIPPSS commands. It is also possible to enter a command via the PI Rack diagnostic terminal 17. When a PI Rack 1 has been designated as available for maintenance, either by a UCC 2a or a Hub Controller PC 24, that PI Rack 1 can take commands from either a Hub Controller PC 24 or directly from a PI Rack Diagnostic Terminal 17. It should be mentioned here that when commands for that PI Rack 1 are received from a UCC 2a, the PI Rack 1 will be declared as unavailable for use.

As previously mentioned, any switch actions for the MIPPSS are primarily transmitted from one or more Hub Controller PCs 24 and/or the PI Rack Diagnostic Terminal 17. Once a command has reached the Hub Controller PC 24, from the Hub Controller PC keyboard 244 or the UCC 2a, it must be interpreted. The Hub Controller PC 24 determines which PI Cage(s) 13 the Port Connector Panels 16 required to establish a selected connection are in, which Hub Rack 2 the PI Cage 13 required to establish the selected connection is connected to, and what switch actions must take place.

When the affected PI Cage 13 is directly connected to that Hub Rack 2, the command is sent to the PC Interface Unit 234 via the PC Cable Assembly 27. The PC Interface Unit 234 forwards the command to the appropriate Hub to PI Cage Unit 232 via a Multi-Layer Backplane 235. The Hub to PI Cage Unit 232 then sends the command to the matching Extender Bridge 132 in the appropriate PI Cage 13 via the fiber optic PI Cage to Hub Rack cable assembly 31. The Extender Bridge 132 determines which Quad PI Board 133 is affected, i.e., required to complete the selected connection, and forwards the command via Multi-Layer Backplane 136. The appropriate switch action is actually carried out by Quad PI board 133. However, when the affected PI Cage 13 is connected to a different Hub Rack 2, the command is sent from the Hub PC 24 to the PC Interface Unit 234 via the PC Cable Assembly 27. The PC Interface Unit 234 forwards the command to the appropriate Hub to Hub Interface Unit 233 via Multi-Layer Backplane 235. The Hub to Hub Interface Unit 233 sends the command to the matching Hub to Hub Interface Unit 233 in the appropriate Hub Rack 2 via Hub to Hub Cable Assembly 32. The Hub to Hub Interface Unit 233 in the receiving Hub Rack 2 forwards the command to the PC Interface Unit 234 via Multi-Layer Backplane 235. The PC Interface Unit 234 then forwards the command to Hub Controller PC 24 via PC cable assembly 27. From there, the Hub Controller PC 24 sends the command to the appropriate PI Cage 13 for action as explained in the Hub to PI Cage description immediately above.

As previously mentioned, when the PI Rack 1 is available for maintenance, a PI Cage 13 within it may receive commands from a PI Rack Diagnostic Terminal 17. The PI Rack Diagnostic Terminal 17 sends a command to Extender Bridge 132 via EIA-232 PI Rack interface cable 173. The Extender Bridge 132 determines which Quad PI Board 133 is affected and forwards the command via Multi-Layer Backplane 136. The appropriate switch action is actually carried out by Quad PI board 133.

From the foregoing discussion, it will be appreciated that the Multi-Interface Point-to-Point Switching System (MIPPSS) according to the present invention provides the ability to interconnect a large number of electronic components in a manner which allows the components to function as if they were physically wired together. Moreover, several aspects of the MIPPSS have been defined in terms of functional behavior.

Multi-Interface functional behavior refers to the ability of the MIPPSS to handle virtually any type of data transfer protocol, i.e., any device can be connected to any other device that uses that same data transfer protocol. The MIPPSS advantageously is capable of simultaneously handling various parallel and serial signal formats at different speeds and different voltage levels, including fiber optic signals. Moreover, these signals can be of virtually any data type, e.g., communications, images, sensor data, accounting records, and can be used for any scientific, commercial, or military purpose. Furthermore, the MIPPSS offers the advantage of using a single system operating under a single controller to provide all switching services for a given facility.

Point-to-Point functional behavior generally refers to (1) low latency, i.e., achieving a total data transfer delay close to the that which would have been achieved in a direct-wired configuration, (2) timing consistency, i.e., achieving a latency which is deterministic and predictable, and (3) high signal fidelity, i.e., not adding to, deleting from, or altering the signal in any way. Each of these aspects are discussed in greater detail below. It should be noted that one of the features of point-to-point functional behavior which differentiates MIPPSS from conventional switching systems is the fact that the MIPPSS point-to-point connection is content independent. It should be noted that a content independent point-to-point switching system such as MIPPSS does not consider information in the message, e.g., data, in determining at least one of the duration, i.e., how long the connection lasts, or the direction, i.e., the destination, of the connection. In contrast, in a message dependent point-to-point switching system, a controller generally reads the message before establishing the needed connection and then drops the connection when the message transmission has been completed. The telephone system is a well known example of a message dependent point-to-point switching system; the MIPPSS is not, since, as discussed above, switching control signals are generated only by an independent computer, the Hub Controller PC 24, or the PI Rack diagnostic terminal 17, under the ultimate control of the UCC 2a.

The MIPPSS advantageously achieves a data transfer speed close to the speed which would have been achieved in a direct-wired, i.e., a hard wired, configuration. The total point-to-point delays through the MIPPSS appear as a fixed length of cable. It will be appreciated from the discussion above that the MIPPSS offers the advantage of avoiding inconsistent routing, inconsistent timing, and delays associated with the overhead of operating a packet-switching network. This is of particular value to facilities which use switching to enable testing on equipment.

Moreover, the MIPPSS advantageously achieves a data transfer speed which is deterministic and predictable. This characteristic allows activities such as research and development (R&D) and test and evaluation (T&E) facilities to conduct research and testing without introducing additional possible sources of timing variabilities due to switching. Once again, this is of particular value to facilities which use switching to enable testing on equipment.

It will be appreciated that the MIPPSS does not add to, delete from, or alter the signal in any way, i.e., MIPPSS exhibits a data transfer protocol insensitivity. An interface-compliant input signal arriving at the MIPPSS is output as an interface-compliant signal. This characteristic is critical when the switch serves to connect objects which are themselves under test, allowing research and testing without introducing additional possible sources of data or signal errors due to switching. High, i.e., virtually perfect, signal fidelity also allows multiple interface types to be transmitted across the switch, allowing efficient utilization of legacy systems. Moreover, MIPPSS exhibits transparent functional behavior, i.e., MIPPSS delivers a signal without interaction with the interface protocol corresponding to that signal. Thus, an interface-compliant input signal bit arriving at an input terminal is output as an interface-compliant signal bit, irrespective of whether the bit is a control bit or a data bit. This characteristic is critical when the switch serves to connect objects which are themselves under test, allowing research and testing without introducing additional possible sources of errors due to switching. It should be noted that, as discussed above, the MIPPSS provides transparent connections in the sense that the switching system merely distinguishes between data and noise, and in the sense that the signals are switched, exhibit substantially the same signal characteristics after passing through the MIPPSS as they do before entering the MIPPSS. Moreover, the data is delivered by the MIPPSS without any attempt to analyze the delivered data.

The MIPPSS advantageously provides a distributed design, wherein each switching unit has the capability of servicing multiple locations, and no single location must house the entire switch. It will be appreciated that this reduces need for costly modifications or additions to facilities to accommodate switching equipment.

In terms of operation, the MIPPSS facilitates easier and less costly reconfigurability. In particular, the MIPPSS advantageously can locate the quickest, i.e., lowest latency, path required to achieve a point-to-point connection. When the first path is unavailable either because it is in use or inoperable, the MIPPSS locates the next lowest latency connection. It will be appreciated that when combined with the hot-swapping capability, i.e., on-line replacement of line-replaceable units, the MIPPSS beneficially remains operable overall while discrete elements are inoperable. Thus, the MIPPSS remains operable even when individual components are either busy or inoperable.

It should also be mentioned that the MIPPSS is designed with standardized units and dimensions for flexible use. For example, all components are contained in an EIA-standard rack. It will be appreciated that this permits several components of the design, e.g., AC and DC power supplies, cooling modules, control computer, to be commercially available, competitively priced modules. Moreover, this feature permits incorporation of additional modifications to the design since standard dimensions are used. Furthermore, the MIPPSS design incorporates common Commercial Off The Shelf (COTS) hardware in redundant modular designs with the ability to replace units while operating ("hot swap"). The MIPPSS advantageously runs initial, periodic, and on-demand Built-In Test (BIT) routines to assess system functions. It will be appreciated that by running continuous background tests, the MIPPSS achieves a significantly lower system-wide mean time between failures (MTBF). Additionally, by permitting component replacement during operation, the MIPPSS requires less manpower and less facility time to isolate switch problems and effect repairs or modifications.

Furthermore, the MIPPSS architecture advantageously can be increased or decreased in increments of two I/O ports, from a minimum size of two I/O ports up to a maximum of 4096 I/O ports of any interface type. The disclosed technology allows for a larger switch design by simply increasing resources. It will be noted that this scalable design allows users to purchase only what they need initially and add to the switching capability incrementally if the requirements change.

In addition to a high transfer speed of raw data, the MIPPSS advantageously achieves a high message throughput by taking advantage of local switching between adjacent components. Coupled with the characteristic that a path once set stays set until affirmatively released (See the discussion of point-to-point above.), messages can be transmitted efficiently without the redundant path verification or address interpretation required in other switching architectures. This permits improved performance which takes advantage of, but is not reliant upon, intelligent placement of switched components.

It should also be mentioned that a given switch action of any signal type is validated in the MIPPSS by sending an electric pulse to both the input and output connections of the switch. If the electric pulse does not return, the switched connection is labeled as not valid. It will be appreciated that this feature allows the switch to serve objects which are themselves under test, allowing research and testing without introducing additional possible sources of path and channel alignment errors due to switching.

Moreover, the MIPPSS permits any given path through the switch to be selected via software commands issued by the unified cental controller of the MIPPSS, whereupon the switching system automatically chooses the optimum signal path for each connection. This path, once made, is fixed until released by a later software command. It should also be mentioned that there are alternate paths that are software selectable. This feature permits the MIPPSS to achieve a latency associated with a given path that is fixed, deterministic, and reproducible. Moreover, this feature allows the MIPPSS to serve objects which are themselves under test, allowing research and testing without introducing additional possible sources of path or signal errors due to switching.

In the MIPPSS, any signal input can be switched to any signal output, i.e., the architecture of the switching system does not inhibit the switching action between the input and output. Thus, virtually any equipment can be connected to any other equipment, regardless of total system load, up to the designed capacity of the system.

It will be appreciated that the MIPPSS system will determine the optimum, i.e., the lowest latency, signal path, and achieve a point-to-point connection in response to software commands, which permits the MIPPSS to be remotely and rapidly configured/reconfigured under software control. Therefore, the MIPPSS requires less manpower and less facility time to effect a switch reconfiguration.

In short, the primary utility of such a point-to-point switching system, i.e., MIPPSS, is in transparently switching signals between and among components which may not have been originally designed to be switched. The signals can be of virtually any data type (communications, images, sensor data, accounting records) and can be used for any scientific, commercial, or military purpose.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A multi-interface switching system, including:
   a plurality of I/O ports coupled to a plurality of respective devices;
   a switching fabric that selectively delivers each of a plurality of different signals from a selected one of the I/O ports coupled to a sending one of the devices to another selected one of the I/O ports coupled to a receiving one of the devices, to thereby establish respective connections between the sending and receiving devices, wherein the switching fabric provides a fixed, low latency signal path for each connection, whereby the latency of that connection is deterministic and predictable, and a data content of the signal delivered via that connection is not analyzed by the switching-fabric, whereby the switching fabric operates in a message-independent manner; and
   a controller that determines the latency of all possible signal paths that are presently available for each connection to be established, selects the lowest-latency signal path for each connection that it determines is presently available, and then configures the switching fabric to establish the selected signal path for each connection.

2. The multi-interface switching system as set forth in claim 1, wherein the controller further includes means for verifying the viability of each connection before establishing that connection.

3. The multi-interface switching system as set forth in claim 2, wherein the different signals include electrical and optical signals.

4. The multi-interface switching system as set forth in claim 2, wherein the controller does not establish any connections that have not been verified.

5. The multi-interface switching system as set forth in claim 4, wherein the controller selects the next lowest-latency signal path that is presently available for any connection that can not be verified.

6. The multi-interface switching system as set forth in claim 4, wherein the switching fabric includes:
a first switching layer that interconnects devices separated from one another by less than a first distance;
a second switching layer that interconnects devices separated from one another by less than a second distance;
a third switching layer that interconnects devices separated from one another by less than a third distance; and
wherein the third distance is greater than the second distance, and the second distance is greater than the first distance.

7. The multi-interface switching system as set forth in claim 6, wherein the controller provides unified control over the switching operation of all of the different switching layers.

8. The multi-interface switching system as set forth in claim 7, wherein the controller determines the duration of each connection.

9. The multi-interface switching system as set forth in claim 7, wherein the controller determines the duration of each connection independent of the data content of the signal delivered via that connection.

10. The multi-interface switching system as set forth in claim 1, wherein the switching fabric includes:
a first switching layer that interconnects devices separated from one another by less than a first distance;
a second switching layer that interconnects devices separated from one another by less than a second distance;
a third switching layer that interconnects devices separated from one another by less than a third distance; and
wherein the third distance is greater than the second distance, and the second distance is greater than the first distance.

11. The multi-interface switching system as set forth in claim 10, wherein the controller provides unified control over the switching operation of all of the different switching layers.

12. The multi-interface switching system as set forth in claim 11, wherein the controller determines the duration of each connection.

13. The multi-interface switching system as set forth in claim 11, wherein the controller determines the duration of each connection independent of the data content of the signal delivered via that connection.

14. The multi-interface switching system as set forth in claim 1, wherein the controller determines the duration of each connection independent of the data content of the signal delivered via that connection.

15. The multi-interface switching system as set forth in claim 1, wherein the controller determines the duration of each connection.

16. The multi-interface switching system as set forth in claim 1, wherein the signal fidelity of the switching fabric is substantially perfect, so that the different signals exhibit substantially the same signal characteristics after passing through the switching fabric as they do before passing through the switching fabric.

17. The multi-interface switching system as set forth in claim 1, wherein the switching fabric is a non-blocking, transparent, message-independent switching fabric.

18. The multi-interface switching system as set forth in claim 1, wherein a signal transfer delay imparted by the switching fabric to each different signal is substantially equal to an inherent delay associated with a direct-wired point-to-point connection between the respective sending and receiving devices associated with that signal.

19. The multi-interface switching system as set forth in claim 1, wherein the different signals include electrical and optical signals.

20. The multi-interface switching system as set forth in claim 1, wherein the different signals include at least two different signal types selected from a group that includes audio, video, text, graphics, and image data signal types.

21. The multi-interface switching system as set forth in claim 1, wherein the different signals include TTL and ECL signals.

22. The multi-interface switching system as set forth in claim 21, wherein the TTL and ECL signals include both high-level and low-level types of at least one of the TTL and ECL signals.

23. The multi-interface switching system as set forth in claim 1, wherein the switching fabric includes:
a converter section that converts all of the different signals, as required, to a common signal format for transmission within the switching fabric;
a re-converter section that re-converts all of the different signals from the common signal format back to their original signal format to generate re-converted different signals; and
an output section that delivers the re-converted different signals to respective ones of the I/O ports.

24. The multi-interface switching system as set forth in claim 1, wherein the duration of each connection is not dependent upon a data content of the signal delivered via that connection.

25. The multi-interface switching system as set forth in claim 1, wherein the switching fabric includes:
an electrical-to-optical signal converter section that converts at least selected ones of the different signals, as required, into optical signals for passage through at least a portion of the switching fabric; and
an optical-to-electrical signal converter section that converts the optical signals generated by the electrical-to-optical signal converter section back to electrical signals prior to being outputted from the switching fabric.

26. A multi-interface switching system, including:
a plurality of I/O ports coupled to a plurality of respective devices;
a switching fabric that selectively delivers each of a plurality of different signals from a selected one of the I/O ports coupled to a sending one of the devices to another selected one of the I/O ports coupled to a receiving one of the devices, to thereby establish respective connections between the sending and receiving devices, wherein the switching fabric provides a fixed, low latency signal path for each connection, whereby the latency of that connection is deterministic and predictable, and a data content of the signal delivered via that connection is not analyzed by the switching fabric, whereby the switching fabric operates in a message-independent manner; and
a controller that determines the latency of all possible signal paths that are presently available for each connection to be established, determines the path bit error rate for each of the presently available possible signal paths, then selects the presently available one of the possible signal paths for each connection that satisfies an optimum combination of lowest latency and lowest path bit error rate in accordance with a prescribed algorithm, and then configures the switching fabric to establish the selected signal path for each connection.

27. The multi-interface switching system as set forth in claim 26, wherein the controller further includes means for verifying the viability of each connection before establishing that connection.

28. The multi-interface switching system as set forth in claim 27, wherein the controller does not establish any connections that have not been verified.

29. The multi-interface switching system as set forth in claim 28, wherein the controller selects the next lowest-latency signal path that is presently available for any connection that can not be verified.

30. The multi-interface switching system as set forth in claim 26, wherein the switching fabric includes:
   a first switching layer that interconnects devices separated from one another by less than a first distance;
   a second switching layer that interconnects devices separated from one another by less than a second distance;
   a third switching layer that interconnects devices separated from one another by less than a third distance; and
   wherein the third distance is greater than the second distance, and the second distance is greater than the first distance.

31. The multi-interface switching system as set forth in claim 30, wherein the controller provides unified control over the switching operation of all of the different switching layers.

32. The multi-interface switching system as set forth in claim 31, wherein the controller determines the duration of each connection.

33. The multi-interface switching system as set forth in claim 31, wherein the controller determines the duration of each connection independent of the data content of the signal delivered via that connection.

34. The multi-interface switching system as set forth in claim 28, wherein the switching fabric includes:
   a first switching layer that interconnects devices separated from one another by less than a first distance;
   a second switching layer that interconnects devices separated from one another by less than a second distance;
   a third switching layer that interconnects devices separated from one another by less than a third distance; and
   wherein the third distance is greater than the second distance, and the second distance is greater than the first distance.

35. The multi-interface switching system as set forth in claim 32, wherein the controller provides unified control over the switching operation of all of the different switching layers.

36. The multi-interface switching system as set forth in claim 33, wherein the controller determines the duration of each connection.

37. The multi-interface switching system as set forth in claim 33, wherein the controller determines the duration of each connection independent of the data content of the signal delivered via that connection.

38. The multi-interface switching system as set forth in claim 26, wherein the controller determines the duration of each connection independent of the data content of the signal delivered via that connection.

39. The multi-interface switching system as set forth in claim 26, wherein the controller determines the duration of each connection.

40. The multi-interface switching system as set forth in claim 26, wherein the signal fidelity of the switching fabric is substantially perfect, so that the different signals exhibit substantially the same signal characteristics after passing through the switching fabric as they do before passing through the switching fabric.

41. The multi-interface switching system as set forth in claim 26, wherein the switching fabric is a non-blocking, transparent, message-independent switching fabric.

42. The multi-interface switching system as set forth in claim 26, wherein a signal transfer delay imparted by the switching fabric to each different signal is substantially equal to an inherent delay associated with a direct-wired point-to-point connection between the respective sending and receiving devices associated with that signal.

43. The multi-interface switching system as set forth in claim 26, wherein the different signals include electrical and optical signals.

44. The multi-interface switching system as set forth in claim 26, wherein the different signals include at least two different signal types selected from a group that includes audio, video, text, graphics, and image data signal types.

45. The multi-interface switching system as set forth in claim 26, wherein the different signals include TTL and ECL signals.

46. The multi-interface switching system as set forth in claim 45, wherein the TTL and ECL signals include both high-level and low-level types of at least one of the TTL and ECL signals.

47. The multi-interface switching system as set forth in claim 26, wherein the switching fabric includes:
   a converter section that converts all of the different signals, as required, to a common signal format for transmission within the switching fabric;
   a re-converter section that re-converts all of the different signals from the common signal format back to their original signal format to generate re-converted different signals; and
   an output section that delivers the re-converted different signals to respective ones of the I/O ports.

48. The multi-interface switching system as set forth in claim 26, wherein the duration of each connection is not dependent upon a data content of the signal delivered via that connection.

49. The multi-interface switching system as set forth in claim 26, wherein the switching fabric includes:
   an electrical-to-optical signal converter section that converts at least selected ones of the different signals, as required, into optical signals for passage through at least a portion of the switching fabric; and
   an optical-to-electrical signal converter section that converts the optical signals generated by the electrical-to-optical signal converter section back to electrical signals prior to being outputted from the switching fabric.

50. A multi-interface switching system, including:
   a plurality of I/O means coupled to a plurality of respective devices;
   a switching means for selectively delivering each of a plurality of different signals from a selected one of the I/O means coupled to a sending one of the devices to another selected one of the I/O means coupled to a receiving one of the devices, to thereby establish respective connections between the sending and receiving devices, wherein the switching means provides a fixed, low latency signal path for each connection, whereby the latency of that connection is deterministic and predictable, and a data content of the signal delivered via that connection is not analyzed by the switching means, whereby the switching means operates in a message-independent manner; and controller means for determining the latency of all possible signal paths that are presently available for each connection to be established, for selecting the lowest-latency signal path for each connection that it determines is presently available, and for then configuring the switching means to establish the selected signal path for each connection.

51. The multi-interface switching system as set forth in claim 50, wherein the signal fidelity of the switching fabric is substantially perfect, so that the different signals exhibit substantially the same signal characteristics after passing through the switching fabric as they do before passing through the switching fabric.

52. The multi-interface switching system as set forth in claim 50, wherein the controller means further includes means for verifying the viability of each connection before establishing that connection.

53. The multi-interface switching system as set forth in claim 52, wherein the controller means does not establish any connections that have not been verified.

54. The multi-interface switching system as set forth in claim 50, wherein the controller means selects the next lowest-latency signal path that is presently available for any connection that can not be verified.

55. The multi-interface switching system as set forth in claim 50, wherein the switching means includes:

a first switching layer that interconnects devices separated from one another by less than a first distance;

a second switching layer that interconnects devices separated from one another by less than a second distance;

a third switching layer that interconnects devices separated from one another by less than a third distance; and wherein the third distance is greater than the second distance, and the second distance is greater than the first distance.

56. The multi-interface switching system as set forth in claim 55, wherein the controller means provides unified control over the switching operation of all of the different switching layers.

57. The multi-interface switching system as set forth in claim 53, wherein the switching means includes:

a first switching layer that interconnects devices separated from one another by less than a first distance;

a second switching layer that interconnects devices separated from one another by less than a second distance;

a third switching layer that interconnects devices separated from one another by less than a third distance; and wherein the third distance is greater than the second distance, and the second distance is greater than the first distance.

58. The multi-interface switching system as set forth in claim 57, wherein the controller provides unified control over the switching operation of all of the different switching layers.

59. The multi-interface switching system as set forth in claim 50, wherein the controller means determines the duration of each connection independent of the data content of the signal delivered via that connection.

60. The multi-interface switching system as set forth in claim 50, wherein the controller means determines the duration of each connection.

61. The multi-interface switching system as set forth in claim 58, wherein the controller means determines the duration of each connection.

62. The multi-interface switching system as set forth in claim 58, wherein the controller means determines the duration of each connection independent of the data content of the signal delivered via that connection.

63. The multi-interface switching system as set forth in claim 56, wherein the controller means determines the duration of each connection.

64. The multi-interface switching system as set forth in claim 56, wherein the controller means determines the duration of each connection independent of the data content of the signal delivered via that connection.

* * * * *